(12) United States Patent
Mosier et al.

(10) Patent No.: US 11,283,690 B1
(45) Date of Patent: Mar. 22, 2022

(54) SYSTEMS AND METHODS FOR MULTI-TIER NETWORK ADAPTATION AND RESOURCE ORCHESTRATION

(71) Applicant: C/HCA, Inc., Nashville, TN (US)

(72) Inventors: Sammie Mosier, Nashville, TN (US); Bryan Sisk, Nashville, TN (US); Todd Shafer, Nashville, TN (US); Clarence Robert Foster, Leoma, TN (US); Aaron Montlary, Nashville, TN (US); Jonathan Perlin, Nashville, TN (US); Edmund Jackson, Nashville, TN (US); David Wedemeyer, Nashville, TN (US); Stephanie Fulbright, Nashville, TN (US); Jeffrey Scott Smith, Mufreesboro, TN (US); Jane Englebright, Franklin, TN (US); Robert Rochford, Nashville, TN (US)

(73) Assignee: C/HCA, Inc., Nashville, TN (US)

( * ) Notice: Subject to any disclaimer, the term of this patent is extended or adjusted under 35 U.S.C. 154(b) by 0 days.

(21) Appl. No.: 17/020,586

(22) Filed: Sep. 14, 2020

Related U.S. Application Data

(60) Provisional application No. 62/900,050, filed on Sep. 13, 2019.

(51) Int. Cl.
*H04L 1/00* (2006.01)
*H04L 41/22* (2022.01)
(52) U.S. Cl.
CPC .................................. *H04L 41/22* (2013.01)

(58) Field of Classification Search
None
See application file for complete search history.

(56) References Cited

U.S. PATENT DOCUMENTS

| 10,263,945 | B1* | 4/2019 | Linkous | H04L 45/021 |
| 2017/0085447 | A1* | 3/2017 | Chen | H04L 43/024 |
| 2019/0132256 | A1* | 5/2019 | Wada | G06F 9/5077 |
| 2019/0318026 | A1* | 10/2019 | Joseph | G06F 16/248 |
| 2019/0386891 | A1* | 12/2019 | Chitalia | H04L 41/22 |
| 2021/0105518 | A1* | 4/2021 | Kannan | H04N 21/23103 |

\* cited by examiner

*Primary Examiner* — Justin S Lee
(74) *Attorney, Agent, or Firm* — Kilpatrick Townsend & Stockton, LLP

(57) ABSTRACT

Systems, methods, and machine-readable media to orchestrate process-performing resources are disclosed. Collected data items may correspond to assignments of process-performing resources, and device interactions or data changes that correspond to process or operation performances, conditions of loads. Data items may be processed to identify and map data portions to process-performing resources. Content nodes may be created and linked in a network of content nodes configured according to a computational model that comprises hierarchical orderings of the content nodes using a network data structure. A graphical representation may be formatted to represent the network data structure of the content nodes linked in the network. Metrics of resource performance corresponding to content nodes may be determined. The computational model may be trained using the metrics to create an adapted computational model. Adapted content nodes may be created according to the adapted computational model.

20 Claims, 16 Drawing Sheets

SYSTEMS AND METHODS FOR MULTI-TIER NETWORK ADAPTATION AND RESOURCE ORCHESTRATION

CROSS REFERENCE TO RELATED APPLICATION

This application claims the benefit of and priority to U.S. Provisional Application No. 62/900,050, filed Sep. 13, 2019, which is hereby incorporated by reference in its entirety for all purposes.

BACKGROUND

Disclosed embodiments of the present disclosure relate generally to load handling and in particular to systems and methods for multi-tier network adaptation and orchestration of resources.

Performance of various processes frequently requires use of specialized resources. Quantities, capacities, and capabilities of resources such as reliability, speed, efficiency, and accuracy may be limited and varied, however, which may limit an extent to which resources may be available for handling of a process with respect to various loads. Such limitations may result in sub-optimal process performance and results.

Therefore, there is a need in the art for improvements that address such limitations and technical challenges. This and others needs are addressed by the present disclosure.

BRIEF SUMMARY

Certain embodiments of the present disclosure relate generally to load handling and in particular to systems and methods for multi-tier resource network adaptation and orchestration of resources.

In one aspect, a system to orchestrate process-performing resources is disclosed. The system may include one or more interfaces that receive a set of electronic communications via a network from a plurality of electronic devices, where the electronic devices correspond to one or more client devices, one or more control devices, and/or one or more sensors. The system may include one or more processors and one or more non-transitory, computer-readable storage media containing instructions which, when executed on the one or more processors, cause the one or more processors to perform one or a combination of the following operations. A plurality of data items may be collected in a data storage. The plurality of data items corresponding to indicia of one or more of assignments of process-performing resources, device interactions or data changes that correspond to process and/or operation performances by the process-performing resources, conditions of loads, and/or processes and/or operations associated with the process-performing resources and the loads. For at least some of the plurality of data items, each data item may be processed to identify and map a data portion to one or more of the process-performing resources. Sets of node specifications may be collected based at least in part on matching the data portions and storing the matched data portions in the data storage. Based at least in part on the sets of node specifications, a set of content nodes may be created and linked in a network of content nodes configured according to a computational model that comprises one or more hierarchical orderings of the content nodes using a network data structure linking the content nodes. Presentation of a graphical representation may be caused, the graphical representation formatted to at least partially represent the network data structure of the content nodes linked in the network of content nodes with a graphical user interface of an endpoint device. Metrics of resource performance corresponding to two or more content nodes of the network of content nodes may be determined. The computational model may be automatically trained using the metrics of resource performance to create an adapted computational model. An adapted set of content nodes may be created according to the adapted computational model. Presentation of a graphical representation may be caused, the graphical representation formatted to at least partially represent the adapted set of content nodes.

In another aspect, a method to orchestrate process-performing resources is disclosed. The method may include one or a combination of the following, one or a combination of which may be performed by a control system. A plurality of data items may be collected in a data storage. The plurality of data items corresponding to indicia of one or more of assignments of process-performing resources, device interactions or data changes that correspond to process and/or operation performances by the process-performing resources, conditions of loads, and/or processes and/or operations associated with the process-performing resources and the loads. For at least some of the plurality of data items, each data item may be processed to identify and map a data portion to one or more of the process-performing resources. Sets of node specifications may be collected based at least in part on matching the data portions and storing the matched data portions in the data storage. Based at least in part on the sets of node specifications, a set of content nodes may be created and linked in a network of content nodes configured according to a computational model that comprises one or more hierarchical orderings of the content nodes using a network data structure linking the content nodes. Presentation of a graphical representation may be caused, the graphical representation formatted to at least partially represent the network data structure of the content nodes linked in the network of content nodes with a graphical user interface of an endpoint device. Metrics of resource performance corresponding to two or more content nodes of the network of content nodes may be determined. The computational model may be automatically trained using the metrics of resource performance to create an adapted computational model. An adapted set of content nodes may be created according to the adapted computational model. Presentation of a graphical representation may be caused, the graphical representation formatted to at least partially represent the adapted set of content nodes.

In yet another aspect, one or more non-transitory, machine-readable storage devices storing machine-executable instructions are disclosed. The machine-executable instructions, when executed by one or more processing devices, configure the one or more processing devices to perform one or a combination of the following operations. A plurality of data items may be collected in a data storage. The plurality of data items corresponding to indicia of one or more of assignments of process-performing resources, device interactions or data changes that correspond to process and/or operation performances by the process-performing resources, conditions of loads, and/or processes and/or operations associated with the process-performing resources and the loads. For at least some of the plurality of data items, each data item may be processed to identify and map a data portion to one or more of the process-performing resources. Sets of node specifications may be collected based at least in part on matching the data portions and storing the matched data portions in the data storage. Based at least in part on the sets of node specifications, a set of content nodes may be created and linked in a network of content nodes configured according to a computational model that comprises one or more hierarchical orderings of the content nodes using a network data structure linking the content nodes. Presentation of a graphical representation may be caused, the graphical representation formatted to at least partially represent the network data structure of the content nodes linked in the network of content nodes with a graphical user interface of an endpoint device. Metrics of resource performance corresponding to two or more content nodes of the network of content nodes may be determined. The computational model may be automatically trained using the metrics of resource performance to create an adapted computational model. An adapted set of content nodes may be created according to the adapted computational model. Presentation of a graphical representation may be caused, the graphical representation formatted to at least partially represent the adapted set of content nodes.

In various embodiments, electronic communications from a plurality of electronic devices may be detected. The electronic communications may include the data items, and the detecting may include listening for the indicia in one or more data streams. In various embodiments, for at least some of the electronic communications, each electronic communication may be processed to identify one or more values mapped to one or more of the process-performing resources. The sets of node specifications may be created at least in part by the matching the data portions according to sharing one or both of identical values and similar values. In various embodiments, the set of content nodes may be created so that each content node of the network of content nodes comprises respective linked content. The respective linked content may include at least one set of the sets of node specifications.

In various embodiments, the graphical representation may be created and formatted to at least partially represent the network data structure of the content nodes linked in the network of content nodes. Each represented node of the graphical representation may include one or more selectable links to access underlying content corresponding to one of the content nodes. The underlying data of at least one of the content nodes may include a respective subset of the sets of node specifications. In various embodiments, the underlying data further may include one or more content composites corresponding to the content node. In various embodiments, communication of a set of interface content to the endpoint device may be caused to facilitate a plurality of interface options provisioned with the graphical user interface that correspond to a plurality of parameters to specify a configuration of a subsystem with a selected set of one or more of the process-performing resources to perform a defined process in accordance with one or more selected protocols. Based at least in part on receiving one or more selections of one or more interface option of the plurality of interface options, causing the selected set of the one or more of the process-performing resources to perform the defined process in accordance with the one or more selected protocols may be caused.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure may be described in conjunction with the following appended figures.

In the appended figures, similar components and/or features may have the same reference label. Further, various components of the same type may be distinguished by following the reference label by a dash and a second label that distinguishes among the similar components. If only the first reference label may be used in the specification, the description may be applicable to any one of the similar components having the same first reference label irrespective of the second reference label.

DETAILED DESCRIPTION

The ensuing description provides preferred exemplary embodiment(s) only, and may be not intended to limit the scope, applicability, or configuration of the disclosure.

Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Various embodiments will now be discussed in greater detail with reference to the accompanying figures, beginning with FIG. 1.

Figure 1:
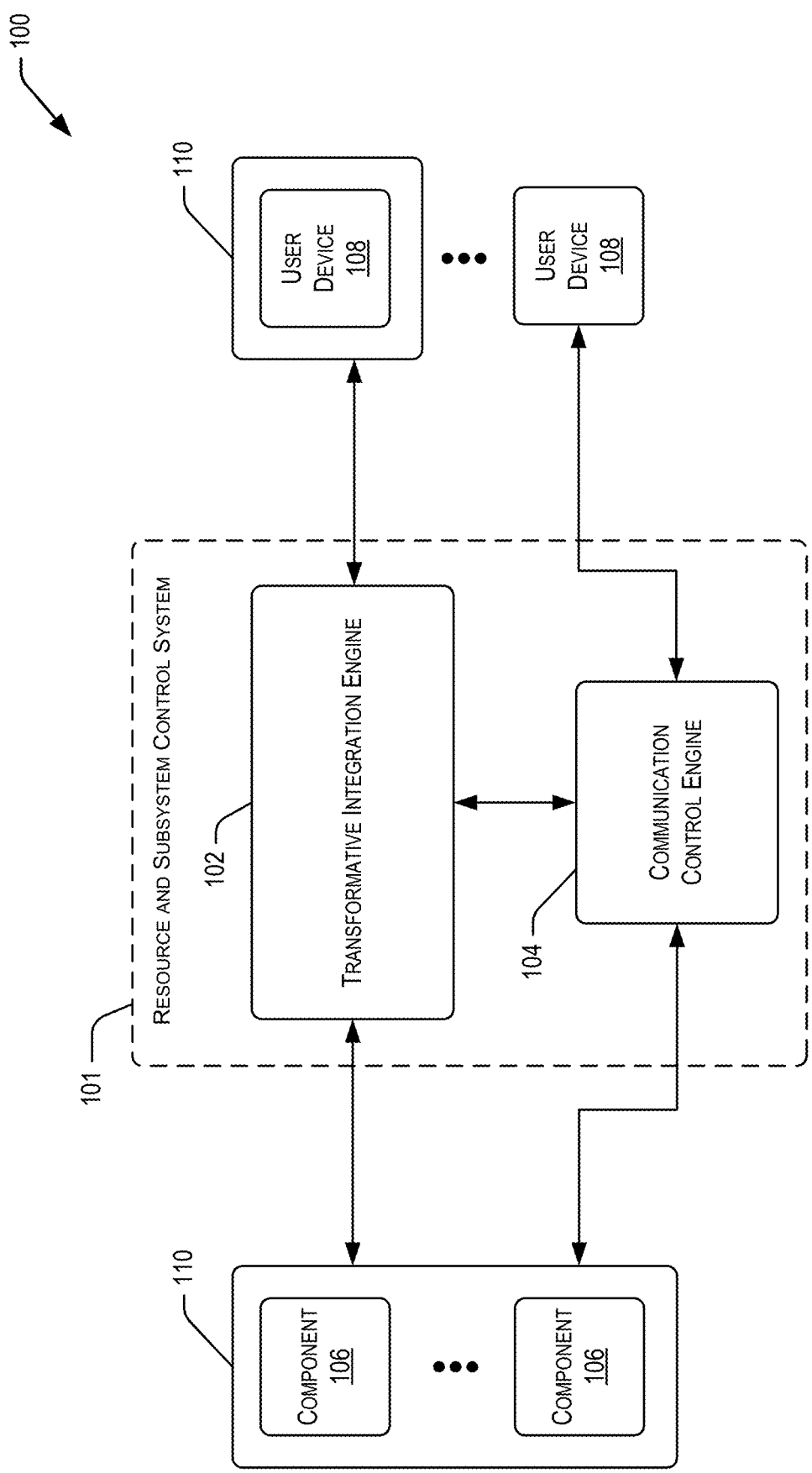
FIG. 1 illustrates a block diagram of aspects of an interaction system with a control system, in accordance with embodiments of the present disclosure.

FIG. 1 depicts a block diagram of an embodiment of an interaction system 100 with an resource and subsystem control system 101 (also referenced herein as the adaptive system 101) is illustrated. In various embodiments, the adaptive system 101 may at least partially include one or both of a transformative processing engine 102 and a communication control engine 104. Generally, in interaction system 100, data may be generated at one or more system components 106 and/or devices 108. Communication control engine 104 may control the flow of communications within interaction system. Transformative processing engine 102 may receive, intercept, track, integrate, process and/or store such data.

Data flowing in interaction system 100 may include a set of communications. Each of one, some of all communications may include (for example) an encoding type, authentication credential, indication of a content size, identifier of a source device, identifier of a destination device, identifier pertaining to content in the communication (e.g., an identifier of an entity), a processing or reporting instruction, a procedure specification, transmission time stamp, and/or sensor measurement. Data may, or may not, selectively pertain to a particular entity and/or client. Data can, depending on the implementation, include individually identifiable information and/or de-identified information as it pertains to an entity and/or client. Data may, but need not, include secured information.

For example, a system component 106 may include, for example, a sensor to detect a sensor measurement and may thereafter generate and transmit a communication that reflects the sensor measurement. The communication may be transmitted at routine times and/or upon detecting a threshold (e.g., one or more) number of measurements or a measurement satisfying a transmission condition (e.g., exceeding a threshold value). In some instances, the sensor measurement corresponds to one reflecting a property of an object or entity near the sensor. The communication may then include an identifier of the object or entity. The identifier may be determined, for example, based on detection of a nearby electronic tag (e.g., RFID tag), a detected input received at a user interface of component 106 and/or data in a corresponding communication received from a user device.

As another example, a device 108 may be configured to detect input received at a user interface of the device. The input may include, for example, an identifier of an object or entity, an instruction, a characterization of an object or entity, an identification of an analysis to be performed, a specification of an aggregation or data processing to be performed, and/or an identification of a destination for a data-analysis report. User device 108 may further be configured to detect input requesting particular data, to generate a request communication (e.g., to be sent to transformative processing engine), to receive the requested data and/or to present the received data.

The depicted engines, devices and/or components may communicate over one or more networks. A network of one or more networks may include a wired network (e.g., fiber, ethernet, powerline ethernet, ethernet over coaxial cable, digital signal line (DSL), or the like), wireless network (e.g., Zigbee™, Bluetooth™, WiFi™, IR, UWB, WiFi-Direct, BLE, cellular, Long-Term Adaptation (LTE), WiMax™, or the like), local area network, the Internet and/or a combination thereof. It will be appreciated that, while one or more components 106 and one or more devices 108 are illustrated as communicating via transformative processing engine 102 and/or control engine 104, this specification is not so limited. For example, each of one or more components 106 may communicate with each of one or more devices 108 directly via other or the same communication networks.

A component 106 may be configured to detect, process and/or receive data, such as environmental data, geophysical data, biometric data, chemical data (e.g., chemical composition or concentration analysis data), and/or network data. The data may be based on data detected, for example, via a sensor, received signal or input. A user device 108 may include a device configured to receive data from a user and/or present data to a user. It will be appreciated that, in some instances, a component 106 is also a user device 108 and vice-versa. For example, a single device may be configured to detect sensor measurements, receive input and present output.

A component 106 may be configured to generate a communication that is in one or more formats, some of which may be proprietary. For example, an imaging machine (e.g., one of one or more components 106) manufactured by company A, located within a first premises (e.g., premises 110), and belonging to a first client, may save and transfer data in a first format. An imaging machine (e.g., one of one or more components 106) manufactured by company B, located within the first premises (e.g., premises 110), and belonging to the first client, may save and transfer data in a second format. In some examples, data from certain components is transformed, translated, or otherwise adjusted to be recognizable by transformative processing engine 102. Thus, continuing with the example from above, when the imaging machines manufactured by companies A and B are located within the first premises belonging to the first client, they may nevertheless save and transfer data in different formats. In some examples, one or more components 106 communicate using a defined format.

In some examples, each of one or more components 106 are each associated with one or more clients within a same or different interaction systems. For example, certain ones of one or more components 106 may be associated with a first client, while other ones of one or more components 106 may be associated with a second client. Additionally, each of one or more components 106 may be associated with a premises 110 (e.g., client premises). Each premises 110 may correspond to a single location and/or processing focus. Exemplary types of premises include server farm premises, webserver premises, data-storage premises, technical-support premises, telecommunication premises, and/or operation premises. For example, a first premises may include a structure at a first location at which one or more resources (e.g., computational resources, equipment resources, laboratory resources and/or human resources) are provided. Each of the one or more resources may be of a first type in a first set of types. A resource type may be identified based on, for example, a characteristic of the resource (e.g., sensor inclusion) and/or a capability of providing each of one or more services. Thus, for example, resources at a first premises may be better configured for handling a particular type of service requests compared to those in another premises. As another examples, different premises may include resources of similar or same types but may vary in terms of, for example, user accessibility, location, managing client, etc.

Transmission of data from one or more components 106 to transformative processing engine 102 may be triggered by a variety of different events. For example, the data may be transmitted periodically, upon detection of an event (e.g., completion of an analysis or end of a procedure), upon detection of an event defined by a rule (e.g., a user-defined rule), upon receiving input triggering the transmission, or upon receiving a data request from transformative processing engine 102. Each transmission may include, e.g., a single record pertaining to a single entity, object, procedure, or analysis or multiple records pertaining to multiple entities, objects, procedures, or analyses.

In some examples, at least some of one or more devices 108 are associated with premises 110. In some examples, at least some of one or more devices 108 need not be associated with premises 110 or any other premises. Similar to one or more components 106, one or more devices 108 may be capable of receiving, generating, processing and/or transmitting data. Examples of one or more devices 108 include, for example, a computer, a mobile device, a smart phone, a laptop, an electronic badge, a set-top box, a thin client device, a tablet, a pager, and other similar user devices). One or more devices 108 may be configured to run one or more applications developed for interacting with data collected by transformative processing engine 102. For example, those user devices of one or more devices 108 that are not associated with premises 110 may be configured to run one or more third-party applications that may rely in part on the data gathered by transformative processing engine 102.

Each of one or more components 106 and one or more devices 108 may be utilized by one or more users (not shown). Each of the one or more users may be associated with one or more clients. For example, one of the one or more users may be associated with a client as a result of being employed by the client, physically located at a location of the client, being an agent of the client or receiving a service from the client.

In some examples, one or more components 106 and one or more devices 108 may communicate with transformative processing engine 102 and control engine 104 via different information formats, different proprietary protocols, different encryption techniques, different languages, different machine languages, and the like. As will be discussed with reference to FIG. 2, transformative processing engine 102 is configured to receive these many different communications from one or more components 106, and in some examples from one or more devices 108, in their native formats and transform them into any of one or more formats. The received and/or transformed communications may be transmitted to one or more other devices (e.g., control engine 104, an entity device and/or a user device) and/or locally or remotely stored. In some examples, transformative processing engine 102 receives data in a particular format (e.g., the HL7 format) or conforming to any other suitable format and/or is configured to transform received data to conform with the particular format.

One or more components 106 of premises 110 may include and/or has access to a local or remote memory for storing generated data. In some examples, the data is stored by one or more servers local to premises 110. Such storage may enable premises 110 to retain locally data pertaining to its premises prior to (or in conjunction with) the data being shared with transformative processing engine 102 and/or control engine 104. In some examples, the one or more servers of premises 110 share data directly with a record service (not shown), and the record service makes the data available to transformative processing engine 102 and/or control engine 104. Once an electronic record is updated at premises 110, an indication of the update may be provide to the record service. The record service may then update a corresponding record associated with the electronic record.

The record service may be granted access to the data generated and/or transmitted by one or more components 106. In some examples, the record service may include a server or a plurality of servers arranged in a cluster or the like. These server(s) of the record service may process and/or store data generated by one or more components 106. For example, one or more records may be generated for each entity (e.g., each record corresponding to a different entity or being shared across entities). Upon receiving a communication with data from an component (or premises), the record service may identify a corresponding record and update the record to include the data (or processed version thereof). In some examples, the record service provides data to transformative processing engine 102. Premises 110 may include one at which a resource is located and/or service is provided. Irrespective of the type of premises, premises 110 may update data, maintain data, and communicate data to transformative processing engine 102. At least some of the data may be stored local to premises 110.

A user interacting with a user device 108 may include, for example, a client, client agent and/or a third party. A user may interact with user device 108 and/or component 106 so as to, for example, facilitate or initiate data collection (e.g., by a component 106), provide data, initiate transmission of a data request, access data and/or initiate transmission of a data-processing or data-storage instruction. In some instances, one or more devices 108 may operate according to a private and/or proprietary network or protocols. In other examples, one or more devices 108 may operate on public networks. In any case, however, transformative processing engine 102 may have access to the one or more components and may communicate with them via a public, private and/or proprietary network or protocols. The use of one or more private and/or proprietary protocols may promote secure transfer of data.

Figure 2:
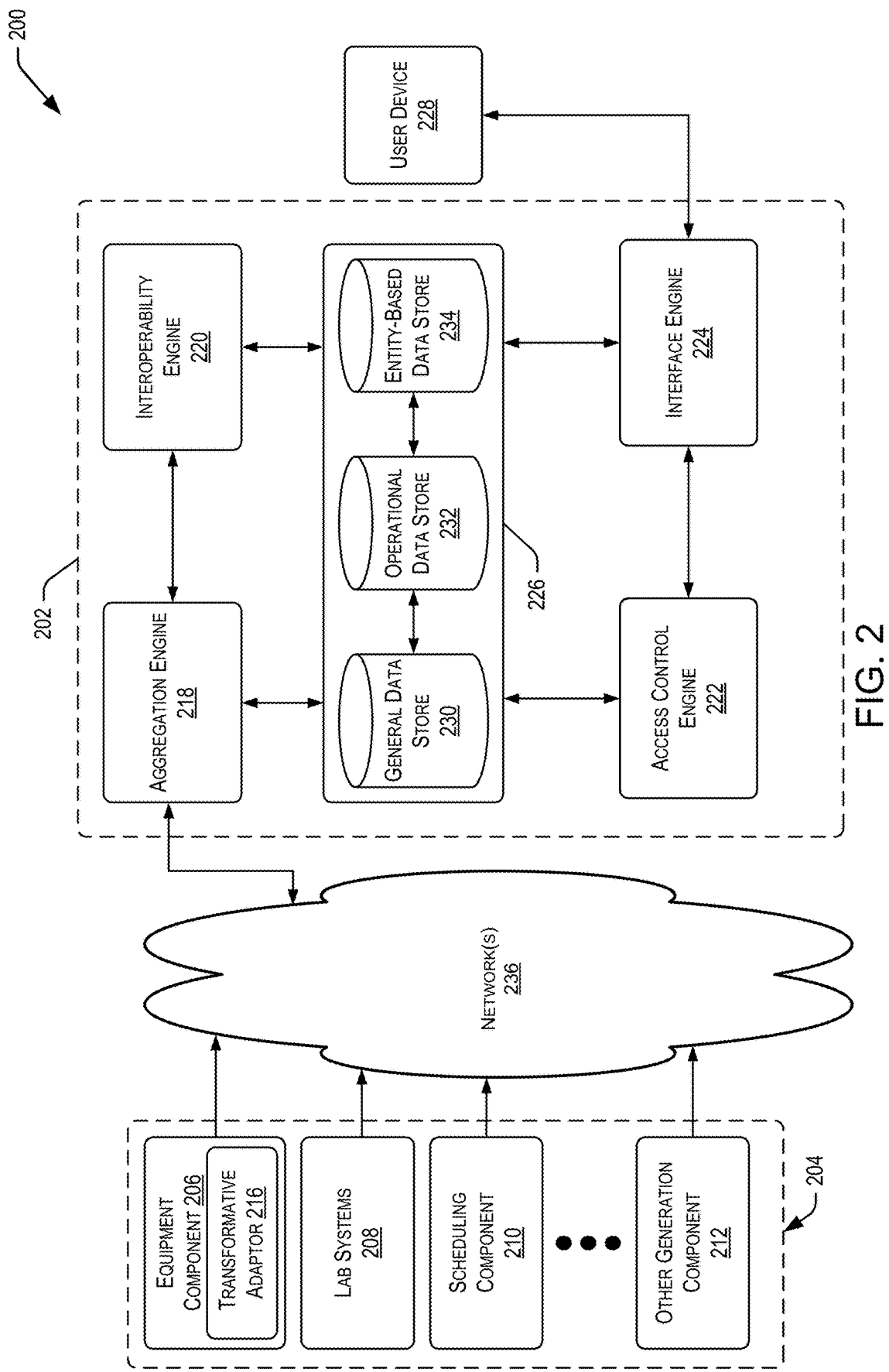
FIG. 2 illustrates a block diagram of aspects of the interaction system, in accordance with embodiments of the present disclosure.

Referring next to FIG. 2, a block diagram of an example of an interaction system 200 is shown. Interaction system 200 may correspond to interaction system 100 illustrated in FIG. 1 and may include a transformative engine 202. Transformative engine 202 is an example of transformative processing engine 102 discussed with reference to FIG. 1. Interaction system 200 also may include one or more generation components 204. In particular, one or more generation components 204 may include an equipment component 206, a lab systems component 208, a specification component 210 and other generation components 212. One or more generation components 204 are examples of one or more components 106 discussed herein.

Generally, one or more generation components 204 may include any suitable device or system capable of generating data in the context of an interaction system. For example, the other generation components 212 may include a sensor on a door, and equipment component 206 may include a sophisticated computer-controlled laser device. In either case, each generation component generates some type of data. For example, the data provided by the sensor may be used to address security concerns or testing heating, ventilating, and air conditioning (HVAC). The data provided by the laser device may have been provided while engaged in a procedure and may then be used by other entities in the future to decide how to use the device.

The one or more generation components 204 may correspond to one or more internet of things (IOT) devices. Such devices may be running software, e.g., developed in Linux, in some instances, and may be configured to send http calls via the API to send messages any time a trigger event is detected. By way of example, every time a particular door is opened, a sensor (e.g., a proximity sensor, a reed switch, a motion detector, etc.) may sense the open condition, and the corresponding IOT device may send an http call with a JSON payload with values indicative of the sensed condition, location, and time to the API to send a message to security.

As discussed in further detail herein, data generated by one or more generation components 204 may be of a variety of formats, some of which may be proprietary. For example, a single component may generate data in multiple formats, different components may generate data in different formats, and/or different component types may result in generation of data in different formats. In some instances, formatting of a data may depend on a service having been provided, a user initiating data generation, a destination to receive the data, a location at which a service was provided, etc. In some examples, a typical interaction system may include thousands of generation components producing data in hundreds of formats. In order to harness the power that comes from such a large amount of data to make informed decisions, it is desirable that all, or at least a large portion of the data, is shared. Use of transformative engine 202 in accordance with techniques described herein may achieve this design—making large amounts of data, in many different originating formats available to various types of users, via one or more interfaces.

While one or more generation components 204 are illustrated adjacent to each other, it is understood that each may be located within one premises or that the components may be spread out among many premises. In addition, in some examples, one or more generation components 204 belong to different clients. In some embodiments, the one or more generation components 204 may communicate with the transformative processing engine 202 via a specified protocol and the payload data of the communications may be in a variety of formats. In some embodiments, the one or more generation components 204 may communicate with the transformative processing engine 202 via a specified protocol the payload data of the communications may be in a specified format, after the payload data was transformed to the specified format, e.g., with one or more transformative adaptors disclosed herein.

Turning now to equipment component 206, this component may include any machine, contrivance, improgramt, or other similar related article, that is intended to aid in reaching a particular objective. In some instances, equipment component 206 may include one or more sensors to detect environmental or other stimuli. Equipment component 206 may include, for example, equipment to monitor a stimulus, detect stimulus changes, detect stimulus-indicative values, and so on. Exemplary equipment components 206 include an imaging device, a device that detects and characterizes electrical signals, a device that detects pressure, and/or a device that detects concentration of one or more particular elements, compounds and/or gases.

As illustrated, equipment component 206 may include transformative adaptor 216. In some examples, transformative adaptor 216 is a device that transforms, translates, converts, or otherwise adjusts output data from equipment component 206. For example, an equipment component 206 may be a scanner that outputs its results in format A, but the majority of other scanners in the interaction system output their results in format B. Transformative adaptor 216 may be implemented to convert or otherwise adjust the results in format A to conform closer to format B. For example, the conversion from format A to format B may be performed using a conversion rule, which may be user-defined or learned. Transformative engine 202 may perform similar processes as it relates to all data generated within interaction system 200. In this manner, transformative adaptor 216 may perform an initial step in the process of transformation, translation, conversion, or adjustment of the output of equipment component 206. In some examples, transformative adaptor 216 is implemented in hardware, software, or any suitable combination of both. In some examples, other transformative adaptors (not shown) may be implemented within others of one or more generation components 204. The one or more generation components 204 may communicate with the transformative processing engine 202 via a specified protocol, where the payload data of the communications may be in a specified format, after the payload data was transformed to the specified format, e.g., with one or more transformative adaptors 216.

Lab systems component 208 may include any suitable laboratory equipment or system that is intended to analyze material, such as biological material. This may include, for example, laboratory equipment that analyzes biological samples; electric microscopes; ultracentrifuges; data collection devices, including Kymographs, sensors connected to a computer to collect data; monitoring devices; computers used to report results of lab tests, and other similar laboratory equipment. Each of the above-listed components generates data that is provided (directly or indirectly) to transformative engine 202.

Specification component 210 may include any suitable computing devices used for operations-related purposes with respect to interaction system 200. For example, specification component 210 may be configured to temporally specify a resource for allocation for a particular entity during a particular time slot. Specification component 210 may monitor a temporal specification for the resource and may identify one or more available time slots that may be secured by a particular entity. Upon receiving a specification indication, specification component 210 may update a temporal specification of a resource to reflect that a particular time slot is to be allocated for service of a particular entity. In some embodiments, the transformative processing engine 202 may be configured to monitor data (e.g., messages) that is passed over the one or more networks 236 and, from the monitored data, select certain portions to provide to one or more authorized entities.

Each of the one or more generation components 204, as well as the one or more user devices 228 corresponding to the one or more devices 108, may include individual and/or shared storage systems, one or more processors, a user interface, a network connectivity device, and one or more ports. The storage system include memory that may be implemented, e.g., using magnetic storage media, flash memory, other semiconductor memory (e.g., DRAM, SRAM), or any other non-transitory storage medium, or a combination of media, and may include volatile and/or non-volatile media. The storage systems may also be configured to store computer-executable code or instructions for interacting with the user interface and/or for one or more applications programs, such as an application program for collecting data generated by the particular generation component.

The one or more processors may be configured to access the operating system and application programs stored within the storage systems, and may also be configured to execute such program code. The one or more processors may be implemented as one or more integrated circuits, e.g., one or more single-core or multi-core microprocessors or microcontrollers, examples of which are known in the art. In operation, the one or more processors may control the operation of the particular component. The one or more processors may access and execute the program code and at any given time.

The user interface may include any combination of input and output devices. In some instances, a user may operate input devices of the user interface to invoke the functionality of the particular component or user device. For example, the user interface may enable the user to view, hear, and/or otherwise experience output from component or user device via the output devices of the user interface. Examples of output devices include a display, speakers, and the like.

The network connectivity device may enable the component or user device to communicate with transformative engine 202 and other components or other user devices via one or more networks. The one or more networks may include any suitable combination of cable, cellular, radio, digital subscriber line, or any other suitable network, which may be wired and/or wireless. In some examples, the network connectivity device may enable the component or the user device to communicate wirelessly with various other components and/or transformative engine 202. For example, the components may include circuitry to enable data communication over a wireless medium, e.g., using near-field communication (NFC), Bluetooth Low Energy, Bluetooth® (a family of standards promulgated by Bluetooth SIG, Inc.), Zigbee, Wi-Fi (IEEE 802.11 family standards), or other protocols for wireless data communication.

The one or more ports may enable the component or the user device to receive data from one or more sensors. The sensors may be any suitable type of sensor to capture data. Such captured data may be shared with transformative engine 202 in accordance with techniques described herein. In some examples, the sensors may also be configured to detect the component's or the user device's location and other details about the component or the user device. In some examples, the component and user device may include global positioning chips for determining a geolocation. Such geolocation information may be relevant to analyzing the data provided by the component or the user device located at the geographic location.

In some embodiments, the transformative engine 202 may be configured to monitor data (e.g., messages) that is passed over the one or more networks 236 and, from the monitored data, select certain portions to provide to one or more authorized users via chat rooms/channels. For example, as disclosed herein, one or more agents may monitor data passed over the one or more networks 236. The one or more agents may, in various embodiments, correspond to a bot, a listener, and/or the like, and may conform ITI-41, HL7 v.2, HL7 v.3, C-CDA, NEMSIS, FHIR, XDs.b, XDR, or other suitable protocols. Thus, in some embodiments, one or more bots may be configured as listeners, and agent engine 118C may, in some embodiments, correspond to the bot engine 118D, which are disclosed herein.

The transformative processing engine 202 may include an aggregation engine 218, an interoperability engine 220, an access management engine 222, an interface engine 224, and a data store 226. The interface engine 224 may be configured to retrieve the data from the data store 226 and provide one or more interfaces for interacting with elements of the transformative processing engine 202. For example, the interface engine 224 may include an interface by which an application running on user device 228 may access portions of data within the data store 226. Generally aggregation engine 218 is configured to collect data from multiple communications. The data may be from one or multiple generation components 204 and/or may be of a same or different formats. Aggregation engine 218 may be configured to perform one or more operations on the collected data. For example, aggregation engine 218 may tag data, log data, perform protocol conversion, and may support one-to-many communications. The collection may be asynchronous. In some examples, the data has been saved locally in connection with one or more generation components 204 in many different formats having many different data structures.

Aggregation engine 218 may identify data to be aggregated based on, for example, intra-communication data, a current time, a source generation component, and/or one or more aggregation rules. For example, an aggregation rule may specify that data is to be aggregated across all communications that include content with a same entity identifier. An aggregation may be dynamic. For example, aggregated data may reflect that from within a most recent 12-hour period. Thus, an aggregation may be updated in time to exclude older data from the aggregation and to include newer data.

Aggregation engine 218 may be configured to provide data from one or more communications to interoperability engine 220. Interoperability engine 220 may be configured to perform one or more operations on the received data and store it in data store 226. For example, interoperability engine 220 may perform semantic tagging and indexing of data. This may include extracting field values from data, categorizing data (e.g., by type of data, characteristic of an entity, location of premises, characteristic of premises, and the like), anonymizing or partially-anonymizing data, and the like. Interoperability engine 220 may also include a high availability cache, an alerts engine and a rules engine. In some examples, interoperability engine 220 operates synchronously.

From interoperability engine 220, data flows to data store 226. Data store 226 (and any other data store discussed herein) may include one or more data stores, which may be distributed throughout two or more different locations (e.g., present on different devices, which may include devices of different entities and/or a cloud server). In some examples, data store 226 may include a general data store 230, an operational data store 232, and an entity-based data store 234. Within each of the data stores 230, 232, and 234 is stored data. Depending on the structure of the particular data store, certain data stores may include rules for reading and writing. The data stores 230, 232, and 234 may include records, tables, arrays, and the like, which may be relational or non-relational. Depending on the data store, records for individual entities, operational and analytics information, output data from one or more generation components 204, and the like may be retained. The data within the data stores 230, 232, and 234 include elements or tags such that a particular data (e.g., for a single entity, protocol, etc.) may be retrieved.

Access control engine 222 is configured to control access to features of transformative engine 202, including access to the data retained in data store 226. For example, access control engine 222 may verify that a user device such as user device 228 is authorized to access data store 226. To verify the user device 228, access control engine 222 may require that a user of the user device 228 input a username and password, have a profile associated with the interaction system, and the like. Access control engine 222 may also verify that the user device 228 has an IP address or geographical location that corresponds to an authorized list, that the user device 228 may include a plug-in for properly accessing data store 226, that the user device 228 is running certain applications required to access data store 226, and the like.

Figure 3:
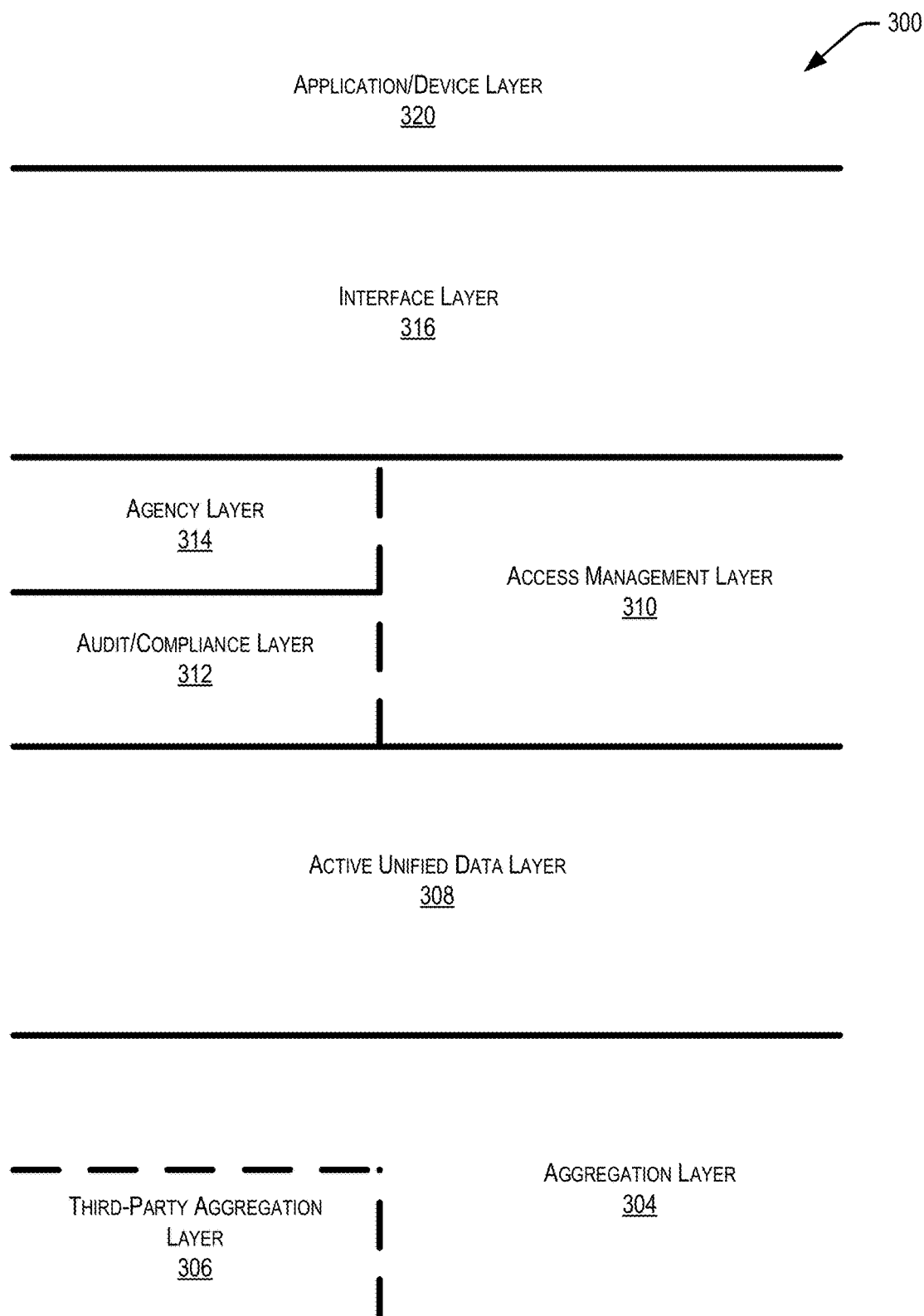
FIG. 3 illustrates a block diagram of an architecture stack of the control system, in accordance with embodiments of the present disclosure.

Turning next to FIG. 3, an architecture stack 300 of the control system 101 is shown. In some examples, techniques relating to control of data are implemented in accordance with architecture stack 300. And while architecture stack 300 is illustrated as having a particular structure, it is understood that other structures, including those with more or less layers than illustrated, is within the scope of this specification. In some examples, architecture stack 300 is implemented across an interaction system having a plurality of systems belonging to the same client or spread across different clients. Thus, architecture stack 300 may be used to integrate different systems of different entities and the like and to provide a fluid sharing of information among elements within the interaction system and without the interaction system. In some instances, a multi-layer part of architecture stack 300 is implemented at a single system or device within an interaction system.

The different layers of architecture stack 300 will be described generally with reference to FIG. 3 and in detail with reference to subsequent figures. Architecture stack 300 may include a receiving layer 302 as the bottom-most layer. Receiving layer 302 may include receiving data from elements that share data with other elements within an aggregation layer 304. For example, as detailed herein, receiving layer 302 may include receiving data from generation components that generate data. As such, receiving layer 302 is where data that has been created is received. In some examples, the data within receiving layer 302 may be in its raw formats. The output may then be transmitted to aggregation layer 304. In some examples, components of receiving layer 302 may have complimentary layers to facilitate data transfer. For example, the components may include a data generation and/or a data transmission layer for providing data to receiving layer 302.

Elements of aggregation layer 304 aggregate the data generated by the elements of receiving layer 302. For example, the elements of aggregation layer 304 may include aggregation engines that collect data from generation components located within receiving layer 302. Such aggregation may be performed periodically, in response to a user request, according to a temporal specification, or in any other suitable manner. In some examples, data of aggregation layer 304 may be aggregated according to input and/or rules and may aggregate across records pertaining to, e.g., a premises, entity, time period, characteristic (e.g., condition), outcome, and any other suitable input and/or rules. The aggregation may include compiling the data, generating a distribution, generating a statistic pertaining to the data (e.g., average, median, extremum or variance), converting the data, transforming the data to different formats, and the like.

Next, architecture stack 300 may include an active unified data layer 308. Elements of active unified data layer 308 receive data from the elements of the other layers and store such data in a unified manner. In some examples, this may include storing the data in a manner that allows for searching and retrieval using a defined set of method calls, techniques, and or procedures. For example, the data may be stored such that a different application may access the data in a standard or unified manner. Thus, elements of active unified data layer 308 may receive information collected or generated within aggregation layer 304 and make certain adjustments to the data (e.g., translations, tagging, indexing, creation of rules for accessing the data, conversion of formatting of the data, generation of compressed versions, and the like) prior to retaining the data within one or more data stores accessible within active unified data layer 308.

Architecture stack 300 also may include an access control layer 310, which may include an audit/compliance layer 312 and/or an agency layer 314. Access control layer 310 may include elements to control access to the data. For example, access control layer 310 may include elements to verify user login credentials, IP addresses associated with a user device, and the like prior to granting the user access to data stored within active unified data layer 308. Audit/compliance layer 312 may include elements to audit other elements of architecture stack 300 and ensure compliance with operating procedures. For example, this may include tracking and monitoring the other elements of access control layer 310.

Agency layer 314 may include an access location (e.g., a virtual private network, a data feed, or the like) for elements of agencies that are interested in the operations of the interaction system in which architecture stack 300 is implemented. For example, agency layer 314 may allow an entity access to some elements within architecture stack 300. This may be achieved by providing the entity a direct conduit (perhaps by a virtual private network) to the elements of access control layer 310 and the data within active unified data layer 308. Audit/compliance layer 312 and agency layer 314 are sub-layers of access control layer 310.

Architecture stack 300 also may include interface layer 316. Interface layer 316 provides interfaces for users to interact with the other elements of architecture stack 300. For example, clients, entities, administrators, and others belonging to the interaction system may utilize one or more user devices (interacting within application/device layer 320) to for sending and receiving communications via the active unified data layer 308. In some examples, the users may be unrelated to the interaction system and may use applications (not shown) to send and receive communications via one or more interfaces (e.g., to access data stored within active unified data layer 308).

Further, the architecture stack 300 may include application/device layer 320. The application/device layer 320 may include user devices and applications for sending and receiving communications via the elements of the interface layer 316. For example, the applications may be web-based applications, portals, mobile applications, widgets, and the like for sending and receiving communications (e.g., messages). These applications may run on one or more user devices. The user devices may be any suitable user device as detailed herein.

Figure 4:
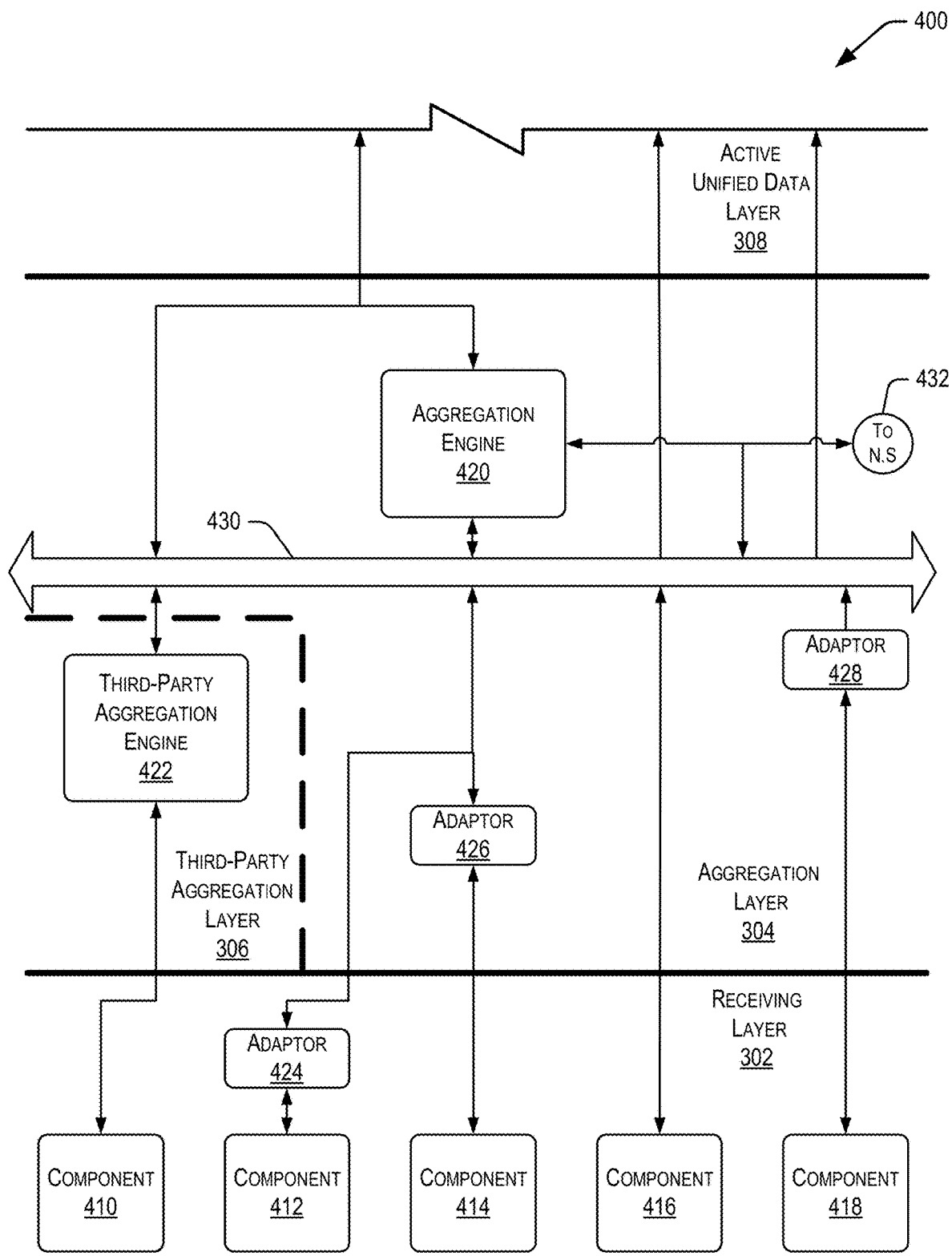
FIG. 4 illustrates a block diagram of a portion of the architecture stack, in accordance with embodiments of the present disclosure.

Turning next to FIG. 4, a diagram 400 is shown that depicts a portion of architecture stack 300 according to an embodiment of the present disclosure. In particular, the diagram 400 may include receiving layer 302, aggregation layer 304, aggregation layer 306, and a portion of active unified data layer 308. Receiving layer 302 receives data from one or more components 410-418. Components 410-418 are examples of one or more generation components 204. Components 410-418 may be spread across multiple premises. In some examples, components 410-418 may include complimentary layers to facilitate data transmission. For example, components 410-418 may include a transmission layer, generation layer, and/or a receiving layer to communicate data at receiving layer 302 and, in some examples, receive data from receiving layer 302.

In some instances, two or more of components 410-418 generate data according to different formats. The data may then be transformed, translated, or otherwise adjusted before an aggregation engine 420 (e.g., aggregation engine 218) or an aggregation engine 422 (e.g., aggregation engine 218) collects the data. In some examples, the adjustment takes place within receiving layer 302. Thus, an adaptor 424 is associated with component 412 located in receiving layer 302. Adaptor 424 is an example of transformative adaptor 216. Adaptor 424 is implemented, as appropriate, in hardware, software, or any suitable combination of both. For example, transformative adaptor 216 may be a bolt-on adaptor that adjusts data as such data leaves component 412.

Other adaptors, such as adaptor 426 and adaptor 428, are implemented within aggregation layer 304. These adaptors may function in a similar manner as adaptor 424. In some examples, the data provided by component 414 is transmitted through adaptor 426 prior to being directed to aggregation engine 420. The data provided by component 416 is transmitted through aggregation layer 304 and/or enters aggregation engine 420 without having first traveled through an adaptor. The data provided by component 418 is transmitted through aggregation layer 304 and through adaptor 428. In some examples, component 418 provides for streaming of data. The data provided by component 410 is transmitted directly to aggregation engine 422.

In some examples, data provided by the components 410-418 may be communicated via a messaging bus 430 (e.g., the one or more networks 236). The data, in the form of messages may be put on the one or more networks 236 by the one or more components, by the aggregation engine 420, by the engine 422, and by any other suitable device capable of generating messages. In some examples, messages are taken off of the messaging bus 430 by the aggregation engine and/or by one or more listeners described in more detail herein. Thus, circle 432 indicates that data (e.g., messages) may flow from the messaging bus 430 to a notification service and processed in accordance with techniques described herein.

Aggregation engine 420 and aggregation engine 422 function in a similar manner. In some examples, aggregation engine 422 is operated by a different entity than the entity that operates aggregation engine 420. This may be because the data collected by aggregation engine 422 differs in some way from the data collected by aggregation engine 420. In any event, aggregation engine 420 is configured to perform integration of data, including generic integration. For example, aggregation engine 420 performs one or more operations on data including tagging, logging, and protocol conversion. Aggregation engine 420 also supports one-to-many communications of data. In some examples, data flows between aggregation engine 420, the aggregation engine 422, and some of components 410-418 and elements of active unified data layer 308.

Figure 5:
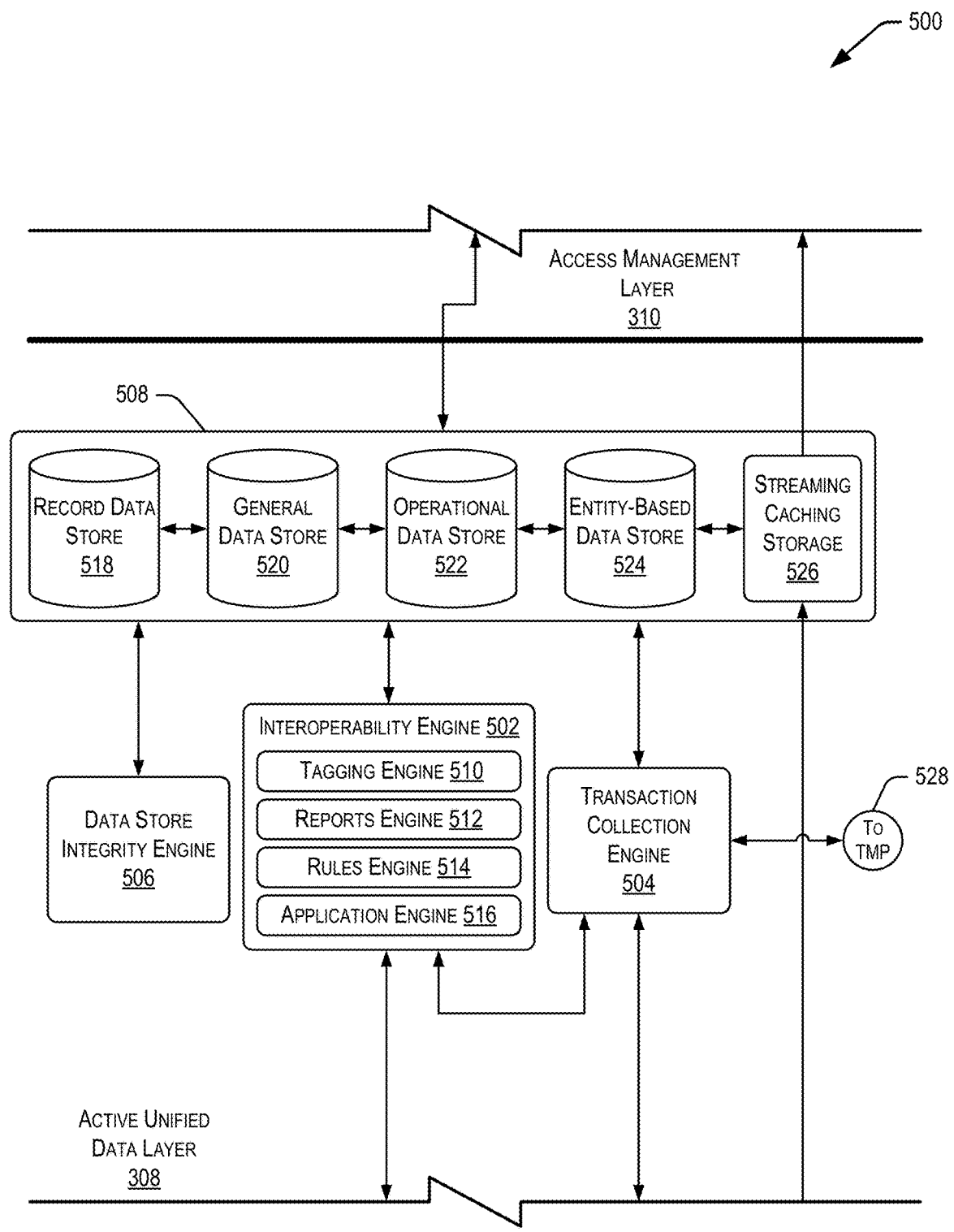
FIG. 5 illustrates a block diagram of a portion of the architecture stack, in accordance with embodiments of the present disclosure.

Referring next to FIG. 5, a diagram 500 is shown that depicts a portion of architecture stack 300 according to an embodiment of the present disclosure. In particular, diagram 500 may include active unified data layer 308 and a portion of access control layer 310. Active unified data layer 308, as illustrated in diagram 500, may include an interoperability engine 502 (e.g., interoperability engine 220), a interaction control collection engine 504, a data store integrity engine 506, and a data store 508 (e.g., data store 226). Generally, interoperability engine 502 receives data from elements within aggregation layer 304 (e.g., from aggregation engine 420) and performs one or more operations with respect to the data. Interoperability engine 502 also facilitates storage of at least a portion of the processed information in data store 508.

Interaction control collection engine 504 is implemented as part of control engine 104. Interaction control collection engine 504 is configured to generate message indicators identifying flows of data by and between elements of an interaction system implemented using the techniques described herein. The flows of information include messages which include data, and the message indicators include unique message identifiers that may be used to identify the messages. The unique message identifiers include information that may be used for unique identification of the messages. For example, a unique message identifier for a particular message may include a concatenation of the following information stored in a table: a source application, a premises, a message type, and a message control identification (ID). The unique message identifier may also be the message control ID. The unique message identifier may be created as messages including data are transmitted from aggregation layer 304. The table may be stored in association with the interaction control platform 528.

In some examples, the table also may include information for tracking the progress of the message from an origination node to a destination node. For example, typically when a message (e.g., any communication of data) is first received by transformative processing engine 102 (e.g., interoperability engine 502), control engine 104 (e.g., interaction control collection engine 504 of control engine 104) may generate a unique identifier for the message in order to track that message as it moves throughout the interaction system. The unique identifier may be included in the header of the message such that when the next node (e.g., component, device, server, etc.) after transformative processing engine 102 receives the message, that node may report back to control engine 104 that it saw the message. In this manner, control engine 104 may enable end-to-end tracking of messages for the life of the message.

In one example, the messages are requests. The requests may be generated based om input at one of the components. The requests may be received by transformative processing engine 102 and integrated into the system. In some examples, control engine 104 may be notified that the requests have been received and may therefore be configured to generate message IDs for each request. These message IDs may then be associated with each of the requests. As the requests continue to move throughout the interaction system (e.g., away from transformative processing engine 102), control engine 104 may be track their movement using the message IDs. If one of the requests does not make it to its destination, control engine 104 (or part of the interaction control platform 528) may determine why the request was stopped. In some examples, this cause may be hardware related (e.g., an unplugged Ethernet cable, a broken router, etc.), software related (e.g., a router routing to the wrong location), or any other reason for orders not arriving at their correct destination.

In some examples, control engine 104 (e.g., interaction control collection engine 504 of control engine 104) may receive the message and/or message identifier directly from one of components 410-418. For example, one of components 410-416 may be configured to generate the unique message identifier and/or communicate directly with control engine 104. The message also may travel via one or more intermediate nodes on its way to the destination node. In some examples, a node is a component such as components 410-418, which may be running an application. In some examples, the unique identifier and the routing of the message to its destination may be stored in a table that also may include: a geolocation of each node, a network from which the message originated, a type of node, the unique node identifier, and a time associated with the message leaving the origination node. In some examples, interaction control collection engine 504 provides unique message identifiers to other elements of the interaction system to monitor the messages as they move throughout the interaction system. Interaction control collection engine 504 also provides a portion of the unique message identifiers to an interaction control platform (indicated by a circle 528) for further analysis of the message identifiers. Such analysis may include reconciliation of lost messages, latency reporting, audit control and compliance, and other such analyses. As mentioned previously, the interoperability engine 502 may be configured to store data in the data store 508. A plurality of sub-engines 510-516 of the interoperability engine 502 may be configured to perform operations relating to storing data in the data store 508.

Interoperability engine 502 may include a tagging engine 510 configured to perform semantic tagging and indexing of data. Tagging engine 510 therefore is configured to receive data, read metadata associated with the data, semantically scan the content of the data, and associate one or more tags with the data. Tagging engine 510 may therefore have access to hundreds, thousands, or even more possible tags. These tags may have been input by users, learned, pre-defined, generated by eternal mapping sources, and/or gathered from other components and/or data stores of the interaction system. For example, if the data is a chart for an entity, the tagging engine may be configured to read any metadata associated with the chart to determine which tags may be appropriate to associate with the chart. From the metadata, tagging engine 510 may determine that the chart is for a type of entity by reading metadata indicating that an author field is populated with the name of another particular type of entity. Tagging engine 510 may have access to other data to compare the analyzed metadata against. Other examples, of metadata that may be included in one or more fields include author, document type, creation time, last update time, upload time and data, geographic location, unique ID associated with the client or premises where the data originated, and other similar fields. The tags may be stored in association with the data (e.g., the chart) and/or may be stored independent from the data but include an identifier such that when searching tags the data may be capable of population.

Continuing with the example from above, if the data is a chart for a first type of entity, tagging engine 510 may be configured to read the content of the chart to determine which tags may be appropriate to associate with the chart. For example, this may comprise analyzing the content of the chart (i.e., individual pages) semantically to look for artifacts (e.g., keywords, phrases, and the like) in the content. These artifacts may be identified by tagging engine 510 and used to decide which tags to associate with the document. In some examples, semantic scanning may include filtering out words (e.g., articles, such as "a" and "the"), phrases, and the like. Similar to the reading of metadata, the tags may be pre-defined, user-defined, learned, and the like. In some examples, reading metadata associated with messages may provide meaning and/or give context to the particular record of data. This meaning and/or context may assist tagging engine 510 to determine one or more tags to associate with the data. The tags may be chosen, for example, based on values of particular fields in the data, detecting a frequency of one or more words in a document or metadata and/or of a set of related words. In this manner, tagging engine 510 may also index portions of the data within one or more data stores of data store 508. In some examples, such indexing may be based in part on the selected tags.

Interoperability engine 502 also may include a reports engine 512 configured to generate one or more reports or alerts based on data. For example, reports engine 512 may generate reports when certain types of data are received or when data with certain characteristics is received. Reports engine 512 may also generate alerts. The reports and/or alerts generated by reports engine 512 may be outputted in the form of one or more communications to an administrator, an authorized user, or other similar user via a user device. Such communications may include, for example, signals, sirens, electronic notifications, popups, emails, text messages, and the like. Content of such communications may include information characterizing a performance metric, efficiency and/or outcomes; identifying concerning patterns; identifying losses of data; and the like. In some examples, the content is presented in the form of one or more documents, tables, figures, charts, graphs, and the like.

Interoperability engine 502 also may include a rules engine 514 configured to create and control operational rules, condition-response rules, alert/reports rules, data-formatting rules, data-sharing rules, transmission rules, aggregation rules, user authorization rules, and other similar rules. Such rules may be user-defined, fixed, learned by elements of the interaction system, and any combination of the foregoing. Finally, interoperability engine 502 may include an application engine 516 configured to provide service-oriented architecture web services.

Data store 508 may include an electronic/digital record information data store 518 ("record data store 518"), a general data store 520, an operational data store 522, an entity-based data store 524, and a streaming caching storage 526. While data store 508 is illustrated as including a fixed number of data stores and storage elements, it is understood that data store 508 may include any suitable number of data stores and storage elements, including more than illustrated or less than illustrated.

In some examples, a data query script is provided to query a first data store and/or to obtain data for populating a data store. Such script could query a data store described herein (e.g., data store 508) and/or could be used to obtain data to populate a data store described herein (e.g., data store 508). In one instance, the script is configured to be repeatedly executed, so as to repeatedly draw data from a source data store. The retrieved data may then be formatted, filtered, sorted and/or processed and then stored, presented and/or otherwise used. In this manner, the script may be used to produce streaming analytics.

In some instances, the data query script, when executed, identifies each of the data stores of interest. Identifying the data stores of interest may include identifying at least a portion of data from the data stores simultaneously and/or sequentially. For example, the script may identify corresponding data stores (e.g., or components of a single data store or multiple data stores) that pertain to one or more similar variables but that differ in one or more other variables. Once the portion of the data from the data stores is identified, a representation of the identified data may be output to one or more files (e.g., Extensible Markup Language (XML) files) and/or in one or more formats. Such outputs may then be used to access the data within one or more relational database accessible using Structured Query Language (SQL). Queries made using SQL may be made sequentially or in parallel. Results from an SQL query may be stored in a separate database or in an XML file that may be updated either in part or as a whole. The data query script may be executed periodically, in accordance with a user-defined rule, in accordance with a machine-defined or machine-learned rule, and in other suitable manner.

Within record data store 518 is retained data including electronic record information. In some examples, the information within record data store 518 is organized according to entity identifying information. Thus, record data store 518, in some examples, may include individually identifiable information. But it may also include de-identified information.

Within general data store 520 is retained data. The data may be stored in a relational database format or in any other suitable format. Thus, the data within general data store 520 may be retained in a data structure that may include one or more tables capable of accessing each other. In some examples, general data store 520 may include a subset of the information that is included in operational data store 522.

Within operational data store 522 is retained data in a relational database format. Thus, the data within operational data store 522 may be retained in a data structure that may include one or more data structures (e.g., tables) capable of accessing each other. Operational data store 522 is an example of an operational data warehouse. In operational data store 522 is joined many different types of data. In some examples, the operational data ware house 522 may include data pertaining to decision making as discussed herein and other data typically used by conventional operational concerns.

Within entity-based data store 524 is retained data in a non-relational database format. Thus, the data within entity-based data store 524 may be retained in a structure other than tables. Such structure may be appropriate for large and complex data sets. In some examples, entity-based data store 524 (or any other data store) may be a unified system, which may include: a document-centric, schema-agnostic, structure-aware, clustered, interactional, secure, database server with built-in search and a full suite of application services. An example of such a unified system may be Marklogic. Entity-based data store 524 may support data aggregation, data structuring, data indexing, data tagging and mapping to semantic standards, concept matching, concept extraction, machine learning algorithms, concept discovery, concept mining, and transformation of record information. In some examples, entity-based data store 524 may include data pertaining to decision making (similar to general data store 520) as discussed that is organized and accessed in a different manner. For example, the data within entity-based data store 524 may be optimized for providing and receiving information over one or more information exchanges. In some examples, entity-based data store 524 may include a subset of the information that is included in operational data store 522.

Finally, in some examples, streaming caching storage 526 is a streaming data cache data store. As discussed previously, certain components of components 410-418 may support streaming data to other components or user devices. Streaming caching storage 526 is a location where streaming data may be cached. For example, assume that component 418 is a piece of equipment operating at Location A and that a user using a computer in Location B desires to view a live of substantially live stream of outputs of the piece of equipment. Component 418 may send a portion of data to streaming caching storage 526 which may retain the portion of the data for a certain period of time (e.g., 1 day). Thus, streaming caching storage 526 is configured to cache data that may be streamed.

Diagram 500 also may include data store integrity engine 506. In some examples, data store integrity engine 506 is configured to ensure integrity of the information within data store 508. For example, data store integrity engine 506 applies one or more rules to decide whether information within all or part of data store 508 should be scrubbed, removed, or adjusted. In this manner, confidence is increased that the information within data store 508 is accurate and current.

Figure 6:
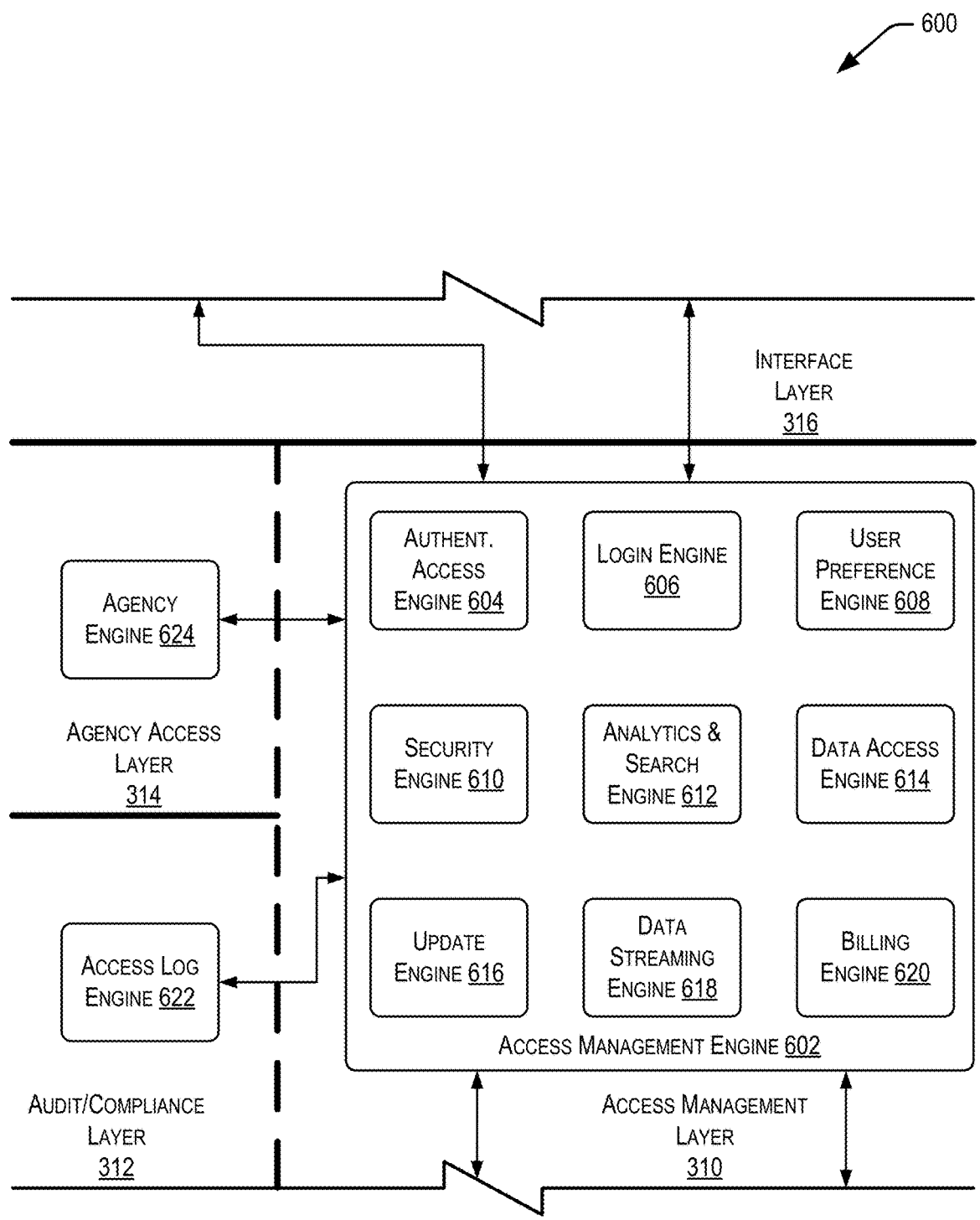
FIG. 6 illustrates a block diagram of a portion of the architecture stack, in accordance with embodiments of the present disclosure.

FIG. 6 shows a diagram 600 which depicts a portion of architecture stack 300 according to an embodiment of the present disclosure. In particular, the diagram 600 may include access control layer 310, audit/compliance layer 312, agency layer 314, and a portion of interface layer 316. Access control layer 310, as illustrated in the diagram 600, may include an access control engine 602. Access control engine 602 is an example of access control engine 222. Generally, access control engine 602 may be configured to control access to elements of transformative engine 202 by different components, applications, and user devices.

Access control engine 602 within access control layer 310 may also provide functionality similar to an operating system. For example, access control engine 602 may include a plurality of engines configured to control different aspects of interacting with elements of the interaction system. For example, a user who desires to access portions of data retained in data store 508, may do so by interacting with access control engine 602 using one or more applications (not shown). Thus, access control engine 602 may include a variety of engines to enable such interaction. The engines include, for example, an authentication access engine 604, a login engine 606, a user preference engine 608, a security engine 610, an analytics and search engine 612, a data access engine 614, an update engine 616, and a streaming data engine 618. The different engines of access control engine 602 may define routines, protocols, standards, and the like for interacting with elements of the interaction system.

Beginning first with authentication access engine 604, authentication access engine 604 evaluates the rules and conditions under which users may access elements of the interaction system; in particular, the conditions under which users may access data within data store 508. These rules and conditions may be user-defined (e.g., by an administrator or reviewer), learned over time, and/or may be dynamically updated and/or evaluated based on characteristics of the user or the user's device attempting to access the interaction system. The rules and conditions may indicate the types of users who have particular types of access within the interaction system. The type of access may also relate to the degree to which data is identified/de-identified. In some examples, a user desiring access to data provides certain identifying information and authentication access engine 604 authenticates an identity of the user.

Login engine 606 evaluates the rules and conditions under which users are able to log in to the interaction system or access applications associated with the interaction system. These rules and conditions may be user-defined (e.g., by an administrator), learned over time, and also may be dynamically updated and/or evaluated based on characteristics of the user or the user's device attempting to access the interaction system. Thus, while authentication access engine 604 evaluates the rules to determine which users may access the interaction system, login engine 606 evaluates the particular credentials, profiles, etc. of the users. For example, login engine 606 may confirm that an entered username (e.g., and password), provided biometric data or code or identifier in a scanned tag or badge matches that in an authorized user data structure.

Login engine 606 evaluates one or more user profiles associated with each authenticated user. In some examples, a user profile may include a username, password, and other information associated with the user. For example, a user profile may indicate characteristics about the user.

User preference engine 608 evaluates the rules and conditions under which user are able to store and update one or more user preferences corresponding to access of the interaction system or access to applications associated with the interaction system. These rules and conditions may be user-defined (e.g., by the user or administrator), and may include rules for default preferences. For example, using user preference engine 608, a user may indicate a format in which the user prefers to receive outputted information, display characteristics of a graphical user interface associated with the user, and other similar user preference settings. For example, the user may indicate that certain types of reports and/or alerts are to be sent to the user.

The security engine 610 evaluates the rules and conditions for ensuring the security of access to the elements of the interaction system. In some examples, these rules and conditions are determined by administrators of the interaction system. In some examples, the security engine 610 provides a plurality of computer virus protection services. These services can be called up and implemented when accessing the interaction system or accessing applications associated with the interaction system. For example, because the interaction system may include sensitive data, the security engine 610 may enforce a domain-based rule that protects certain sensitive information (e.g., identifying information).

Analytics and search engine 612 evaluates the rules and conditions under which users may search for data within the interaction system and access analytics relating to the interaction system. In some examples, these rules and conditions are user-defined or learned over time in accordance with search engine optimization techniques. For example, analytics and search engine 612 is used to search within data store 508 for particular data. Analytics and search engine 612 supports any conventional searching algorithms. For example, search engine 612 may be used to search within various fields and potential field values. In some examples, search engine 612 may provide analytics, such as statistics, graphs, distributions and/or comparative analysis pertaining to particular entities and/or characteristics. Such information may be selected by a user and presented on a user interface.

Data access engine 614 evaluates the rules and conditions under which users may operation in order to access particular data within data store 508. In some examples, these rules and conditions are user-defined or learned over time. For example, data access engine 614 may indicate the routines, subroutines, or other logic needed for an application to access certain portions of data store 508. For example, while authentication access engine 604 and login engine 606 may control which users may access parts of the interaction system, data access engine 614 may control how authenticated users access data within data store 508. To this end, data access engine 614 may enforce and/or evaluate certain rules managing how users access different components of the interaction system. In some examples, data access engine 614 may be used to actually access data within data store 508 (e.g., extract, download, or otherwise access). In some examples, data access engine 614 may define procedures, protocols, and the like for accessing data. The protocols and procedures for accessing data access engine 614 (like the other engines of access control engine 602) may be provided to developers in the form of a software development kit (SDK). SDKs may enable developers write applications that may effectively communicate with elements (e.g., data store 508) of the interaction system. In particular, applications that may access a portion of the data stored within active unified data layer 308.

Update engine 616 evaluates the rules and conditions for providing updates to other engines within access control engine 602, plug-ins for applications that access the interaction system, and for other similar elements of the interaction system. For example, updates may be generated at runtimes, at defined time intervals, upon request by a user, upon receiving a threshold quantity of new or changed data. Once an update is performed, an interface may be refreshed, a report may be sent indicating that the update was successful or unsuccessful, or the like.

Streaming data engine 618 defines the rules and conditions for enabling streaming of data between components and user devices of the interaction system. For example, streaming data engine 618 may enable component 414 to stream data. Streamed data may include live or substantially live audio or video feeds, results of tests, output from equipment or devices, and any other suitable type of data capable of being streamed. In some examples, the data may be streamed to other components or user devices within the network or outside the network. In order to establish a streaming transmission, streaming data engine 618 may identify a streaming destination and a streaming origin. Next, streaming data engine 618 may pair the two and enable streaming. This may include allocated bandwidth within one or more network devices associated with the interaction system. Streaming data engine 618 may also adjust the quality of the streaming data based on the availability of bandwidth. In some examples, streaming data engine 618 may receive incoming streams (and continuously present the stream or monitor for particular data (e.g., exceeding a threshold, exhibiting an above-threshold change, having a particular value)).

Within audit/compliance layer 312 is located an access log engine 622. Access log engine 622 evaluates the rules and conditions for logging access to the interaction system by users, applications, devices, and the like. Logging access may include, in some examples, logging data conventionally collected by access log engines running in similar environments. Access log engine 622 may use this data to generate and transmit reports, for example, to stakeholders of the interaction system such that they may make informed decisions regarding that is accessing the interaction system and for what purposes.

Within agency layer 314 is located an agency engine 624. Agency engine 624 evaluates the rules and conditions under which agencies may access the interaction system. For example, agencies that may use agency engine 624 include agencies to which the interaction system provides compliance, tracking, or other reporting information. For example, agency engine 624 may be used to track one or more performance indicators identified by an agency and/or to provide report instances of defined types of events. Thus, in some examples, an agency uses agency engine 624 to collect data pertaining to compliance of the interaction system with one or more statutes or regulations. In some examples, agency engine 624 may identify one or more entities (e.g., agencies) that are to receive reports pertaining to operations or events and what types of data are to be reported to those entities. Agency engine 624 may then collect the pertinent data, potentially format and/or analyze the data, and facilitate transmission of (e.g., raw, formatted and/or analysis of) the data to the appropriate agency.

Figure 7:
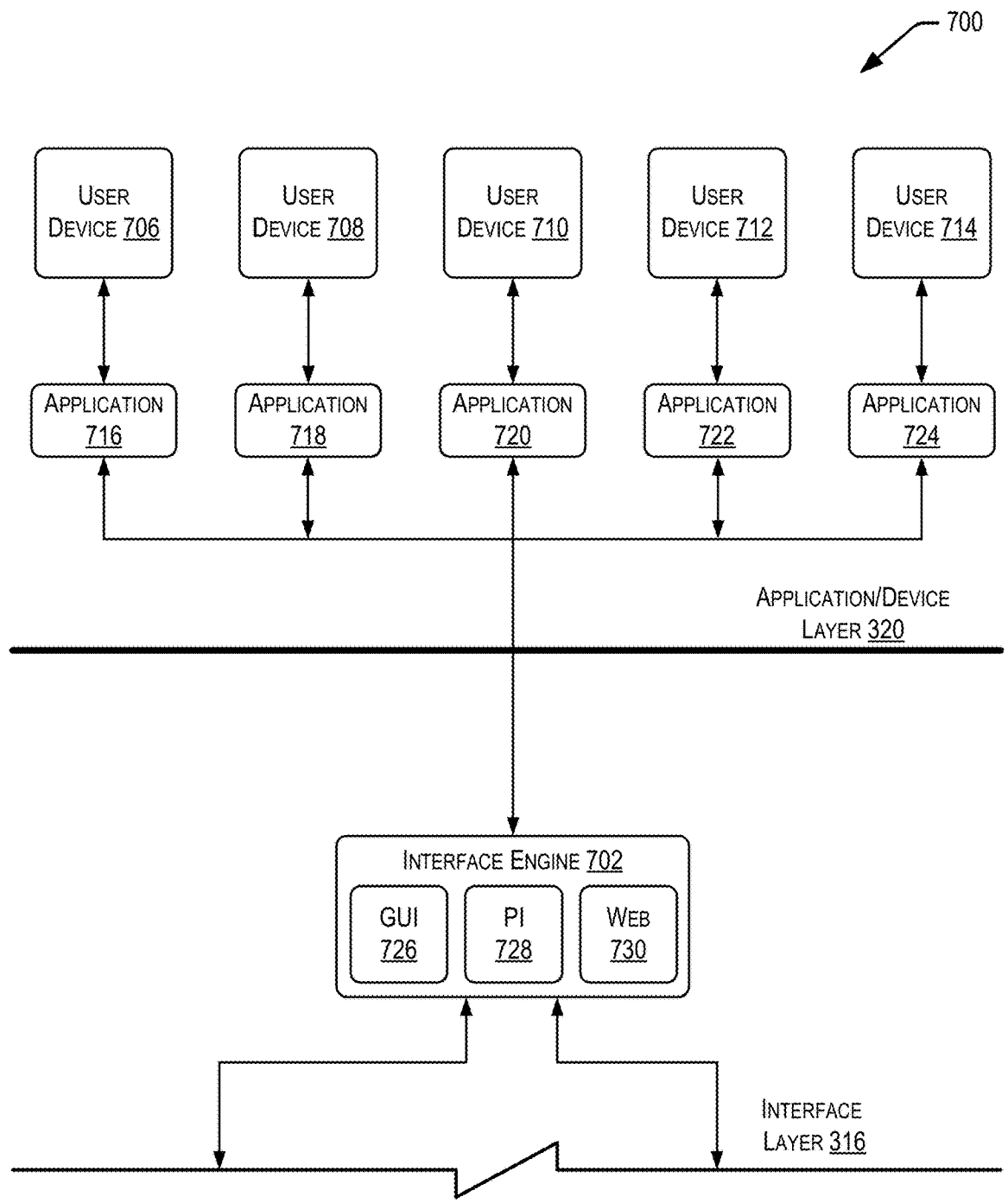
FIG. 7 illustrates a block diagram of a portion of the architecture stack, in accordance with embodiments of the present disclosure.

FIG. 7 shows a diagram 700 which depicts a portion of architecture stack 300 according to an embodiment of the present disclosure. In particular, diagram 700 may include interface layer 316, and application/device layer 320. Within interface layer 316 is located interface engine 702 (e.g., interface engine 224). Interface engine 702 is configured to generate one or more interfaces (e.g., graphical user interface 726, programmatic interface 728, and/or web interface 730) to enable data to flow to user devices 710, 712, and 714 via respective applications 720, 722, and 724. In some examples, the interfaces of interface engine 702 are embodied in hardware, software, or some combination of both. Within interface layer 316 communications and inputs directed to interacting with elements of access control layer 310 may be embodied.

Graphical user interface 726 is any suitable graphical user interface configured to interact with elements of the interaction system. Programmatic interface 728 may include an application programming interface, a programmatic user interface, and other similar interfaces for defining core functions for accessing elements of the interaction system. For example, programmatic interface 728 may specify software components in terms of their operations. Web interface 730 is any suitable web interface configured to interact with elements of the interaction system. Any of the interfaces described herein may be configured to receive input, present dynamic presentations that depend on input, and otherwise respond to input. In some examples, such input may be provided via one or more input devices (e.g., a keyboard, touchscreen, joystick, mouse, microphone, devices capable of capturing inputs, and the like) operated by one or more users of user devices 706-714. Output may be provided via one or more output devices (e.g., a display or speaker).

Interface engine 702 is utilized by applications internal to the interaction system and external to the interaction system to access data. In some examples, the applications that are internal include applications that are developed for internal use by various entities associated with the interaction system. In some examples, the applications that are external to the interaction system include applications that are developed for external use by those that are not associated with the interaction system.

Generally, within application/device layer 320, applications 716-724 which communicate with other elements of architecture stack 300 using the interfaces generated by interface engine 702 are defined. This may include detailing how applications 716-724 are to interact with the interfaces generated by interface engine 702 for accessing data. For example, interacting may include accepting inputs at user devices 706-714 to access data and, in response, providing the data, prompts, or other types of interaction with one or more users of the user devices 716-714. Thus, applications 716-724 may be related to one or more of the interfaces generated by interface engine 702. For example, application 720 may be interact with a graphical user interface (whether generated by interface engine 702 or otherwise) to interact with other elements of the interaction system. Interacting may include receiving inputs at the graphical user interface via application 720, providing output data to the graphical user interface application 720, enabling interaction with other user devices, other applications, and other elements of the interaction system, and the like. For example, some of the inputs may pertain to aggregation of data. These inputs may include, for example, types of data to aggregate, aggregation parameters, filters of interested data, keywords of interested data, selections of particular data, inputs relating to presentation of the data on the graphical user interface, and the like. Providing output data may include providing the aggregated data on the graphical user interface, outputting the information to one of the other user devices 706-714 running one of the other applications 716-724.

Turning now to the details of applications 720, 722, and 724. In some examples, applications 720, 722, and 724 include a variety of different applications that may be designed for particular users and/or uses. In one example, application 720 may include dashboards, widgets, windows, icons, and the like that are adapted for an particular entity. In some examples, application 720 may present different data depending on a specialty associated with the entity and protected information associated with the entity. In this manner, application 720 adapts and automatically adjusts depending on the context in which the entity is using the application. In some examples, the data indicates performance statistics for the entity, metrics relating to where the entity falls along a distribution of other similar entities, outlier instances, trends in events or operations, and the like. Application 720 may be configured to receive input, adjust presentations, present unprompted alerts, adjust display of content, move more relevant content to the foreground, move less relevant content to the background, populate forms for the entity.

In another example, application 722 may be specific for resources or types of resources. In this example, application 722 may include dashboards, widgets, windows, icons, and the like that are adapted to individual resources. Similar to the example discussed above, in some examples, application 724 may present different data depending on a position of the resource. In this manner, application 722 adapts and automatically adjusts depending on the context in which the application is being used. For example, the resource may receive data, such as test results. In some examples, the application 722 (or any other application) may be configured to operate on a mobile device.

In some examples, application 724 may be a multi-role application for administrators and is used to control entities constitute the population of the entities within the interaction system. Similar to the other examples discussed, in some examples, application 724 may present different data depending on a role of the user who is using application 724. In this manner, application 724 adapts and automatically adjusts depending on characteristics of the user who is using application 724. In this manner, application 724 may provide different data depending on the role of the user. For example, whether data presented may include identifiable or de-identified information may depend on a position of the user.

In some examples, application 724 may be an operational intelligence application. In this example, application 724 is used to display operational information generated by components of the interaction system. This operational information may be used for operations, programming, and predictive modeling. Such operational information may include data because such data may impact operations, programming, predictive modeling, and the like. Accordingly, application 724 may present de-identified information in the form of one or more metrics, indicators, or the like as they pertain to operational intelligence.

Applications 716 and 718 shown in connection with interface engine 702 are applications developed by third-parties. In some examples, such applications include any suitable application that benefits from accessing data. The interaction system may include data pertaining to hundreds of thousands of entities. Having data pertaining to so many entities presents security concerns. For example, much of the data may be identifying data. Accordingly, data that may be accessed by applications 716 and 718 may be limited. In some examples, an entity of the interaction system may use one of applications 716, 718 to access his or her own data. In this example, the identity of the entity may be verified in accordance with techniques described herein.

User devices 706-714 are any suitable user devices capable of running applications 716-724. User devices 706-714 are examples of the user device 228. In some examples, the user devices include: mobile phones, tablet computers, laptop computers, wearable mobile devices, desktop computers, set-top boxes, pagers, and other similar user devices. In some examples, at least some of user devices 706-714 are the same devices as at least some of the one or more components 410-418. In some examples, user devices 706-714 may include complementary layers to application/device layer 320 and/or receiving layer 302. For example, user devices 706-714 may include a transmission layer, a generation layer, and/or a receiving layer to communicate data at application/device layer 320 and at receiving layer 302.

Figure 8:
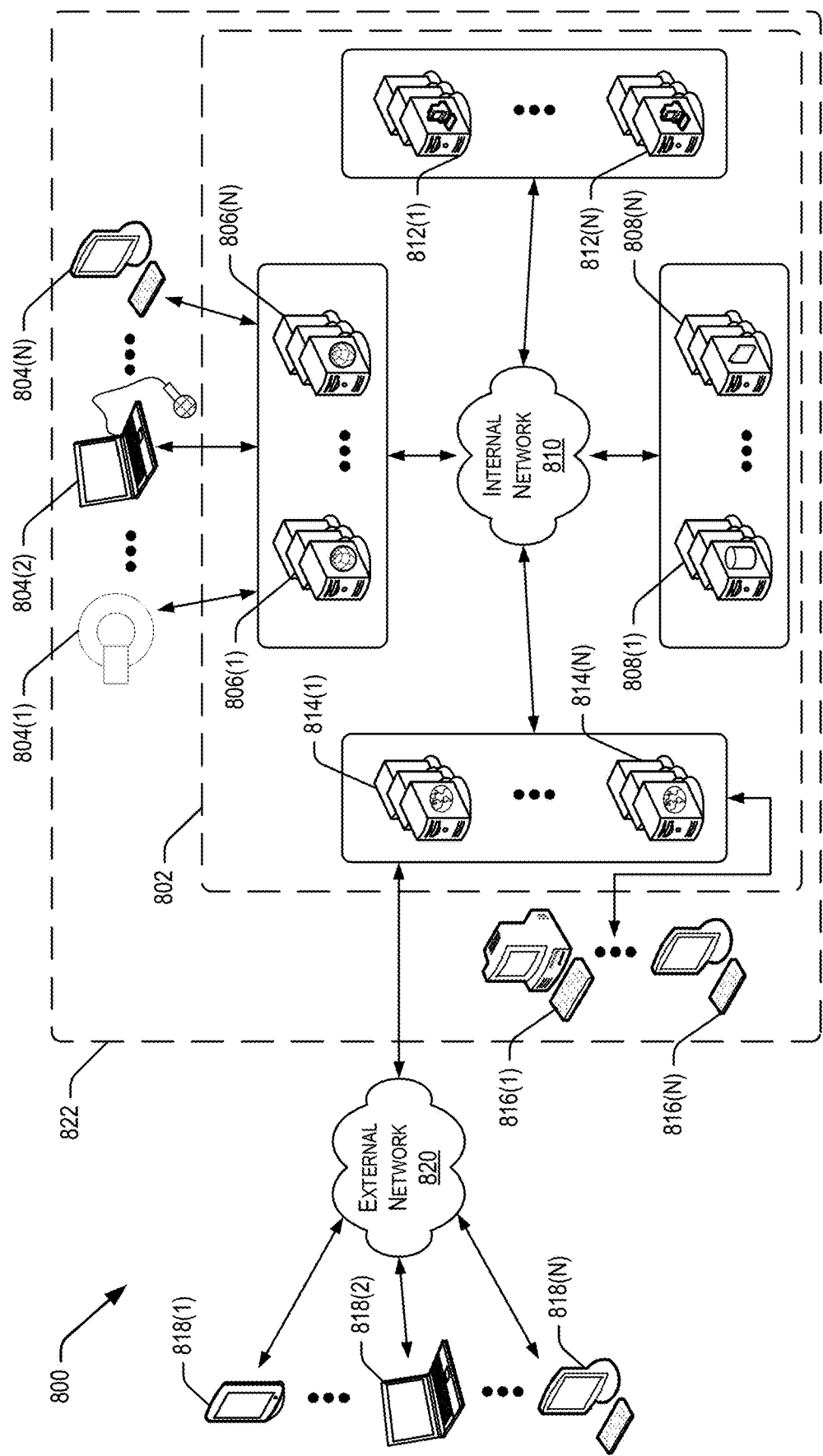
FIG. 8 illustrates an example schematic architecture of the interaction system, in accordance with embodiments of the present disclosure.

Turning now to FIG. 8, an interaction system 800 is shown in accordance with embodiments of the present disclosure. Interaction system 800 may correspond to interaction systems 100, 200 and may include an internal system 822 including a transformative engine 802. The transformative engine 802 is an example of transformative engine 202 previously discussed. Interaction system 800 is illustrated as an example configuration for implementing the techniques described herein. In particular, a configuration of elements as illustrated in FIG. 8, at least in some examples, communicates according to the layers of architecture stack 300. For example, internal system 822 may include generation components 804(1), 804(2), and 804(N) which provide data to aggregation servers 806(1)-806(N).

Generation components 804(1), 804(2), and 804(N) operate in accordance with receiving layer 302. In some examples, generation component 804(1) is a piece of equipment, generation component 804(2) is computer with a data collection device, a type of lab system, and generation component 804(N) is a terminal. Aggregation servers 806(1)-806(N) operate in accordance with aggregation layer 304. Aggregation servers 806(1)-806(N) share data with data storage servers 808(1)-808(N) via one or more internal network(s) 810 that may correspond at least in part to the one or more network that may correspond at least in part to the one or more networks 120. In some examples, internal network 810 is any suitable network capable of handling transmission of data. For example, internal network 810 may be any suitable combination of wired or wireless networks. In some examples, internal network 810 may include one or more secure networks. Data storage servers 808(1)-808(N) are configured to store data in accordance with active unified data layer 308. Data storage servers 808(1)-808(N) include database servers, file storage servers, and other similar data storage servers.

Access control servers 812(1)-812(N) control access to the data retained in the data storage servers 808(1)-808(N). Access control servers 812(1)-812(N) communicate with the other elements of interaction system 800 via internal network 810 and in accordance with access control layer 310. Interface servers 814(1)-814(N) provide one or more interfaces applications to interact with the other elements of interaction system 800. Interface servers 814(1)-814(N) provide the one or more interfaces and communicate with the other elements of interaction system 800 via internal network 810 and in accordance with interface layer 316. The interfaces generated by the interface servers 814(1)-814(N) may be used by internal user devices 816(1)-816(N) and external user devices 818(1), 818(2), and 818(N) to interact with elements of interaction system 800.

Internal user devices 816(1)-816(N) are examples of user devices 706-714. In some examples, internal user devices 816(1)-816(N) run applications via the interfaces generated by interface servers 814(1)-814(N). As an additional example, external user devices 818(1), 818(2), and 818(N) may run applications developed by third parties that access the other elements of interaction system 800 via the interfaces generated by interface servers 814(1)-814(N).

External user devices 818(1), 818(2), and 818(N) access the interfaces via external network 820 that may correspond at least in part to the one or more networks 120. In some examples, external network 820 is an unsecured network such as the Internet. External user devices 818(1), 818(2), and 818(N) are examples of user devices 706-714. External user device 818(1) is a mobile device. In some examples, the mobile device may be configured to run an application to access interaction system 800. Similarly, the other external user devices 818(2)-818(N) run applications that enable them to access interaction system 800. While interaction system 800 is shown as implemented using discrete servers, it is understood that it may be implemented using virtual computing resources and/or in a web-based environment.

The systems, environments, devices, components, models, and the like of FIGS. 1-8 may be at least partially used to provide a singular, unifying platform for managing resources and subsystems of federated resources with the system 101. The following figures further illustrate various aspects of such a platform.

Figure 9:
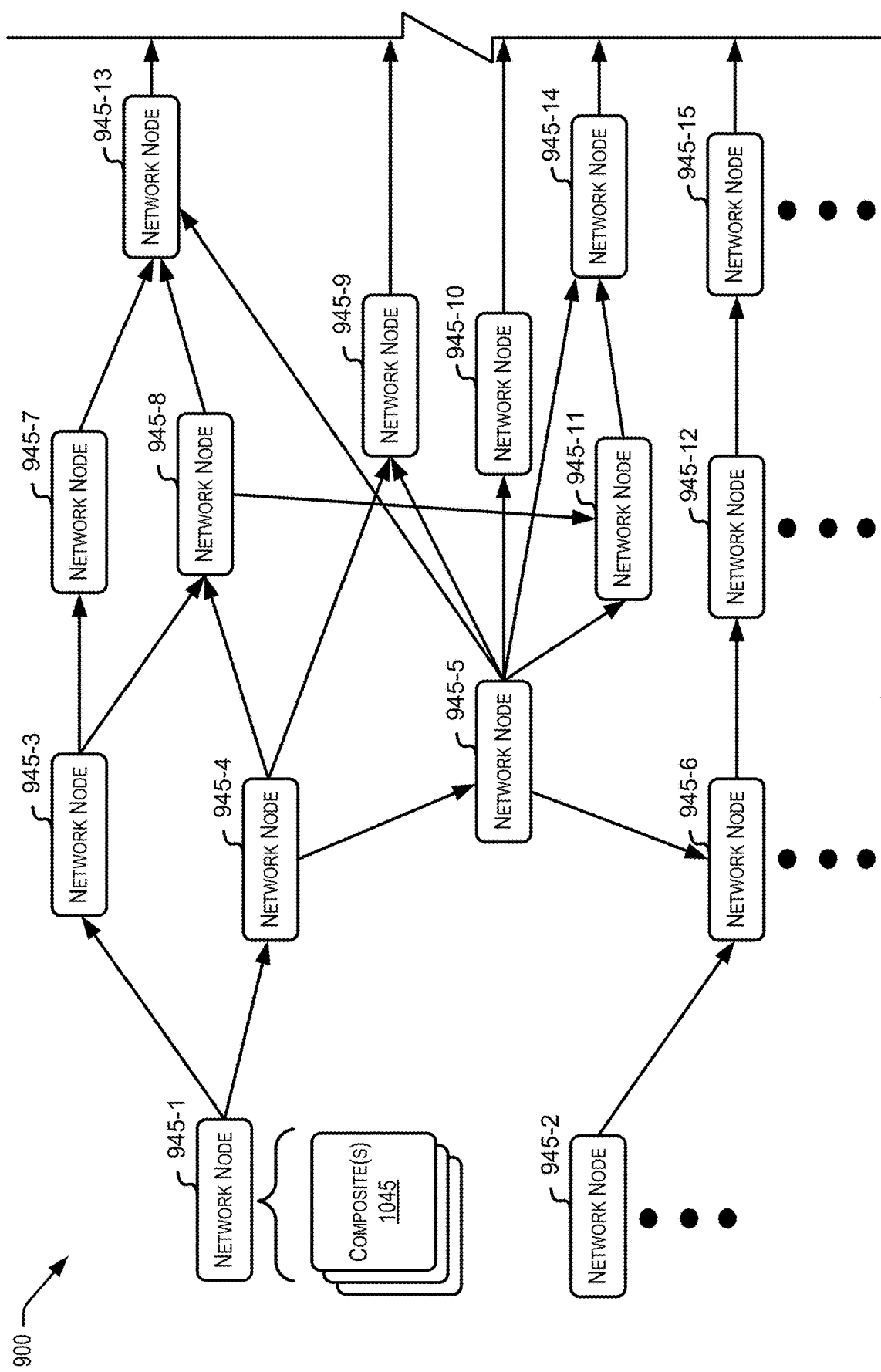
FIG. 9 illustrates a node network, in accordance with embodiments of the present disclosure.

FIG. 9 illustrates a node network 900, in accordance with disclosed embodiments of the present disclosure. Disclosed embodiments of the system 101 may implement adaptive creation and adaptation of a network of nodes 900 corresponding to the interaction system with a number of customization and adaptation features disclosed herein. Each node 945 may correspond to one or a combination of one or more resource assignments, roles, positions, units, locations, facilities, and/or the like.

Disclosed embodiments of the system 101 may solve the problem of the many, different descriptions, and criteria for assigned processes and roles. The system 101 may harvest data to derive and develop indicia of node specifications from many different sites, to learn the different nodes 945 and corresponding specifications and how to match at least some of the different node specifications to one or more network nodes 945, consolidate the node specifications, and use the consolidated node specifications to create, augment, and/or evolve the network node specifications linked to each network node 945. Disclosed embodiments of the system 101 may adaptively map the different positions, roles, specialties, etc. to nodes 945 of the network 900 in order to facilitate other features of the platform. The mapping may include harvesting and cleaning up data from data feeds from multiple sources, matching and consolidating the data to network nodes 945, augmenting the data with other types of data to facilitate other features disclosed herein, and evolving the data nodes 945 over time to adapt to real-world changes. The mapping may provide for normalization and standardized criteria to differentiate roles, subsystems, specialties, locations, and/or the like. Thus, although some substantially similar or equivalent assigned processes and roles may differ in titles and descriptions, the system 101 may match the assigned processes and roles and link the assigned processes and roles to common nodes 945 based at least in part on detecting commonalities in one or a combination of roles, assignments, operations, specialties, positions, and/or the like.

The node network may 900 include a plurality of composites 1045 corresponding to nodes 945 of the node network 900, with one or more composites 1045 corresponding to each node 945. In various embodiments, the composites 1045 may include content object aggregations and node specifications. The content aggregation may include a grouping of content including one or more presentation portions that can be provided to a user as in the examples disclosed further herein. The content aggregation may include linked and/or consolidated data from a plurality of data sources, which data may be used for analysis and other features disclosed herein. As disclosed further herein, in order to link the data, data elements of a data record may be examined for characteristics that may be shared with data elements of other data records. Content objects having data elements with similar or shared characteristics may be stored in a composite data structure and linked together in the network of nodes 900.

The linked composites 1045 may be exposed via an orchestration interface to users as the network of nodes 900 for access/use by the users. The nodes 945 may be accessible in different forms. For example, the network 900 could be presented in graphical form, using user-selectable options, such as hyperlinks, at each illustrated node 945 in order to access the underlying options, content, and data of the composite 1045 at that node 945. Examples are disclosed further herein, such as those with respect to FIG. 15.

Disclosed embodiments may further provide for inter-node path analytics and intra-node analytics. Various subsets of the nodes 945 may be linked together in the node network 900. For example, from the consolidated node specifications, the system 101 may identify attributes of transitional relationships between two or more nodes 945 and create and/or develop transitional links and transitional conditions and/or thresholds, and establish and/or adapt links between two or more network nodes 945 in the network of nodes 900. The system 101 may perform inter-node path analytics and intra-node analytics based on analysis of millions of resource operations, resource histories, system histories, and attributes thereof. The system 101 may recognize and learn patterns to identify and analyze various routes from node 945 to node 945, as well as the various types of attributes of each node 945 that might have led to progression beyond that node 945 (e.g., locations, having a matching resource versus not having a matching resource, measuring and tracking recognitions within a given unit, engagement scores, etc.). Accordingly, the system 101 may learn context-aware node transition patterns for progression between nodes 945. The learning algorithms may differentiate and weight various path between nodes 945, and further recognize and rank the node transitions according to various node transition metrics (e.g., identifying a weighted path of assigned processes that can be taken in order to get to a particular role, the most common paths and assigned processes, the shortest routes, the best routes for particular types of individuals, and/or the like).

Disclosed embodiments may further provide for learning, modeling, and matching resources and nodes 945 in the interaction system. Further, the learning, modeling, and matching resources and nodes 945 in the interaction system may include not only matching resources to current nodes that currently correspond to the resources, but also matching resources to past nodes from which the resources have advanced. Such features may facilitate disclosed embodiments that provide for matching resource learning, modeling, and matching resources with resources and nodes.

The system 101 may harvest and clean up data from data feeds from the multiple sources and consolidate the data in order to learn and model resources. The modeling may include developing resource profiles that include chronicles of individual resource histories, characterizations and classifications, and resource metrics (e.g., locations, operation performance metrics, etc.). The modeling may include developing matching resource profiles. The modeling may take into account resource profiles of matching resources and may employ matching algorithms to match matching resources based on criteria such as roles, track records, profiles, past node progression, location, matching resource selections, feedback from matching resources, etc.

Disclosed embodiments may further provide for performance tracking and modeling. The system 101 may track resource performance of operations that bear on resource competency. The system 101 may track operation performance from resource self-reporting input and by gathering usage data regarding usage of control equipment, sensor data regarding equipment usage and resource locations, load record data, auto-tracking of training, etc. The system 101 may be receive updates regarding training. Likewise, the system 101 may also track load metrics for comparison. All this data may be collected, aggregated, consolidated, transformed, and/or modeled by the system 101 in order to identify meaningful patterns and relationships of resource operations, resource performance, load conditions, and the like.

Tagging schema may be employed to facilitate the learning and modeling. As part of learning and modeling individual resources, the system 101 may map each resource to a particular node in the network as a basis for providing other features (e.g., features directed to helping the resource progress to other nodes 945 in the network 900). The system 101 may include feedback loops to allow for correction by each individual resource and/or others in an administrative role, and, based on the feedback, the learning algorithms may adapt and improve over time.

Disclosed embodiments may provide for node progression modeling and guidance for individual resources. Based at least in part on the node path and intra-node analytics, the system 101 may provide node progression modeling and guidance for individual resources based at least in part on the current resource models and profiles, as well as resource input. A resource can select a node 945 as a target node, and the system 101 may analyze the resource's profile to determine a number of performance tests and targets for the resource. For example, the system 101 may identify for the resource the most common route to get to the target node 945; the shortest route to get to the target node 945; feedback needed by the resource for each node 945 along the way; which training is influential in higher transit rates along the various paths to the target node 945; and/or the like. The system 101 may provide selective analysis into how others have moved and/or progressed toward a target node 945, how long it took to get from one particular node 945 to another particular node along the path, timing, biasing factors, etc. The system 101 may perform predictive modeling, so that a resource can program backwards from a target node 945. Further, the system 101 may identify next steps for the particular resource steps they can take in their current position (i.e., intra-node steps) and opportunities for other nodes 945 (i.e., assigned processes that are available and fit to the resource and the selected path).

Disclosed embodiments may provide for resource assignment and orchestration interface. The platform may provide a resource's assignment and orchestration interface to allow for global access (e.g., administrator access) to the analytics, models, visualizations, profiles, and node network in order to facilitate resource assignment. The orchestration interface may allow for assignments, transfers, and the like of particular resources in view of the various types of information presented. For example, the orchestration interface may allow for node-based visibility into various levels, for example, to have visibility into node-level minimum performance thresholds, patterns, trends, metrics, rates of change and progressions, identification of various categories of resources and the like. The various types of data may be presented in a renderable way. System-generated suggestions for specific resources (e.g., paths, transfers, matching resources, etc.) may be viewed, modify, rejected, or approved.

Further, the system 101, which may include a process performance control and management system, may allow role-based access with respect to various subsystems of resources and/or various sets of resources. The role-based access may provide visibility into node metrics and competency metrics, including performance metrics of particular resources and subsystem-level (e.g., unit-level) performance metrics of particular resource subsystems (e.g., subsets and sets of federated resources that may correspond to one or more resource units). Performance metrics may include process metrics such as key process indicators (e.g., operational efficiency metrics, and/or the like), rates of changes in performance metrics, rankings of resources and resources sets, and/or the like. Node metrics may include node performance metrics corresponding to competency metrics mapped to particular nodes 945; node-to-node transition/flow metrics including node 945 changes such as node state changes with respect to allocations of resources to particular nodes 945, transitions of resources between different nodes 945, time accrued by particular resources mapped to each node; and/or the like. The node metrics for a particular network node 945 may be linked to performance metrics for resources mapped to the particular network node 945.

The system 101 may track and model resource competency, including process performance as process operations are completed, and network node transitions as the transitions occur. As part of such tracking and modeling, the system 101 may correlate detected, aggregated, consolidated, and differentiated process performance data (which may include, for example, time-stamped recorded data stored by the application) with load record data (e.g., load record data) and may include guided decision support for defining effective process specifications for like resource sets. Disclosed embodiments may further provide for competency analytics and targets. The system 101 may analyze the performance metrics, load metrics, and resource profiles in view of the node network 900. The machine learning may recognize and adapt to evolving standards of minimum performance thresholds for various nodes 945, and identify the minimum performance thresholds needed for each node 945. A resource's profile, including competency profile, may be compared to those of other resources in similar nodes/roles. Deficiencies, solutions, proficiencies, and next adaptations can be identified for each resource for each node 945 (i.e., the resource's current node 945 and other nodes 945 along a prospective path of progression) and can be reported to the resource with targets for an program including next steps.

Disclosed embodiments may provide for pathway adaptation and guidance. The machine learning and artificial intelligence may be amorphous over time in order to adapt to resource pathway selections, resource pathway progressions, and tracked changes path directions. As users select their pathway, the system algorithm may learn their selection and use that to better suggest paths to users in the future. Additionally, the system 101 may measure and track which path are most resources directed, and whether and how long they pursue a particular selected path, or whether, when, and under what circumstances they switch after a period of exploration in their roles. Likewise, the system 101 may learn and adapt to internal transfers. Further, the system 101 may learn geo-adaptive pathways that reflect nodes and opportunities that are only available in particular geographic regions, taking into account pathways that are a function of geolocation so that geo-aware modeling and suggestions are provided to the users.

Disclosed embodiments according to the present disclosure may provide technological improvements for tracking performance metrics and node metrics of resource-allocation systems. In various instances, resource-allocation systems may be internal to a premises or external to the premises. Technological improvements may be provided by a multi-tier resource orchestration system (herein referenced as "resource orchestration system") may include a process queuing subsystem configured to coordinate with resource-allocation systems to queue resources to perform specified processes with specified loads.

Figure 10:
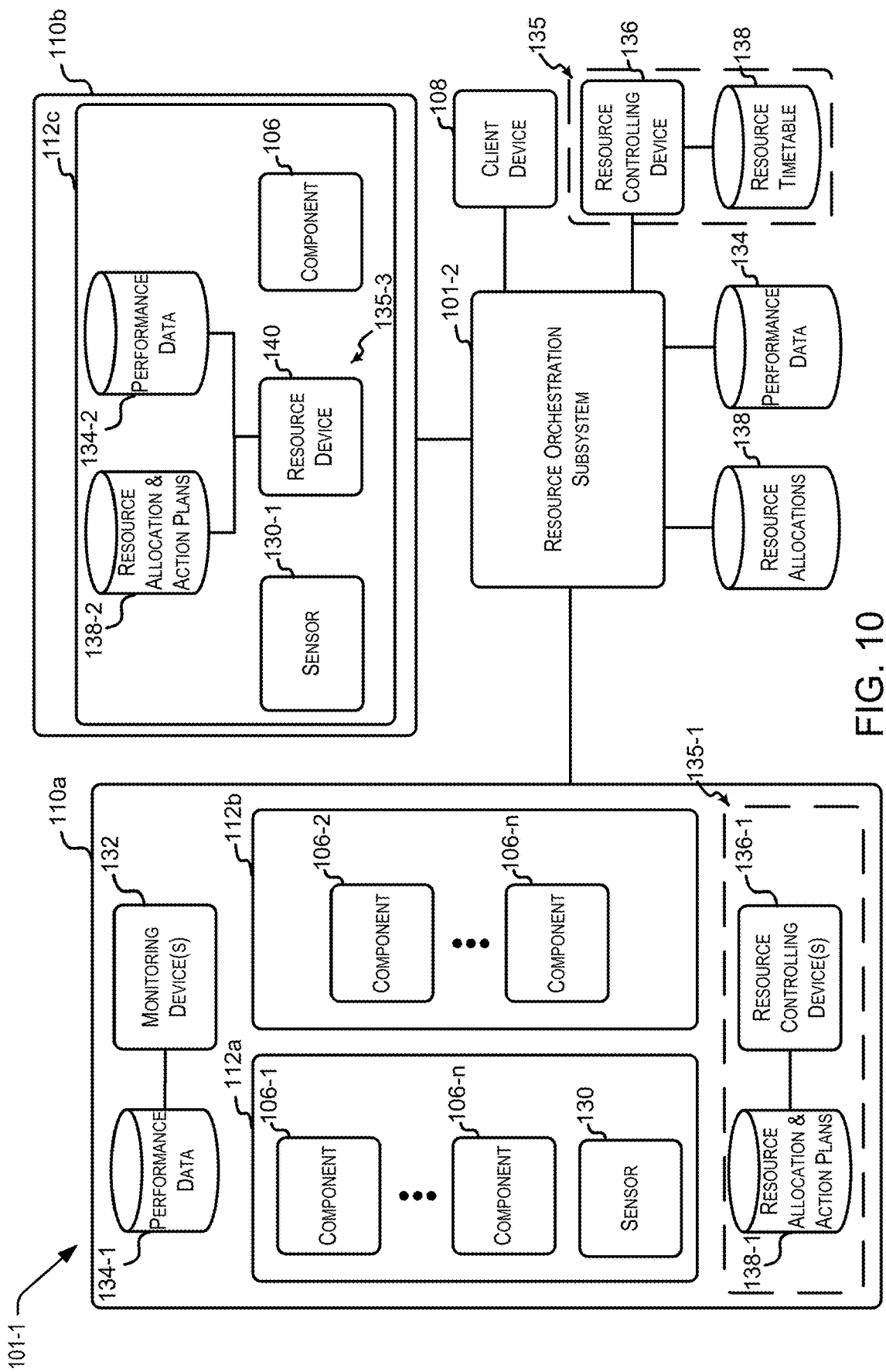
FIG. 10 illustrates a diagram of aspects of a resource orchestration system, in accordance with embodiments of the present disclosure.

FIG. 10 illustrates a block diagram further elaborating on aspects of the system 101-1 of the interaction system 100, in accordance with disclosed embodiments of the present disclosure. The system 101-1 corresponds to a number of technological improvements disclosed herein. The system 101-1 may facilitate and coordinate monitoring of: data indicative of operation performance by one or more resources with respect to loads, and data indicative of one or more nodes corresponding to the one or more resources. For example, the data monitored by the system 101-1 may include one or a combination of usage data corresponding to usage of components 106; sensor data corresponding to sensors detecting component usage, resources, resource operations, resource locations, load states and characteristics, and/or the like; and/or input provided by resources via devices 108 and/or monitoring devices 132. The data monitored by the system 101-1 may be aggregated, consolidated, and analyzed by the system 101-1 to derive the operation performance data and the node data. To derive the operation performance data, the system 101-1 may further retrieve load-specific data for correlation with the monitored data in order to map the monitored data to specific loads. The system 101-1 may map the operation performance data to node specifications of one or more network nodes. The system 101-1 may update one or more performance data stores 134 with derived performance data, and may update one or more resource allocations data stores 138 with the mappings of the operation performance data to the node specifications of the one or more network nodes.

The system 101-1 may further facilitate subsystem operational conformance with respect to protocols with respect to one or more subsystems of resources (e.g., resource units). The protocols (sometimes referenced herein as process protocols) may be, include, or otherwise correspond to process specifications and/or operation specifications. Further, the process protocols may correspond to programs that may be load-specific and/or particular to certain types of loads and/or certain load conditions.

Generally, in the system 101-1, data may be generated and/or collected at one or more of the system components 106, the devices 108, sensors 130, and/or resource allocation subsystems 135. The depicted instance shows two premises 110a, 110b. Other embodiments may include any different number of premises. Each premises 110 can include one or more units 112. In the depicted instance, a first premises 110a includes two units 112a and 112b, and a second premises 110b includes one unit 112c, but various other premises may include different numbers of units. Each unit 112 may correspond to a particular space. Units within a given premises (e.g., 112a and 112b) may be geographically separated from each other. In some instances, each of at least some units 112 within a premises may be of a same or similar type; may be configured for a same or similar type of use and/or may have one or more same or similar specifications or characteristics (e.g., dimensions, sizes, or intra-unit components). In some instances, each of at least some units 112 within a premises may be of different types, may be configured for different types of use and/or may have one or more different specifications or characteristics.

The subsystem 101-2 may be configured to communicate with multiple different sensors 130. Such communication may use various communication standards or protocols. In various embodiments, for example, the sensors 130 can be communicatively connected to and controllable by the subsystem 101-2. Sensors and control units may be coupled and the sensors 130 may be connected in a serial, parallel, star, hierarchical, and/or the like topologies and may communicate to the subsystem 101-2 via one or more serial, bus, or wireless protocols and technologies which may include, for example, WiFi, CAN bus, Bluetooth, I2C bus, ZigBee, Z-Wave and/or the like. For instance, one or more sensors 130 may use a ZigBee® communication protocol while one or more other sensors 130 communicate with the subsystem 101-2 using a Z-Wave® communication protocol. Other forms of wireless communication may be used by sensors 130 and the subsystem 101-2. For instance, one or more sensors 130 and the subsystem 101-2 may be configured to communicate using a wireless local area network, which may use a communication protocol such as 802.11.

Within each unit may be one or more components 106 and/or one or more sensors 130. In various embodiments, a given component 106 and/or sensor 130 may, or may not, be fixed in place (i.e., stationary), restrained to limit mobility or fully movable. In various instances, a component 106 may, for example, correspond to control equipment (e.g., resource-operated equipment) and may be configured to be used by an operator or user. In various embodiments, one or more components 106 and/or one or more sensors 130 may be configured to facilitate detection and tracking of operation performance, which, in turn, facilitates detection and tracking of tracking of overall process performance by resources. Sensor data may be transmitted to the resource orchestration subsystem 101-2 to facilitate the collection of sensor data and the derivation of performance data.

One or more of a sensor 130 and/or a component 102 communicatively coupled thereto may be configured to transmit electronic communications to one or more other electronic devices, which may include transmitting sensor input to the subsystem 101-2 upon trigger events as disclosed herein. The electronic communications may be transmitted to the subsystem 101-2, for example, upon detecting a new type of signal; continuously; at regular times or intervals; upon receiving a request; and/or upon detecting that a transmission condition has been satisfied. The electronic communication may include, for example, sensor-collected data, inputs received at a component, an indication that an event has been detected, an indication that a transmission condition has been satisfied, an identifier of the component or sensor, and/or a location of the component or sensor.

A sensor 130 may include, for example, a sensor configured to monitor a characteristic of an ambient environment (e.g., motion, light, temperature, humidity, etc.). For example, a sensor 130 may detect when an individual enters a particular room. To be more specific, such sensor data may be used by the system 101-1 to detect and confirm whether a resource processing a load, and/or the like in conjunction with other sensor data indicating visits of the resource to other rooms (e.g., a series of visits that the system 101-1 may match to a pattern that corresponds to routines). As another example, a sensor 130 may detect a characteristic of a load such as whether a load has been moved.

One or more sensors 130 may include a fingerprint scanner and/or a different type of biometric scanner for biometric identification, such as a retina scanner that may be used for optical identification. Further, the one or more sensors 130 may include, for example, one or more cameras. The camera can be any device configured to generate image and/or audio data including, for example, still image data, video image data, and/or any sound data, corresponding to detected phenomena. The one or more sensors 130 of different types may include infrared sensors and/or heat sensors. In some embodiments, the camera(s) may include one or more infrared cameras. The camera(s) may, in some embodiments, include infrared sensors. The camera(s) may provide a video and, in some embodiments, an audio stream. Thus, a multiplicity of integrated and/or non-integrated sensors may be configured to capture phenomena in the facilities in order to identify aspects of the proximate environment, to facilitate any one or combination of facial recognition, optical recognition, infrared impressions, voice recognition, heat impressions, gestures, and/or the like.

The various types of biometric sensors 130 may provide sensor data to the subsystem 101-2 to facilitate recognition of particular resources when the resources are in particular areas, operating particular components 106, and/or the like. Again, such sensor data may be used by the subsystem 101-2 to derive performance data. The subsystem 101-2 may analyze the sensor data to develop baseline activity profiles and then detect aberrations with respect to the baselines. Any one or a combination of the detected sensor data, sensed patterns/baselines, detected inconsistencies/nonconformities, and/or composites based thereon can be exposed via one or more client devices and/or the orchestration interface. Moreover, the subsystem 101-2 may use such sensor data to provide customized training for a particular resource in accordance with embodiments disclosed herein.

In some instances, a sensor 130 may be a sensor coupled to a component 106. For example, a sensor 130 may be configured to detect whether an added weight has been placed on part of a component, whether an amount of weight has been removed, and/or whether there has otherwise been a weight change. By way of further example, sensors indicating that a load is being attended to may be used by the subsystem 101-2, in conjunction with other sensor data, to infer an indication of specific operation performance at a certain time with respect with specific load.

As another example, a sensor 130 may be included within an electronic tag reader component so as to detect electronic tag signals (e.g., a RFID signal, RuBee signal) from the electronic tag/transponder, which may be excited by signal emitted from an antenna of the electronic tag reader component. As yet another example, a sensor 130 may be included within an equipment-tracking component so as to detect equipment tags. As still another example, a sensor 130 may include a receiver to receive signals from one or more signal sources (e.g., GPS satellites or Wi-Fi access points) to enable identifying a location of a device coupled to or including the sensor.

A component 106 and/or sensor 130 may be configured to transmit electronic communications to one or more other electronic devices. The electronic communications may be transmitted, for example, upon detecting a new type of signal (e.g., detecting a presence of a new device); at regular times or intervals; upon receiving a request; and/or upon detecting that a transmission condition has been satisfied. The electronic communication may be transmitted to a device that may be near or remote from the component and/or sensor. The electronic communication may include (for example) sensor-collected data, inputs received at a component, an indication that an event has been detected, an indication that a transmission condition has been satisfied, an identifier of the component or sensor, and/or a location of the component or sensor. The electronic communication may be transmitted, for example, over a wireless network, Wi-Fi network, short-range network, Bluetooth network, local area network, and so on.

A premises 110 may also include a monitoring device 132 that may track and collect data indicative of use characteristics of one or more components 106, which data may include sensor data from sensors 130. Such data may not only indicate use characteristics but also may be correlated to operation performance in order to indicate operation performance. A use characteristic may include, for example, when, how and/or by whom a component 106 may be being used. In various instances, a monitoring device 132 may or may not be located within a unit 112 and/or premises 110. In some instances, a monitoring device 132 may be included in a resource orchestration sub system 101-2.

A monitoring device 132 may be configured to receive input, which may indicate use characteristics (e.g., that a predetermined or un predetermined use may be beginning or has ended, a time that a use has started or completed, an entity engaged in a use, and so on). The monitoring device 132 may include or otherwise provide an interface, such as any one or a combination of the interfaces disclosed herein. Thus, for example, the interface may allow for the monitoring device 132 to receive the input indicative of use characteristics from an authorized user and/or from a component 106. In some embodiments, one or more monitoring device 132 may correspond to or be communicatively couplable to devices 108 such that interfaces provided via the devices 108 may facilitate the input.

In some instances, the monitoring device 132 may be (e.g., via a wireless or wired connection) connected to one or more components 106 and/or one or more sensors 130. Such connections may enable monitoring device 132 to estimate a usage characteristic. For example, one or more intensity values (or a processed version thereof) from a light sensor or motion sensor may be compared to a threshold, and it may be determined that a unit may be not being used if the value(s) are below a threshold. As another example, it may be estimated that a unit may be in use so long as a particular type of component may be detected as being within the unit. As yet another example, it may be estimated that a unit may be in use when signals from a badge reader indicate that a particular individual remains in the unit.

The monitoring device 132 may control and update a performance data store 134. The one or more performance data stores 134 may include data indicative of operation performance for, e.g., particular resources, particular resource-allocation systems, resource types, components, units, premises, and/or use types. Again, the data indicative of operation performance may include one or a combination of usage data corresponding to usage of components 106; sensor data corresponding to sensors detecting component usage, resources, resource operations, resource locations, load states and characteristics, and/or like; and/or input provided by resources via devices 108 and/or monitoring devices 132. The data may indicate day, time, use type, duration, transitions times, operation descriptions, resource identifiers, load identifiers, location identifiers, and/or the like. Additional examples are disclosed further herein. A performance data store 134 may, but need not, be part of monitoring device 132. In some instances, a performance data store 134 may be remote from monitoring device 132, one or more units, one or more components and/or one or more premises to which it pertains. In some instances, a performance data store 134 may be in the cloud.

The system 101-1 may include and/or be communicatively coupled to one or more resource-allocation subsystems 135. In various embodiments, a resource orchestration subsystem 101-2 may include one or more of the resource-allocation subsystems 135. In some embodiments, one or more of the resource-allocation subsystems 135 may include one or more resource controlling devices 136. A resource controlling device 136 may control and update resource allocation specifications for many different resources. The specifications of resource allocations may include digital identifiers for particular resources (e.g., names, identification numbers and alphanumeric strings, usernames, user IDs, contact information, and/or the like), specifications and descriptions for attributes mapped to the resources, timetables for the resources, and/or the like. The timetable may indicate that particular blocks of times have been assigned to particular resources with particular roles, assignments, activities, operations, etc. The resource controlling device 136 may update one or more resource allocation and programs data stores 138 (e.g., which may be included within and/or remote from controlling device 136) so as to reflect current resource allocation specifications. The system 101-1 may map the resource allocation specifications to node specifications of one or more network nodes. The system 101-1 may update one or more resource allocation data stores 138 with the mappings of the resource allocation specifications to the node specifications of the one or more network nodes.

The resource orchestration subsystem 101-2 may correspond to a number of technological improvements as disclosed herein. To facilitate the technological improvements, the resource orchestration subsystem 101-2 may communicate with one or more: components 106, client devices 108, sensors 130, monitoring devices 132 and/or controlling devices 136. The resource orchestration subsystem 101-2 may itself control and/or update the performance data store 134 and/or resource allocation and programs data store 138. In some instances, part or all of one or both of these data stores may mirror other corresponding data stores (e.g., located at and/or controlled by devices at one or more premises). For example, the resource orchestration subsystem 101-2 may receive periodic or irregular communications (e.g., that may, but need not, be responsive to requests for such) from one or more controlling devices 136 and/or monitoring devices 132 that identify an update of an allocation of a resource, indicia of mappings of the resource allocation specifications to node specifications of one or more network nodes, and/or program associated with a particular set of one or more resources; and/or an update of performance data associated with a particular set of one or more resources, use type, premises, and/or the like. The resource orchestration subsystem 101-2 may update a corresponding data structure in a mirrored resource allocation and/or program data structure and/or performance data structure.

In various embodiments, the resource orchestration subsystem 101-2 may include or otherwise communicate with a server or device that manages resource allocations, mappings of resource allocation specifications to node specifications of one or more network nodes, and/or programs (e.g., by receiving communications from a plurality of controlling devices controlling individual resource allocations and/or programs and by updating an aggregated data structure to reflect current assignments, availabilities, and/or performance attributes). Such management may enable the resource orchestration subsystem 101-2 to efficiently query multiple resource allocations, node mappings, and/or programs and/or identify assignments, availabilities, and/or performance attributes.

Figure 11:
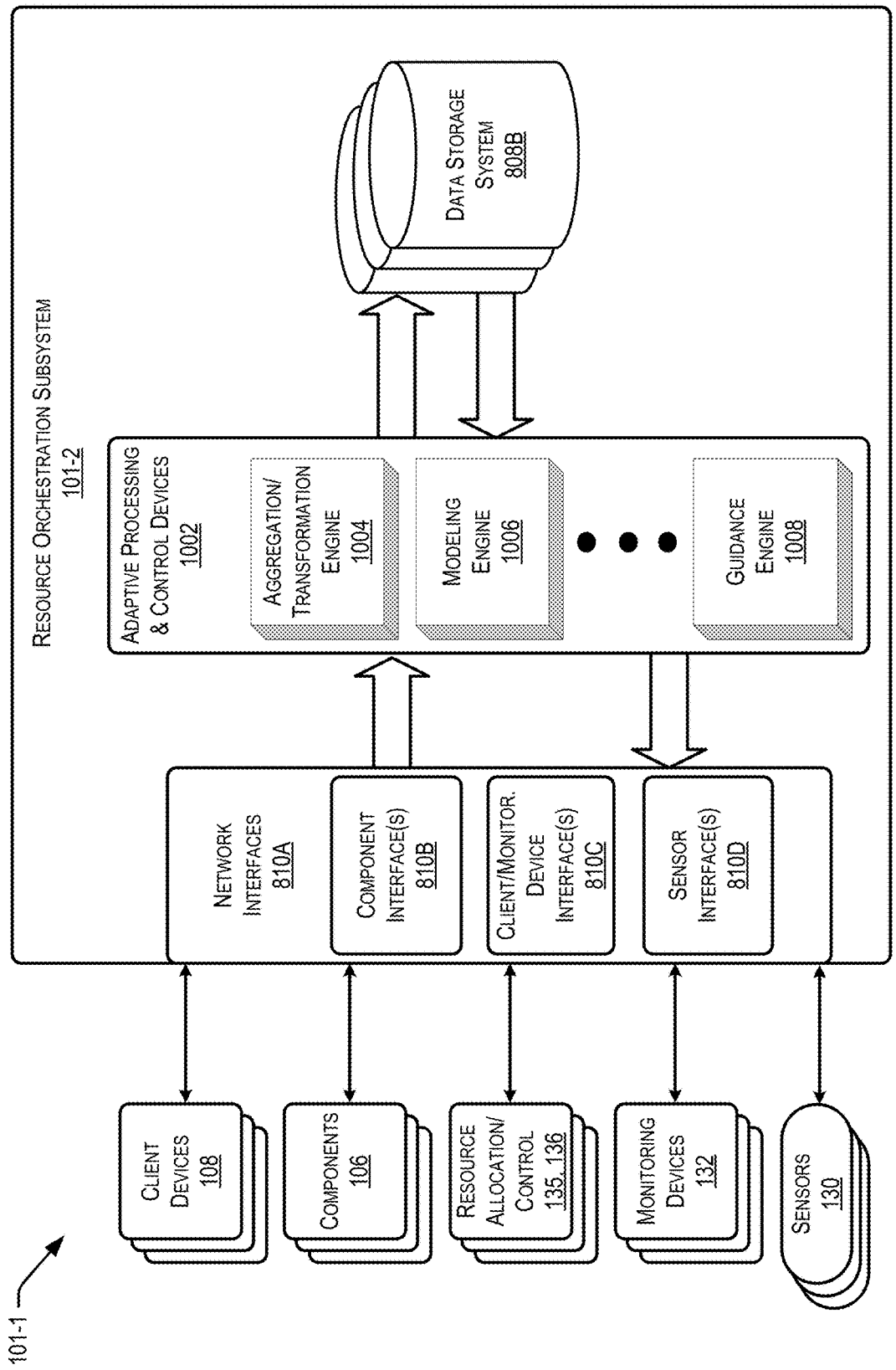
FIG. 11 illustrates a functional diagram of aspects of the resource orchestration system, in accordance with embodiments of the present disclosure.

FIG. 11 illustrates a diagram of aspects of the resource orchestration subsystem 101-2 according to disclosed embodiments of the present disclosure. The diagram may correspond to various portions of the architecture stack 300 with the resource orchestration subsystem 101-2 including a server system comprising one or combination of the servers disclosed above, such as those described with respect to the internal system 822. The server system may interface with the external network 820 and various components of the internal network 810. The server system may run any suitable operating system and may also run any of a variety of additional server applications and/or mid-tier applications, such that server system may include one or a combination of web servers, application servers, HTTP servers, Internet Information Services servers, FTP (file transfer protocol) servers, messaging gateways, CGI (common gateway interface) servers, email gateways, JAVA® servers, database servers, telephony gateways, and/or the like. Exemplary database servers include without limitation those available from Oracle, Microsoft, Sybase, IBM, and/or the like. While engines, repositories, and other components are described separately in this disclosure, it should be appreciated that the components may be combined and/or implemented differently in any combination to provide certain features in various embodiments with hardware, software and/or firmware. In various embodiments, different processes running on one or more shared resources may implement some of the components.

The server system may include and be configured to provide the resource orchestration subsystem 101-2. The transceiving equipment and/or the server system may be at least partially located in one or more of the one or more facilities 110 or may be located remotely from the one or more facilities 110. The transceiving equipment and/or the server system may be connected to a plurality of distribution components of the one or more facilities 110. The system 830-2 may include a plurality of various network interfaces 810A to communicate with the client devices 108, components 106, resource-allocation subsystems 135, resource controlling devices 136, monitoring devices 132, and sensors 130. The network interfaces 810A may include one or more component interfaces 810B, client and/or monitoring device interfaces 810C, and/or sensor interfaces 810D to transmit to and/or receive communications from one or a combination of the client devices 108, components 106, resource-allocation subsystems 135, resource controlling devices 136, monitoring devices 132, and sensors 130. In various embodiments, one or more of the interfaces may include or otherwise correspond to API interfaces to transmit to and/or receive communications from one or a combination of the so client devices 108, components 106, resource-allocation subsystems 135, resource controlling devices 136, monitoring devices 132, and sensors 130 using APIs.

The client devices 108 may correspond to one or a combination of the user devices 706-714. In various embodiments, the subsystem 101-2 may provide the applications 716-724 to the user devices 706-714, communicate with the user devices 706-714 via the applications 716-724, and/or otherwise facilitate a resource orchestration interface via the client device interfaces 810C to expose features of the orchestration interface to the user devices 706-714. In some embodiments, the client device interfaces 810C may include the orchestration interfaces. In some embodiments, the orchestration interfaces may include an API to interact with the server system. In various embodiments, the subsystem 101-2 may include, provide, and/or be configured for operation with the orchestration interfaces, for example, by making available and/or communicating with one or more of a website, a web page, a web portal, a web application, a mobile application, enterprise software, and/or any suitable application software to facilitate the orchestration interface. In some embodiments, the orchestration interface may cause a web page to be displayed on a browser of a user device. The web page(s) may display output and receive input from a user (e.g., by using Web-based forms, via hyperlinks, electronic buttons, etc.). The subsystem 101-2 may provide web applications to a user device for execution in a web browser running on the user device; and the web applications may include scripts, such as Java, JavaScript, etc., for execution within an isolated environment in a browser. A variety of techniques can be used to create the web pages and/or display/receive information, such as JavaScript, Java applications or applets, dynamic HTML and/or AJAX technologies. In some embodiments, the subsystem 101-2 may provide rich-client applications to a user device; and the rich-client applications may be programmed in traditional programming languages to have full access to functions of the operating system running on the user device. In some embodiments, the orchestration interface may include or work with a mobile application.

The subsystem 101-2 may include one or more adaptive processing and control devices 1002. The one or more adaptive processing and control devices 1002 may, in some embodiments, be included in the access management engine 602. The one or more adaptive processing and control devices 1002 may include one or more aggregation and transformation engines 1004, one or more modeling engines 1006, and/or one or more guidance engines 1008, which may be separate or integrated in various embodiments. In some embodiments, the processing and control devices 1002 may include the aggregation engine 420. In various embodiments, the adaptive processing and control devices 1002 may correspond to a single, integral engine or separate engines working in conjunction. The adaptive processing and control devices 1002 may transform, translate, or otherwise adjust data collected. In various embodiments, the adaptive processing and control devices 1002 may correspond to executable code stored in one or more memories communicatively coupled with one or more processors, such as those of the subsystem 101-2. In some embodiments, the adaptive processing and control devices 1002 may correspond to one or more servers of the server system with one or more of the servers configured to perform one or more of the orchestration features in accordance with embodiments disclosed herein.

Figure 12:
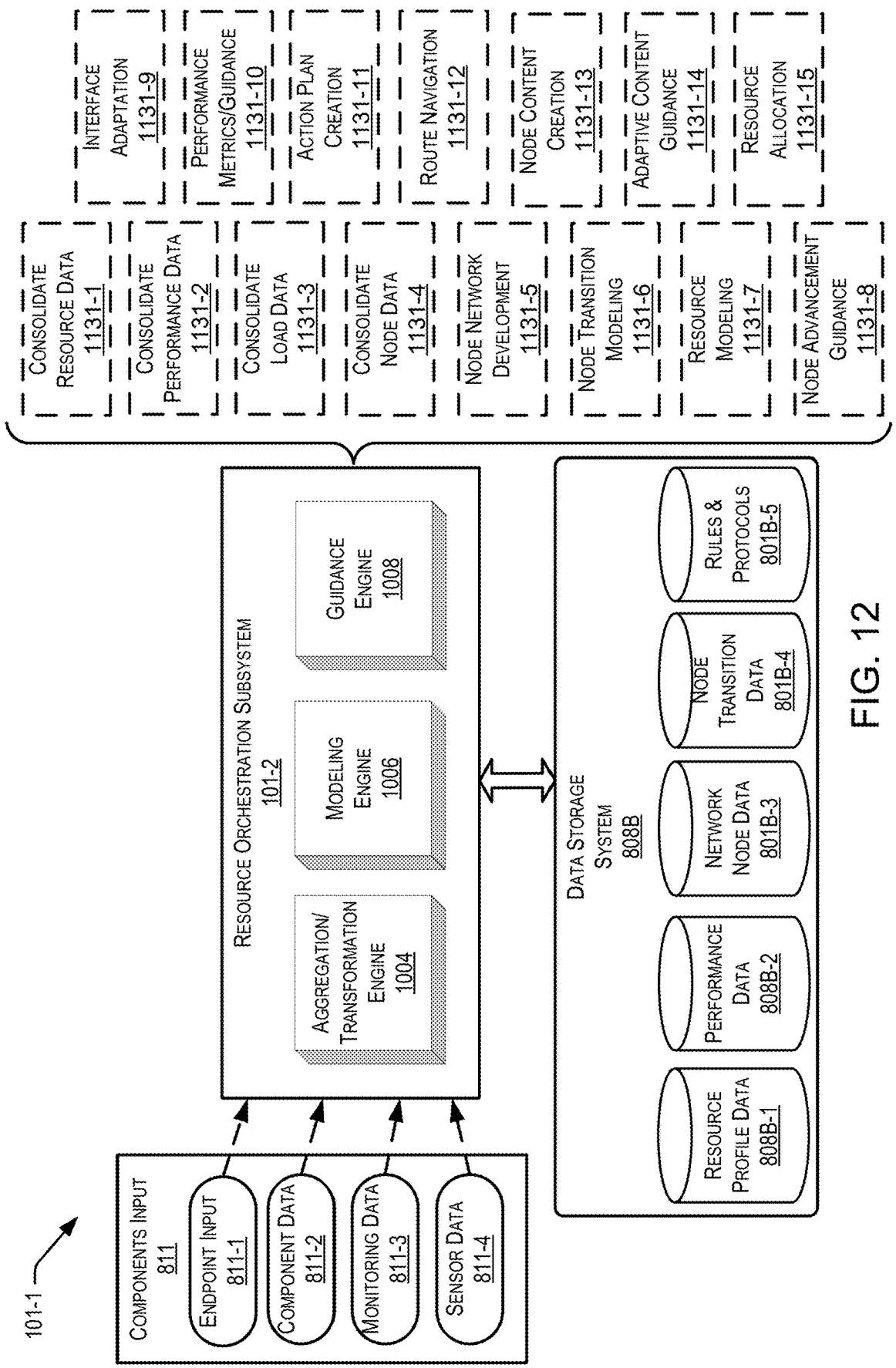
FIG. 12 illustrates a functional diagram of aspects of the resource orchestration subsystem, in accordance with embodiments of the present disclosure.

FIG. 12 shows a functional diagram of aspects of the resource orchestration subsystem 101-2, in accordance with embodiments of the present disclosure. The subsystem 101-2 may be configured to provide a number of adaptive controls 1131 with one or a combination of the orchestration interface, the client devices 108, the components 106, the monitoring devices 132, and/or the sensors 130 as disclosed herein. As elaborated herein, the adaptive controls 1131 may include consolidating resource data 1131-1, consolidating performance data 1131-2, consolidating load data 1131-3, consolidating network node data 1131-4, node network creation and adaptation 1131-5, node transition modeling 1131-6, resource modeling 1131-7, node progression guidance 1131-8, interface adaptation 1131-9, performance metrics modeling, tracking, and guidance 1131-10, program creation 1131-11, node-specific and route-specific navigational assistance 1131-12, node-specific and route-specific content creation 1131-13, adaptive content guidance 1131-14, resource allocation 1131-15, and/or the like.

The one or more adaptive processing devices 1002 may be communicatively coupled with interface components and communication channels (which may take various forms in various embodiments as disclosed herein) configured to receive components input 811. The components input 811 may include input from a plurality of different data sources. For example, the components input 811 may include endpoint input 811-1, component data 811-2, monitoring data 811-3, and/or sensor data 811-4 from one or a combination of the client devices 108, components 106, resource-allocation subsystems 135, resource controlling devices 136, monitoring devices 132, and sensors 130. The components input 811 may include resource allocation specifications, which may correspond to one or a combination of endpoint input 811-1, component data 811-2, monitoring data 811-3, and/or sensor data 811-4. The technical improvements provided by the subsystem 101-2 over prior technologies include improvements in orchestration accuracy, adaptability, and control at least in part by machine-intelligent handling of input from multiple different sources, including the orchestration interface, the client devices 108, the components 106, the monitoring devices 132, and/or the sensors 130 in order to adapt to various particular changes in the interaction system 100, as is disclosed herein.

The resource orchestration subsystem 101-2 provides a number of technological improvements disclosed herein with one or more aggregation and/or transformation engines 1004. The aggregation and transformation engine 1004 may be configured to monitor the components input 811 for any suitable aspects to facilitate improvements with node network development features and individualization adaptation features disclosed herein. For example, aggregation and transformation engine 1004 may be configured to consolidate resource data 1131-1, consolidate performance data 1131-2, consolidate load data 1131-3, and/or consolidate node data 1131-4. The aggregation and transformation engine 1004 may gather and process components input 811 to facilitate creation, development, and/or use of resource profiles 808B-1, which may include resource and resource allocation specifications, as well as performance data 808B-2, which may include performance metrics pattern data, and node data 808B-3, which may include node metrics, node metrics pattern data, and/or node specifications.

Figure 13:
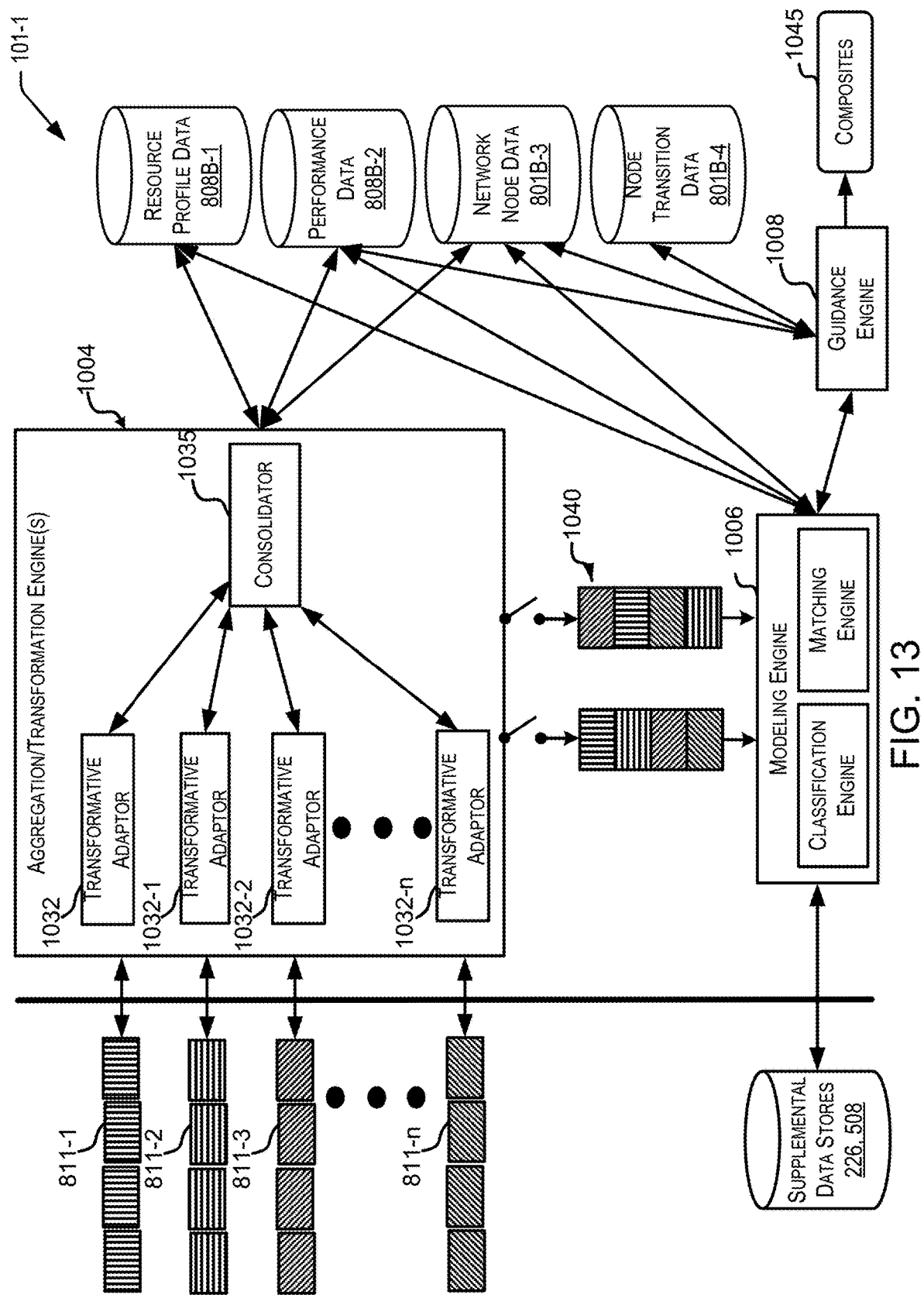
FIG. 13 illustrates a diagram that depicts a portion of the resource orchestration subsystem including further aspects of the aggregation and transformation engine and modeling engine, in accordance with embodiments of the present disclosure.

FIG. 13 illustrates a diagram that depicts a portion of the resource orchestration subsystem 101-2 including further aspects of the aggregation and transformation engine 1004 and modeling engine 1006 according to disclosed embodiments of the present disclosure. In various embodiments, the aggregation and/or transformation engines 1004 may correspond to a single, integral engine or separate engines working in conjunction. The aggregation/transformation engines 1004 may transform, translate, or otherwise adjust data 811 collected, such as data indicative of performance metrics and data indicative of resources specifications, node specifications, node metrics, and/or the like.

The aggregation/transformation engines 1004 may utilize any one or combination of the interfaces disclosed above as one or more content acquisition interfaces configured to allow the aggregation/transformation engines 1004 to gather data 811 from data sources corresponding to any one or combination of the sources of data indicative of performance data, network node data, resource-related data, sensor data, load-related data, location data, and/or the like disclosed herein to facilitate the resource orchestration features disclosed herein. The data 811, which may include multiple data packets and/or data streams, may be received via one or more networks, such as a local area network, a Wi-Fi network, or the Internet, from multiple sources (e.g., from a single premises or multiple premises), such as a component or user device that collects at least some of the data included in each data element based at least in part on inputs detected at the component or user device, measurements made by a sensor, and/or data monitored by a monitoring device, as disclosed herein. In some instances, the data may be collected immediately, or with some delay (e.g., so as to be at an end of a data-collection effort) appended to a data stream or other data packets transmitted directly or indirectly to the engines 1004. In some instances, collected data can be locally or remotely stored and subsequently retrieved (e.g., by a same or different device) to append to a stream or other data packets. A managing server may then, at a defined time or upon detecting a defined type of event (e.g., receiving a data request or detecting a threshold size of a data stream), retrieve the stored data and append the data (e.g., in raw or processed form) to a stream or other data packets. Thus, a source of a stream or other data packets may be a single component or user device or an intermediate monitoring device or system that collects data from multiple components, sensors, and/or user devices.

The received data 811 may include individual data elements, which may correspond to data collected with respect to one or a combination of: usage data corresponding to usage of components 106; sensor data corresponding to sensors detecting component usage, resources, resource operations, resource locations, load states and characteristics, and/or like; and/or input provided by resources via devices 108 and/or monitoring devices 132; data indicating day, time, use type, duration, transitions times, operation descriptions, resource identifiers, load identifiers, location identifiers, and/or the like; requests to perform one or more processes and operations; requests for resources to perform one or more processes and operations; corresponding resources mapped to one or more processes and operations; corresponding loads mapped to one or more processes and operations; operation start times; operation completion times; process and operation performance statuses; resource allocation, statuses, availabilities, node assignments, including assigned roles, positions, units, locations, and facilities;

load statuses, conditions, locations, and resource assignments; time data corresponding to resource availabilities; location data and time data corresponding to locations of resources at particular times; location data and time data corresponding to locations of loads at particular times; time data corresponding to load availabilities and needs, load specifications, process and operation specifications, and/or the like to facilitate various features of resource and/or load orchestration disclosed herein. In various embodiments, the data 1004 may correspond to any one or combination of raw data, unstructured data, structured data, information, and/or content which may include media content, text, documents, files, instructions, code, executable files, images, video, audio, and/or any other suitable content suitable for embodiments of the present disclosure. In various instances, data from 10, 100, 1,000 or any number of different sources may be merged together with data generated internally, data previously received, data from third parties, etc. In various embodiments, the aggregation/transformation engines 1004 and/or the modeling engines 1006 may identify which data and records are about the same resource, network node, load, and/or the like, and may merge attributes from different sources into preliminary composites 1040 and particularized composites 1045 corresponding to resource profiles 808B-1, performance data 808B-2, and/or network node data 808B-3, that can be used by the resource orchestration subsystem 101-2 as one or more bases for other controls 1131 features disclosed herein.

The modeling engine 1006 may, for example, learn patterns of commonalities of node specifications, of resource specifications, and of which resource specifications match which node specifications. With such learning, the modeling engine 1006 may identify and develop normalization and standardized criteria to differentiate node specifications and differentiate resource specifications, which the modeling engine 1006 may use to map particular node specifications to particular nodes 945 and mapping particular resource specifications to particular nodes 945, though some substantially similar or equivalent nodes and resources may differ in descriptions, and/or the like. Tagging schema may be employed to facilitate the learning and modeling. The aggregation/transformation engines 1004 and/or the modeling engines 1006 may recognize identifiers of the above aspects from the data 811 by code mapping, keyword recognition, and/or another suitable method of recognition. For example, the aggregation/transformation engines 1004 and/or the modeling engines 1006 may identify keywords and/or codes as distinctive markings, collect them, and correlate them with recognition criteria (e.g., keyword criteria and/or code system) for the purposes of characterizing each set of data 811 and generating correlation results. Such recognition processing may be performed in real time. The recognition criteria may include keywords identified by any one or combination of words, word stems, phrase, word groupings, and/or like keyword information. The recognition criteria may include weighting assigned to words, word stems, phrase, word groupings, and/or the like. For example, a keyword may be assigned a weight according to its significance. Increased word weights may be tied to increasing probability of criticality. The recognition criteria may correspond to one or more keyword schemas that are correlated to various criticalities. The recognition criteria may correspond to any other suitable means of linking, for example, via a code system, that may be used to associate recognized codes to specific criticalities.

The resource orchestration subsystem 101-2 may, in some embodiments, include a multi-server system that may include specialized data-pulling engines and stream processing engines (e.g., each engine being a server or processing core). According to disclosed embodiments, with data-pulling engines, at least some of the data may be actively gathered and/or pulled from the one or more data sources, for example, by accessing a third party repository and/or by "crawling" various repositories. Thus, for example, resource orchestration subsystem 101-2 may receive/gather updates regarding changes in training, and/or the like of resources. A stream processing engine may be specialized so as to include, for example, stream processors and fast memory buses. In some embodiments, data elements of the received data 811 may be separated, for example, within a stream via a particular (or one of multiple particular) characters or strings, or data elements may begin or end with a particular (or one of multiple particular) characters or strings. In some embodiments, the one or more content acquisition interfaces may include one or more APIs that define protocols and routines for interfacing with the data sources via an API interface. The APIs may specify API calls to/from data source systems. In some embodiments, the APIs may include a plug-in to integrate with an application of a data source system. The one or more data acquisition interfaces, in some embodiments, could use a number of API translation profiles configured to allow interface with the one or more additional applications of the data sources to access data (e.g., a database or other data store) of the data sources. The API translation profiles may translate the protocols and routines of the data source system to integrate at least temporarily with the system and allow communication with the system by way of API calls.

In some embodiments, the data 811 acquired may be in different formats, according to different data standards, in different document structures, including different types of data, etc. The data 1004 can then be transformed, translated, or otherwise adjusted by the engines 1004. For example, acquired data may be converted from a first format to a second format using one or more conversion rules, which may be user-defined, heuristic, and/or machine-learned. In some embodiments, the engines 1004 may perform similar operations with respect to other data generated by elements of the architecture. In some embodiments, the aggregation and/or transformation engines 1004 may correspond at least in part to one or more of transformative integration engine 108, control engine 106, aggregation engine 218, 420, third party aggregation engine 422, and/or interoperability engine 502.

In some embodiments, the aggregation and/or transformation engines 1004 may include one or more transformative adaptors 1032. In some embodiments, one or more transformative adaptors 1032 may be associated with the content acquisition interfaces to effect the transformations. The transformative adaptors 1032 may be implemented, in various embodiments, in hardware and/or software. In some embodiments, a transformative adaptor 1032 may include a hardware device and/or software component that transforms, translates, converts, or otherwise adjusts the acquired data 811. In some embodiments, the one or more transformative adaptors 1032 may correspond at least in part to one or more of adaptors 424, 426, 428.

In some embodiments, various processors and/or layers within the resource orchestration subsystem 101-2 may can be specialized to perform various types of processes. For example, a first set of processors may be configured to transform the data 811 within a stream in real-time (e.g., to produce data in a standard format and/or one that corresponds to an alert, notification, and/or report protocol) and detect (e.g., based at least in part on data included in a header of a data element) whether the transformed data includes one or more particular types of data. In various embodiments, the first set of processors may utilize the transformative adaptors 1032 to effect the transformation and/or may further transform the data beyond first-stage transformations by the transformative adaptors 1032.

The aggregation/transformation engines 1004 may process manifold data sets that may, for instance, come from different sources or the same source, for example, by way of one or more updates to data previously provided by a particular source, and the consolidator 1035 may consolidate the data sets to form a preliminary composite 1040. The consolidation may include applying one or more filtering techniques (or one or more filters) to the data sets, organizing, categorizing, qualifying, and/or comparing the sets of information; detecting, identifying, and/or handling errors/nonconformities; identifying redundancies; removing redundancies; discarding data irrelevant to composite package building for particular resources, loads, and operations corresponding to resource profiles 808B-1, performance data 808B-2, and/or node network data 808B-3; and/or otherwise processing the data sets. The consolidator 1035 may determine whether each element includes a data pattern that may be consistent with one or more defined protocols. Such a protocol may define a data pattern as one that includes, for example, one or more particular data elements and/or types of data elements. The consolidator 1035 may identify one or more applicable protocols (e.g., based at least in part on source identifier, metadata, a current time, a stream identifier, etc.).

The consolidation and/or modeling may be performed upon detection of one or more events, which may correspond to detection of one or more particular data elements 811, one or more device interaction, and/or data changes that correspond to a defined event. For example, the data 811 may indicate that one or more process operations are completed by one or more resources. The aggregation/transformation engine 1004 may process the data 811 for consolidation as process operations are completed by one or more resources, and the modeling engine 1006 may model resource process performance as process operations are completed by one or more resources. Consequently to the aggregation and transformation engine 1004 aggregating, consolidating, and transforming the data 1004 as disclosed herein, the modeling engine 1006 may model the corresponding performance data with respect to the particular resource and/or set of resources to which the one or more process operations pertain for the one or more particular network nodes mapped to the particular resource and/or resources of the set of resources.

As another example, the data 811 may indicate one or more changes in resource allocations, statuses, availabilities, node assignments, including assigned roles, positions, units, locations, and facilities. The aggregation/transformation engine 1004 may process the data 811 for consolidation as changes are detected, and the modeling engine 1006 may model resource profile data, network node data, and/or node transition data as the changes are detected. Consequently to the aggregating, consolidating, and transforming the data 1004, the modeling engine 1006 may model the corresponding node data and/or node transition data for the one or more particular network nodes corresponding to the particular one or more changes detected which may be mapped to the particular resource and/or resources of the set of resources. Hence, such modeling may include development of the node transition data to learn node transition patterns.

One or more first-stage processors of the engines 1004, which may correspond to the consolidator 1035, may form one or more preliminary composites 1040 from consolidated data. The one or more first-stage processors may transmit the one or more preliminary composites 1040 (or replicated versions thereof) to one or more second-stage processors, which may correspond to the modeling engine(s) 1006. The modeling engine 1006 may include or otherwise correspond to a learning engine that may employ an ongoing learning mode to create, confirm, correct, and/or refine resource profiles 808B-1, performance data 808B-2, network node data 808B-3, and/or node transition data 808B-4. The modeling engine 1006 may be an analysis and matching engine that employs machine learning to process the components input 811 (e.g., endpoint input 811-1, component data 811-2, monitoring data 811-3, and/or sensor data 811-4) and derive the particularized resource profiles 808B-1, performance data 808B-2, network node data 808B-3, and/or node transition data 808B-4. The modeling engine 1006 may be configured to perform any one or combination of features directed to matching or otherwise correlating endpoint input 811-1, component data 811-2, monitoring data 811-3, and/or sensor data 811-4.

For example, the modeling engine(s) 1006 may be configured as a composite builder that may build particularized composite packages 1045 corresponding to resource profiles 808B-1, performance data 808B-2, network node data 808B-3, and/or node transition data 808B-4. Further, in some embodiments, the modeling engine 1006 may include a classification engine and a matching engine configured to facilitate classifying and matching features disclosed herein. The modeling engine 1006 may be configured to perform extraction, apply a rule to process the extracted data element, request, and/or retrieve supplemental data from a remote data source, and/or develop composite packages 1045 corresponding to resource profiles 808B-1, performance data 808B-2, network node data 808B-3, and/or node transition data 808B-4 with the supplemental data. For example, the modeling engine 1006 may compare detected, aggregated, consolidated, and differentiated process performance data (which may include, for example, time-stamped recorded data stored by the subsystem 101-2) with load record data.

The modeling engine 1006 may pull from the data stores stored resource profiles 808B-1, performance data 808B-2, network node data 808B-3, and/or node transition data 808B-4, previously created, to update the stored profiles based at least in part on data 1004 newly received and processed. The modeling engine 1006 may pull from the data stores (e.g., 226, 508) data pertinent to the resource profiles 808B-1, performance data 808B-2, network node data 808B-3, and/or node transition data 808B-4 to augment with data 1004 newly received and processed in order to create and/or update the resource profiles 808B-1, performance data 808B-2, network node data 808B-3, and/or node transition data 808B-4. The modeling engine 1006 may update one or more of the manifold composite packages 1045 corresponding to resource profiles 808B-1, performance data 808B-2, network node data 808B-3, and/or node transition data 808B-4, in real time, periodically, or when triggered by certain events with respect to the particular resources.

The modeling engine 1006 may transform the preliminary composites 1040 into renderable data, information, and/or content so that the resource profiles 808B-1, performance data 808B-2, network node data 808B-3, and/or node transition data 808B-4 contain the transformed data for surfacing to one or more end users via one or more client devices 108 via the orchestration interface. For example, linked composites 1045 may be exposed via the orchestration interface to users as the network of nodes 900 for user access/use. The modeling engine 1006 and/or the guidance engine 1008 may identify rules for alerts, notifications, and/or reports. The various rules may include one or more general conditions, such as ones that specify for which resource, type of resource, node, type of node, type of load, time periods, premises, locations, data sources, and/or client devices for which the rules are to apply. The various rules may include a flag definition that may specify what types of data indicate that information corresponding to a data element is to be reported. For example, a flag definition may include an identification of each of one or more composites 1045 and/or one or more values associated with each of the one or more composites 1045. The one or more values may include, for example, a numeric, textual or categorical value. The one or more values may include a threshold and/or define a bound for a closed or open range. Thus, for example, a corresponding value included in a data element may be determined to be consistent with the one or more values if it may be within a range (or outside the range—depending on how the protocol may be defined) or exceeds the threshold in a particular direction (e.g., may be above or may be below the threshold). As another example, a corresponding value included in a data element may be determined to be consistent with the one or more values if it may be the same as one (or all) of the one or more values.

The aggregation and transformation engine 1004 and/or the modeling engine 1006 may include a reasoning module to make logical inferences from a set of the detected and differentiated data to infer one or more patterns corresponding to the resource profiles 808B-1, performance data 808B-2, network node data 808B-3, and/or node transition data 808B-4. For instance, the pattern data may include information about node histories and any one or combination of corresponding identification histories, action and performance histories, location histories, resource allocation histories, and/or the like, any set of which may be used to derive one or more patterns of node data, which may include patterns of node transitions and node metrics, and corresponding patterns of competency data, which may include performance data for particular resources and sets of resources mapped to the network nodes. A pattern-based reasoner may be employed to use various statistical techniques in analyzing the data, both current and historical, in order to infer particularized pattern data from the data 811 and preliminary composites 1040. A transitive reasoner may be employed to infer relationships from a set of relationships to form the node data, node transition data, and performance data. In various embodiments, the system automatically establishes and develops the particularized pattern data. In some embodiments, the modeling engine 1006 may be configured to employ deep learning to process the data 827A and derive the particularized pattern data corresponding to the resource profiles 808B-1, performance data 808B-2, network node data 808B-3, and/or node transition data 808B-4. Accordingly, the modeling engine 1006 may facilitate machine learning or, more specifically, deep learning, to facilitate creation, development, and/or use of particularized pattern data that may include node metrics, node transition metrics, and competency metrics, which may include performance metrics.

The node transition specifications and/or metrics may include specifications of which subsets of the nodes 945 may be linked together in the node network 900. For example, only some of the nodes 945 may be directly linked together. Some of the nodes 945 may be indirectly linked together by way of one or more intermediate nodes 945. Some of the nodes 945 may not be indirectly linked.

As part of the development of node transition data 808B-4, the learning algorithms of the modeling engine 1006 may identify from the data 811 all node transition routes taken by resources and store corresponding node transition metrics with values, descriptors, flags, identifiers, and/or the like indicative of the node transition routes and corresponding resource specifications of the resources mapped to the node transition routes. On an ongoing basis, the modeling engine 1006 may continue to develop the node transition metrics of at least some of the node transition routes as more data 811 indicates more instances of the node transition routes being taken.

With the tracking of resource progression, the modeling engine 1006 may rank the node transition routes according to various node transition metrics. For example, the node transition routes may be ranked according to numbers of instances of the individual routes being taken. Accordingly, the node transition routes may be scored as a function of the numbers of instances and such scoring may indicate the most common node transition routes taken between two or more nodes, the least common, and various categories in between. The node transition metrics may be augmented to include the rankings, scores, and associated categories. Additionally or alternatively, the modeling engine 1006 may rank the node transition routes according to numbers of interim nodes. For example, the node transition routes may be ranked according to numbers of interim nodes in the individual routes being taken before advancing to the ultimate nodes of the node transition routes. Accordingly, the node transition routes may be scored as a function of numbers of interim nodes and such scoring may indicate the shortest node transition routes taken between two or more nodes, the longest, and various categories in between. Again, the node transition metrics may be augmented to include the rankings, scores, and associated categories.

Based at least in part on the recognized and learned patterns that identify various routes from node 945 to node 945, the node transition specifications and/or metrics may include identifiers of attributes of transitional relationships, conditions, and/or thresholds that indicate when progressions or other transitions from one node 945 to one or more other nodes 945 can occur, are likely to occur, or otherwise correspond to a pattern of occurring. The attributes of transitional relationships, conditions, and/or thresholds may include threshold and conditional values, descriptors, flags, identifiers, and/or the like for resource specifications and/or competency metrics. For example, the resource specifications which may be included in a particular profile for a particular resource may include one or a combination of minimum performance metrics.

Each of the resource specifications may be weighted, and the particular resource may be scored with respect to each resource specification such that each score may add to an overall competency level/score. Thus, competency metrics for a resource may include a multiplicity of factors, including performance metrics. As such, a competency score for particular resource may correspond at least in part to one or more performance scores for the particular resource.

Additionally, with the mapping of resource specifications to the node transition routes, the modeling engine 1006 may rank the node transition routes according to any one or combination of types of resource specifications disclosed herein. For example, the node transition routes may be ranked according to minimum performance specifications and/or metrics mapped to resources at each node along the node transition routes before the resources advanced to a next node along the node transition routes. Accordingly, the node transition routes may be scored as a function of minimum performance specifications and/or metrics and such scoring may indicate how influential the minimum performance specifications and/or metrics are with respect to advancing between two or more nodes along the node transition routes taken. The node transition metrics may be augmented to include the rankings, scores, and associated categories. As a more specific example, the modeling engine 1006 may rank the node transition routes according to transition speed. For example, the node transition routes may be ranked according to times that resources spent at each node along the node transition routes before advancing to the ultimate nodes of the node transition routes. Accordingly, the node transition routes may be scored as a function of transition speeds and such scoring may indicate the fastest node transition routes taken between two or more nodes, the slowest, and various categories in between.

The attributes of transitional relationships, conditions, and/or thresholds may include threshold and conditional values, descriptors, flags, identifiers, and/or the like for performance metrics. For example, performance metrics may include process metrics such as key process indicators, such as operational performance metrics, load metrics, rates of changes in performance metrics, rankings of resources and resources sets, and/or the like. Operational performance metrics may include measurements with respect to one or more particular operations and/or processes performed by a particular resource and/or set of resources. The modeling engine 1006 may analyze performance data to identify subsets of the data corresponding to one or more particular operations performed by one or more particular resources, where the engine 1006 classifies the one or more particular operations as corresponding to one or more operation types. The engine 1006 may match the one or more operation types to one or more process protocols 801B-5 specified for the particular resource respect to a particular load. The one or more protocols may specify one or more processes for the particular resource to perform with respect to the particular load. Each of the one or more processes may include one or more operations, such as the identified one or more particular operations corresponding to the identified one or more operation types. The analysis of the subsets of the performance data may include identifying completion of a set of operations prescribed by the one or more protocols for the particular resource and the particular load.

For example, the one or more protocols may specify target durations for performance of a particular operation of particular operation type. Accordingly, the analysis of the subsets the performance data may include analyzing time components of the subsets to determine one or more durations of one or more operation performances and compare the one or more durations to one or more specified target durations. The modeling engine 1006 may calculate deltas between the performance times and durations of the one or more operations with respect to the specified target times, and may assign speed scores as a function of the deltas. Likewise, the modeling engine 1006 may utilize the performance times and durations, numbers of operation completions, and/or other time metrics for a set of operations in determining efficiency scores that are correlated to process(es) and/or operation(s) per unit of time. Efficiency scores, like the other metrics, may qualify performance according to individual operation types and/or process types, as well as aggregately with respect to a plurality of different operation types and/or process types.

Similarly, the one or more protocols may specify target times of day, week, etc. that the operations of the particular operation type should be completed. Accordingly, the analysis of the subsets the performance data may include analyzing time components of the subsets to determine completion of one or more operations of one or more operation types in conformance with the specified target times. The modeling engine 1006 may calculate deltas between the performance times and durations of the one or more operations with respect to the specified target times, and may assign timeliness scores as a function of the deltas.

As another example, the one or more protocols may specify a target frequency at which the operations of the particular operation type should be completed (e.g., X number of times per day, week, etc.). Accordingly, the analysis of the subsets the performance data may include analyzing time components of the subsets to determine completion of one or more operations of one or more operation types in conformance with the specified target frequency. The modeling engine 1006 may calculate deltas between the performance frequencies of the one or more operations with respect to the specified target frequency, and may assign reliability scores as a function of the deltas.

Further, the one or more protocols may specify a prescribed order in which different operations of one or more test types should be completed. Likewise, the one or more protocols may specify contingencies such that certain operations of one or more operation types should be conditionally completed dependent on prior completion of other operations and/or detection of certain conditions with respect to the load. Accordingly, the analysis of the subsets the performance data may include analyzing of the subsets to determine completion of one or more operations of one or more operation types in conformance with the prescribed order and/or contingencies. The modeling engine 1006 may compare performance indicia with respect to the prescribed order and/or contingencies, and may assign orderliness scores as a function of the variance or alignment with the prescribed order.

Additionally, performance metrics with respect to a particular resource and/or set of resources may further be based at least partially on load metrics for loads to which the resource and/or set of resources have been previously assigned. Historical patterns of such metrics may be recognized by the modeling engine 1006 along with the other pattern recognition and analysis disclosed herein. Such load metrics may include load conditions, such as infection rates of the loads and types of infections incurred, lengths of stay, types and rates of adverse outcomes, and/or the like. The load metrics may be scored and factored into the performance scores of particular resources and resources. Overall performance scores with respect to one or more operations and/or processes performed by a particular resource may include one or a combination of various other scores such as speed scores, timeliness scores, reliability scores, orderliness scores, load scores, and/or the like which may be used to derive a aggregate performance and/or competency score. A score component may be accorded an individual weight according to an program.

Further, with the mapping of resource specifications to the node transition routes, the modeling engine 1006 may rank the node transition routes according to any one or combination of types of competency metrics disclosed herein, which may include performance metrics. For example, the node transition routes may be ranked according to competency metrics mapped to resources at each node along the node transition routes before the resources advanced to a next node along the node transition routes. Accordingly, the node transition routes may be scored as a function of competency metrics and such scoring may indicate how influential the competency metrics are with respect to advancing between two or more nodes along the node transition routes taken. The node transition metrics may be augmented to include the rankings, scores, and associated categories.

For each node transition, the modeling engine 1006 may utilize the rankings, scores, and categorization of each node transition metric to determine the most significant subset of node transition metrics for the particular node transition. The modeling engine 1006 may assign weights to the node transition metrics according to each metric's significance. Such metrics, scores, rankings, and/or weights could be implemented in any suitable manner, including lists, tables, matrices, and/or the like. The node transition metrics could be organized in a rank order and/or any hierarchical structure according to weight. Various embodiments may have node transition metrics organized according to decision tree, with contingencies so that only certain combinations of node transition metrics may be considered. For example, certain node transition metrics could only have significance if in conjunction with and/or subsequent to other node transition metrics, which may correspond to prerequisite node transition metrics. Thus, some node transition metrics may be determined to be necessities for a particular node transition (e.g., a minimum performance metric such as particular training, etc., which may satisfy a particular metric threshold, and required in 100% of the node transition instances), while other node transition metrics may be determined to be predominantly influential or influential to a lesser extent (e.g., observed in various lower percentiles of the node transition instances) and associated with any suitable category.

Disclosed embodiments may provide for node progression modeling and guidance for individual resources. Based at least in part on the node path and intra-node analytics, the system 101 may provide node progression modeling and guidance for individual resources based at least in part on the current resource models and profiles, as well as resource input. As disclosed herein, the system 101 may detect that a particular resource corresponds to a particular node as the resource's current node. The system 101 may expose the system-determined current node for the resource via the orchestration interface with one or more user-selectable options for a user (i.e., the resource) to confirm or modify the identification of the current node. Alternatively, the resource may self-identify the resource's current node via one or more user-selectable options of the interface. A resource can further select one or more nodes 945 as target nodes via user-selectable options of the orchestration interface, and the system 101 may analyze the resource's profile to determine a number of performance tests and targets for the resource with respect to the one or more target nodes.

Figure 15:
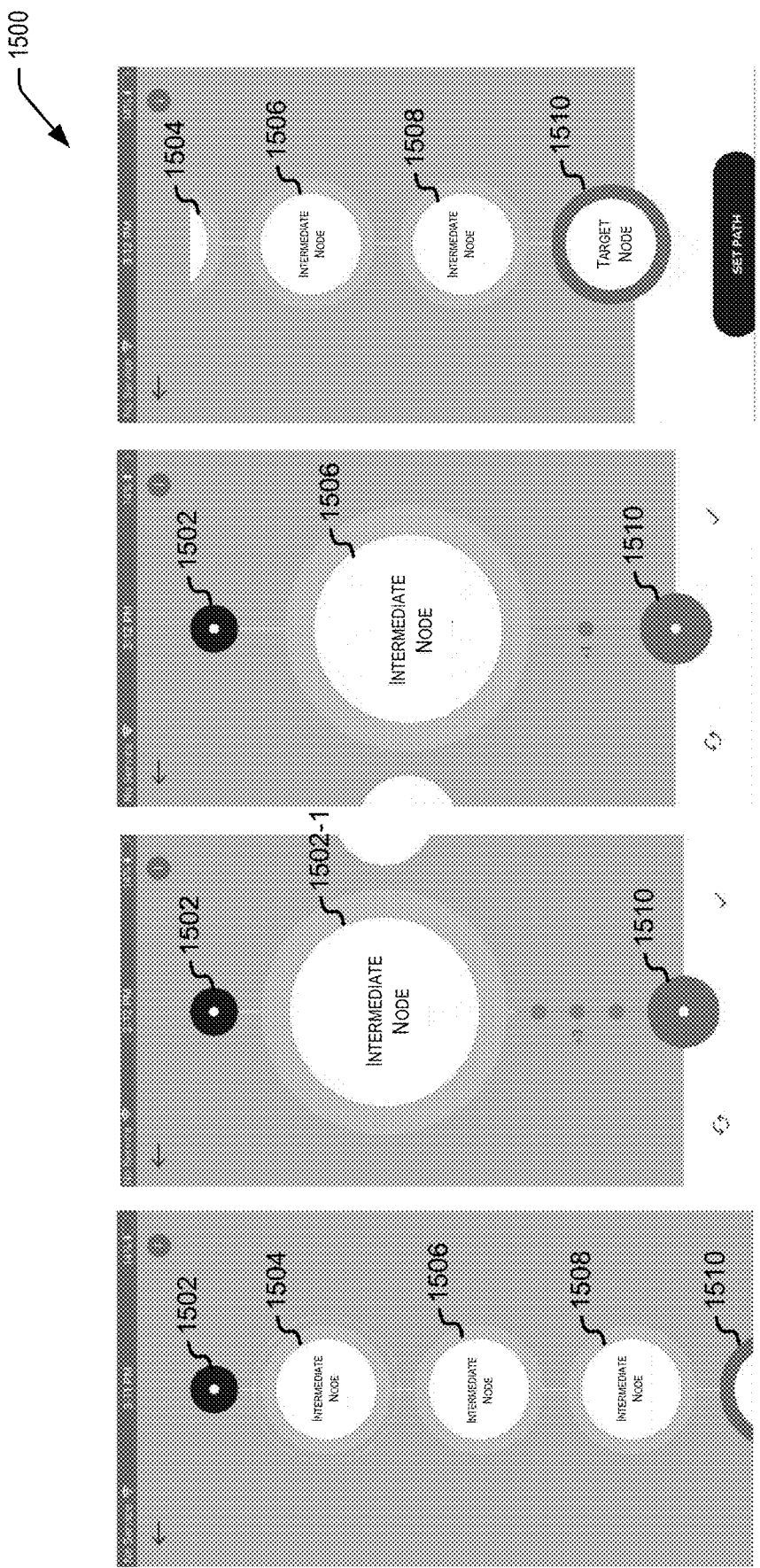
FIG. 15 illustrates portions of a simplified and exemplary interface that may be used with part of the orchestration interface, in accordance with embodiments of the present disclosure.

By way of example, FIG. 15 illustrates portions of a simplified and exemplary interface 1500 that may be used with part of the orchestration interface, in accordance with embodiments of the present disclosure. The interface 1500 may correspond to a simplified representation of one possible mobile device interface and may be used in presenting node network visualizations and, in some embodiments, resource visualizations and performance visualizations. With the orchestration interface, user-selectable options may be presented to select particular network nodes and/or node paths for visualizations with respect to those selected sets of one or more resources. Resource profile data, performance data, and node data may be provided via the orchestration interface by way of alerts, notifications, reports, and/or the like as disclosed further herein. In the illustrated orchestration interface portions, a particular node path has already been selected such that the interface 1500 displays portions of the selected node path. The interface portions further displays graphical representations of a number of nodes in the selected node path. For example, a current node 1502, a target node 1510, and intermediate nodes 1504, 1506, 1508 are illustrated, each presented with one or more user-selectable options to drill down to more network node specifics disclosed herein.

Additionally or alternatively, with or without a user selection of a target node, the system 101 may analyze the resource's profile to determine a number of performance tests and targets for the resource with respect to one or more possible target nodes starting from the resource's current node. With respect to each target node, the system 101 may identify for the resource the most common route to get to the target node; the shortest route to get to the target node; training needed by the resource for each node along the way; which training is influential in higher transit rates along the various paths to the target node; one or more potential matching resources that have previously advanced to/beyond the target node; and/or the like. The system 101 may provide selective analysis into how other resources have moved and/or progressed toward a target node, how long it took to get from one particular node to another particular node along the path, timing, biasing factors, etc. The system 101 may perform predictive modeling, so that a resource can program backwards from a target node. Further, the system 101 may identify next steps for the particular resource—steps they can take in their current position (i.e., intra-node steps, one or more potential resources that have previously advanced to/beyond the target node, etc.) and opportunities for other nodes (i.e., assigned processes that are available and fit to the resource and the selected path).

Further, disclosed embodiments may provide for the orchestration interface to be an adaptive resource interface for guidance for individual resources. The modeling and guidance for individual resources can be different for each resource, being adapted to the uniqueness of the resource profile and selections in view of features disclosed herein. Thus, rather than providing overwhelming and less relevant options to a particular user, the interface can avoid a paradox of choice and automatically adapt to the particular user to be a more effective tool. Accordingly, the interface may adapt to the individual resource by providing subsets of options adapted and selected based on the individual resource, the resource profile, the current node of the resource, selected target sets of the resource, and the resources previous interactions with the orchestration interface. Adaptive content simulations may be provided for the resource to work with based at least in part on the modeling and predictive modeling features previously provided for the resource and/or selected by the resource. The adapted options may further include targets, information on, and selection options for programs, matching resources, etc.; navigational assistance, tracking, alerting, and remediation; training content; and the other guidance features disclosed herein.

To such ends, having evaluated and scored node transition routes based at least in part on one or a combination of the various types of node transition metrics, the modeling engine 1006 may be configured to weight one or more or the node transition routes as a function of resource profile data and/or performance data mapped to the particular resource. For example, the modeling engine 1006 may compare the node transition metrics to values, descriptors, flags, identifiers, and/or the like of the resource specifications and/or metrics. In so doing, the modeling engine 1006 may identify matches, correlations, variances, deviations, consistencies, inconsistencies, deficiencies, conformity, nonconformity, and/or the like between particular resource profiles (i.e., resource specifications and/or metrics) for particular resources and node transition metrics for particular node transitions.

Based at least in part on such comparisons, the modeling engine 1006 may, in some instances, test the particular resource profile and then identify one or more node transition routes with performance tests of the one or more node transition routes as a function of the resource profile. For example, the modeling engine 1006 may weight the one or more routes to indicate correspondence and fit with respect to the resource profile, to identify routes with the best fit with respect to the resource profile, and to identify deficiencies, solutions, proficiencies, and next adaptations of the resource profile with respect to the one or more node transition routes. In some instances, the modeling engine 1006 may select a particular route and test how well a particular resource profile fits the selected route. For example, the modeling engine 1006 may identify matches, correlations, variances, deviations, consistencies, inconsistencies, deficiencies, conformities, nonconformities, and/or the like between particular resource specifications and/or metrics and the node transition metrics of the selected route.

The modeling engine 1006 may employ matching algorithms to match resources based on criteria such as roles, track records, profiles, past node progression, location, resource selections, etc. for example, before or after a resource selection of a node transition route, the modeling engine 1006 may perform similar comparisons of the node transition metrics to values, descriptors, flags, identifiers, and/or the like of the resource specifications and/or metrics to identify one or more potential matching resources that have previously performed the particular node transitions and/or otherwise advanced to/beyond one or more target nodes of the node transition route. The modeling engine 1006 may identify matches, correlations, consistencies, conformity, and/or the like between particular resource profiles for potential matching resources and node transition metrics for particular node transitions. Matches can be scored, ranked, and presented for selection by a resource via the orchestration interface. Via user-selectable options of the orchestration interface, the system 101 may allow for feedback regarding assigned matching resources and may include feedback loops to track performance/progression and allow for continual refinement over time.

As part of the comparisons, the modeling engine 1006 may perform correlation of node transition metrics to values, descriptors, flags, identifiers, and/or the like of the resource specifications and/or metrics. The modeling engine 1006 may perform correlation based at least in part on correlation rules that govern correlation of the resource specifications and/or metrics to the node transition metrics. The correlation rules may include correlation criteria that may include any one or combination of values and/or identifiers, ranges of the values or identifiers, keywords identified by any one or combination of words, word stems, phrase, word groupings, and/or the like correlation information. The correlation criteria could include different weightings assigned to different node transition metrics according to significance (e.g., required as a prerequisite to transition, predominantly influential to transition, influential to a lesser extent, etc.).

In various embodiments, the modeling engine 1006 may employ a scoring system to correlate the resource profiles and the node transition metrics. Various embodiments may quantify correlations with a numerical expression, for example, a match score, with higher scores being assigned to higher correlations of resource profiles and node transition metrics. Higher scores may be assigned for greater extents of matching. For example, a resource profile with metrics/specifications that match of all prerequisite node transition metrics for one or more particular node transitions may be assigned a higher score than a match of less than all prerequisite node transition metrics. As another example, a match of three top-ranked node transition metrics and/or categories of node transition metrics may be assigned a higher score than a match of only one top-ranked node transition metric. Hence, closeness of matching may be a basis for scoring.

Disclosed embodiments may provide a framework for route navigational assistance and adaptive program and process specification generation, modeling, updating, sharing, and implementing. With a node route selected by a particular user, the orchestration subsystem 101-2 may build programs for auto-suggestions for authentication, denial, and/or modification via the orchestration interface. The program may include specifications of next steps for the particular resource identified as a function of the resource's profile, the resource's current node, the selected node route, and/or node transition metrics for one or more nodes of the selected node route. Having determined resource specifications and performance metrics profiles for each resource, the orchestration subsystem 101-2 may build programs based at least in part on the resource specifications and performance metrics profiles. For one or more of the nodes along the selected node route, the orchestration subsystem 101-2, utilizing the node transition metrics derived from the mappings of resource specifications to the node transition route disclosed herein, may determine variances, inconsistencies, nonconformities, deviations, and/or deficiencies of the resource's profile with respect to the system-determined normalities of node transition metrics and resource specifications. Accordingly, the variances, inconsistencies, nonconformities, deviations, and/or deficiencies of the resource's profile from the normalities may be determined based at least in part on comparing the resource specifications and competency metrics to corresponding system-determined normalities of specifications and metrics calculated with the pattern recognition of specifications and metrics attributed to resources at the node along the node transition route before the resources advanced to a next node along the node transition route. The orchestration subsystem 101-2 may learn to identify criticalities and problem areas when such variances, inconsistencies, nonconformities, and deviations satisfy one or more thresholds, which may include absolute thresholds and/or relative thresholds, as bases for auto-generation of programs with suggested values for parameters of the programs, which auto-suggestions may be confirmed, accepted, rejected, and/or modified via the orchestration interface. As disclosed above, the orchestration subsystem 101-2 may utilize the rankings, scores, and categorization of each node transition metric to determine the most significant subset of node transition metrics for the particular node transition. Accordingly, the orchestration subsystem 101-2 may likewise organize the variances, inconsistencies, nonconformities, deviations, and/or deficiencies of the resource's profile from the normalities in a rank order and/or any hierarchical structure according to the weights of the node transition metrics to emphasize the most significant points for improvement. In this manner, the orchestration subsystem 101-2 may prioritize corresponding action items to remedy the variances, inconsistencies, non-conformities, deviations, and/or deficiencies. In this manner, the orchestration subsystem 101-2 may determine and expose via the interface steps a resource can take in the resource's current position (i.e., intra-node steps, one or more potential matching resources that have previously advanced to/beyond the target node, etc.) and opportunities for other nodes (i.e., assigned processes that are available and fit to the resource and the selected path).

With a node route and/or an program selected by the particular user, the orchestration subsystem 101-2 may track the resource progression in view of that node route, identifying, among other things, when the particular resource is on track, falling behind, off target, and/or getting ahead. Based at least in part on the tracking, the orchestration subsystem 101-2 may update the predictive modeling so as to provide projections regarding the resource progression and trajectory with respect to the selected node route. For example, the modeling engine 1006 may specifically measure the performance of particular resources in completing role-based processes and/or operations specified by particular programs in order to score competency and performance by the particular resources, the competency and performance metrics of the particular resources being determined with respect to the pattern recognition of competency and performance metrics attributed to resources having common specifications and attributes, with recognition of instances where the resources have been assigned to loads having common specifications and attributes. From the modeling, a required level of competency for the specified processes and/or operations according to the program may be a threshold. Each of the resource specifications may be weighted, and the particular resource may be scored with respect to each resource specification such that each score may add to an overall competency level/score. As disclosed herein, competency metrics for a resource may include a multiplicity of factors, including performance metrics. As such, a competency score for particular resource may correspond at least in part to one or more performance scores for the particular resource. As a particular resource meets certain criteria specific to that node and the transition to the next node along the node route, the resource may progress in the node to competent and finally to an expert once all criteria is met. When significant thresholds are met as to staying on target, straying off target, and/or satisfying criteria to advance, the orchestration subsystem 101-2 may alert the resource and/or one or more administrators.

The resource orchestration subsystem 101-2 may utilize the performance data in creating, confirming, correcting, and/or refining resource allocation and programs 808B-3, in some embodiments, employing an ongoing learning mode to do so. To that end, the guidance engine 1008 may identify, create, and/or develop composite packages 1045 corresponding to the programs in various embodiments. The guidance engine 1008 may communicate with the modeling engine 1006 and/or the data storage system 808B to retrieve and/or otherwise receive resource data 801B-1, performance data 801B-2, resource allocation program data 801B-3, training content 801B-4, and/or rules and protocols 801B-5 to use in creating and developing composites 1045. Thus, in some instances, the modeling engine 1006 may directly feed the guidance engine 1008, and, in some instances, the guidance engine 1008 may actively pull data from the data store system 808B. Accordingly, the modeling engine 1006 may use previously stored data and newly collected data 1004 to form and update the composite packages 1045.

In various embodiments, the composites 1045 may conform to particular rules and protocols 801B-5 that may be load-specific and/or particular to certain types of loads and/or certain load conditions. In various embodiments, the composite 1045 may be adapted to be resource-specific and may specify a set of role-based operations needed to be completed in order to fulfill the specifications of the protocol as implemented with a specific program corresponding to the composite 1045. In various embodiments, each composite 1045 may correspond to an instance of a particular program associated with a particular set of one or more resources.

Figure 14:
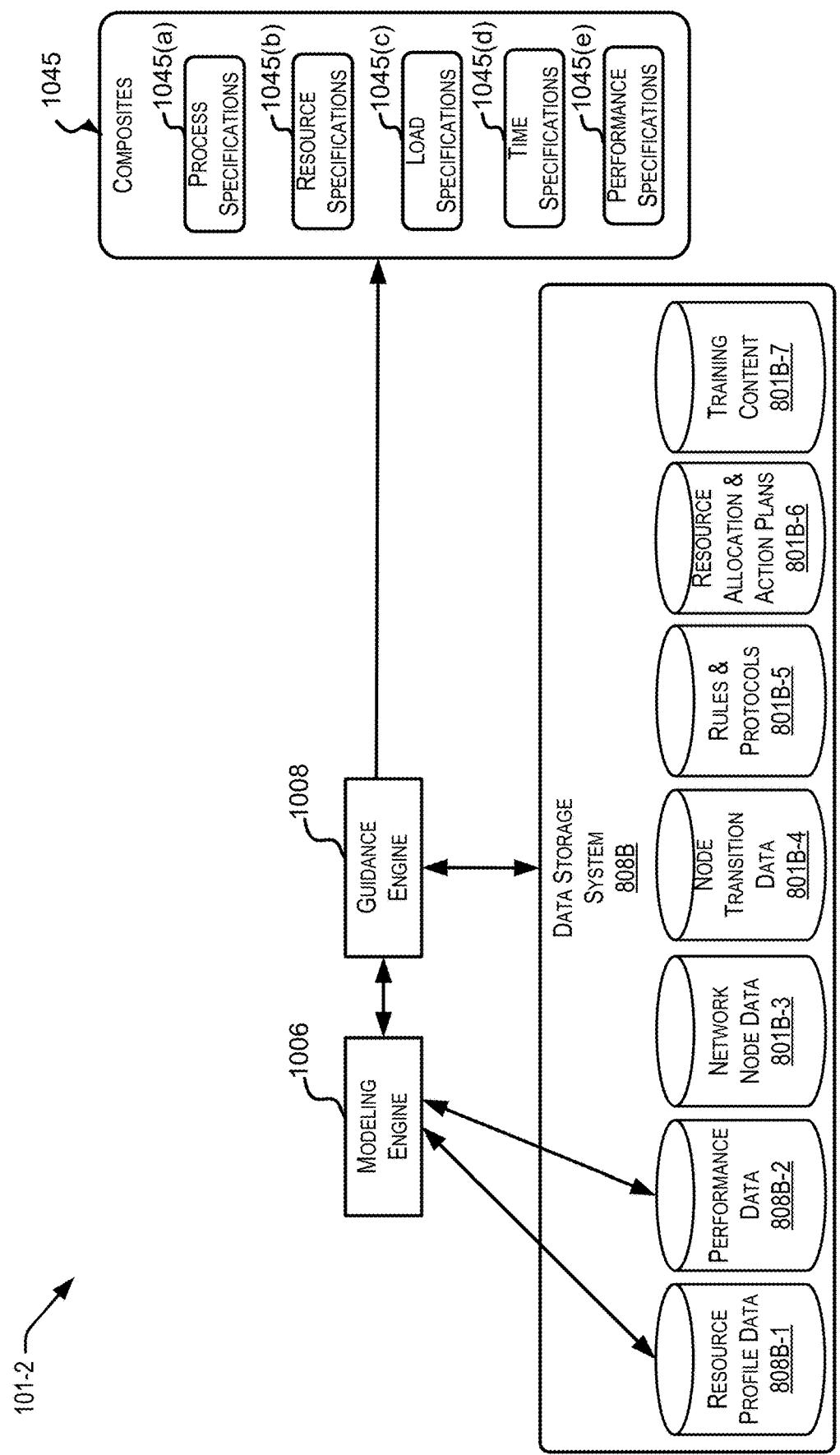
FIG. 14 illustrates a portion of the resource orchestration subsystem including further aspects of the composite generation, in accordance with embodiments of the present disclosure.

FIG. 14 illustrates a diagram that depicts a portion of the resource orchestration subsystem 101-2 including further aspects of the composite 1045 generation according to disclosed embodiments of the present disclosure. A composite 1045 may include data structure with objects and/or components to encapsulate content and specifications for the various embodiments disclosed herein. In various embodiments, the composites 1045 may include process specifications 1045(*a*), resource specifications 1045(*b*), load specifications 1045(*c*), time specifications 1045(*d*), and/or performance specifications 1045(*e*). The process specifications 1045(*a*) may include process definitions, process specification definitions, and/or the like. The process specifications 1045(*a*) may specify one or more role-based operations for performance in accordance with the protocol. The resource specifications 1045(*b*) may specify one or more particular resources, particular resource types/roles designations, training attributes, current allocation designations, historical allocation designations, and/or the like (e.g., using digital identifiers, descriptors, etc.) mapped to at least one of the one or more role-based operations. The load specifications 1045(*c*) may specify one or more particular loads, particular load types, load conditions, and/or the like (e.g., using digital identifiers, descriptors, etc.) to which the one or more particular resources and a particular resource types are allocated in accordance with the protocol. The time specifications 1045(*d*) may include temporal specifications for the program and may include one or more of indications of times (e.g., start times, end times, durations, recurrence, etc.) governing allocation of the one or more resources and/or resource types to the one or more particular loads and/or particular load types, times of availability, and/or the like. The performance specifications 1045(*e*) may specify performance metrics governing the program such as current, past, and target times, frequencies, orders, efficiencies, and/or the like.

As the guidance engine 1008 creates and/or otherwise develops one or more composites 1045, the guidance engine 1008 may update the resource allocation and programs data store 801B-3 so as to reflect current resource allocation specifications, programs, assignments, availabilities, competency and performance attributes, and/or the like. Accordingly, the guidance engine 1008 may correspond to a server or other processing device that manages resource allocations (e.g., resource-to-node allocations) and/or programs. The guidance engine 1008 may do so at least in part by receiving communications from a plurality of controlling devices 136 controlling individual resource allocations and/or programs. Such management may enable the resource orchestration subsystem 101-2 to efficiently query, identify, instruct, and guide multiple resources regarding allocations, programs, assignments, availabilities, competency and performance attributes, and/or the like. Accordingly, the resource orchestration subsystem 101-2 may generate, update, and evolve programs in real-time or near real-time, significantly faster than may be conventionally done and in an unconventional manner.

In various embodiments, specifications may be written using code that may include a set of predefined terms. In some embodiments, the code may include text strings contained in objects/arrays and corresponding to the set of predefined terms. The predefined terms may be parsed from the code and automatically translated into a standard code format. Each unique combination of program components may be associated with performance outcomes, enabling targeted scalability based on variables unique to the resource.

An program may be customized via user-selectable options, with parameter values being selected for the program via selections of the user-selectable options. Further, the orchestration interface may provide visualizations of program performance metrics with respect to each initiative and each resource set. Additionally or alternatively, the orchestration subsystem 101-2 may determine program objects, options, specifications, selections, and features. The orchestration subsystem 101-2 may generate the parameter values based at least in part on identifying deficiencies in competency and/or performance metrics. The orchestration subsystem 101-2 may determine such program constructs provisionally in order to present a provisional program via the orchestration interface for authentication, denial, and/or modification. The modeling engine 1006 may provide for guided decision support that is based at least in part on its predictive modeling that suggests the biasing metrics based at least in part on identifying by the system which metrics can be modified in order to control variance. Auto-suggestions for programs and parameters may be made by the orchestration subsystem 101-2, the suggestions being presented with parameter values for the various specifications with respect to a particular program.

Additionally, various embodiments may provide feedback options via the interface(s) for one or more client devices 108 regarding correlation results determined by the modeling engine 1006 via the recognition processing. Questions and/or user-selectable options may be provided to allow user feedback information about the determinations provided by the system 101-2. For example, user-selectable options (e.g., via the orchestration interface or another device interface) provided with notifications (e.g., push notifications to the endpoint device, pop-up/modal windows with the orchestration interface, and/or the like) could be provided to allow administrative confirmation or correction of conditions detected. With the feedback loop features provided by way of the guidance engine 1008, the modeling engine 1006 may employ an ongoing learning mode to confirm, correct, and/or refine determinations made for the auto-suggestions, resource profile data, competency and/or performance metrics, load profile data, variances, criticality characterizations, and/or the like, heuristically adapting the determinations with the feedback to, over time, learn to make the determinations more effectively.

Accordingly, in conjunction with composite 1045 creation (e.g., program creation), the modeling engine 1006 may allow for the visualization via the orchestration interface of effects of one metric upon other metrics, thereby indicating a best actionable metric to normalize variance. Along with the visualization and indication of various metrics, including the best actionable metric to normalize variance, user-selectable options may be provided with the orchestration interface to allow for user selection of one or more of the metrics for input into the composite 1045 creation process. By way of example, if a mix and/or values of resource specifications and/or metrics for a particular resource is adjusted in the model via the orchestration interface, an end user may be able to see a visualization of predictive effects on performance tests of one or more node transition routes as a function of the resource specifications and/or metrics as a result from the adjustment(s). Thus, the predictive modeling features of the modeling engine 1006 and the corresponding visualization features of the orchestration interface may identify route(s) with the best fit with respect to the adjustment(s) and how well other routes fit with respect to the adjustment(s), identifying deficiencies, solutions, proficiencies, and next adaptations of the adjusted resource profile with respect to the one or more node transition routes.

Figure 16:
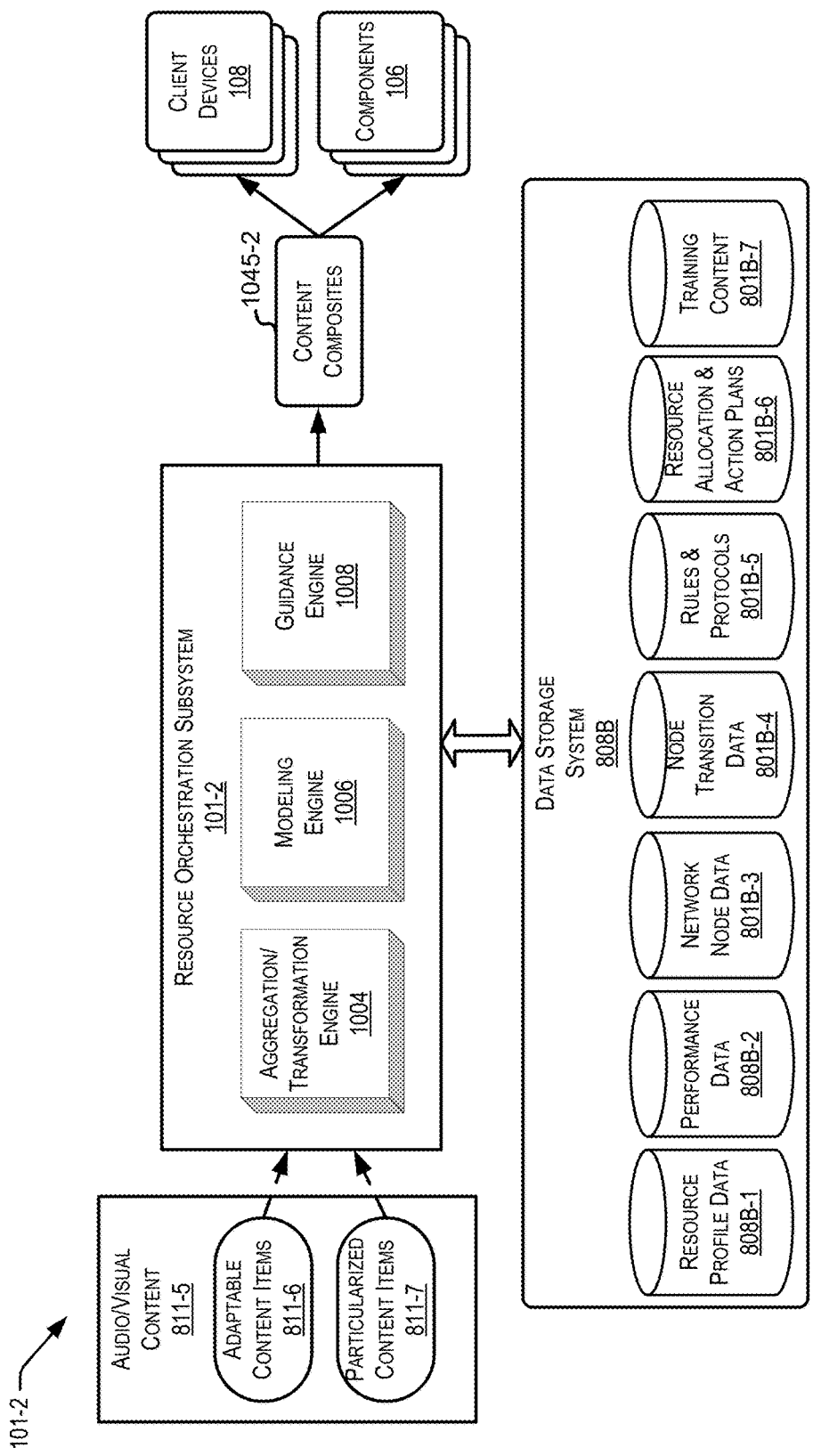
FIG. 16 illustrates a diagram that depicts a portion of the resource orchestration subsystem including further aspects of composite generation, in accordance with embodiments of the present disclosure.

FIG. 16 illustrates a diagram that depicts a portion of the resource orchestration subsystem 101-2 including further aspects of composite 1045-2 generation according to disclosed embodiments of the present disclosure. Disclosed embodiments may provide for determining node-specific and route-specific training for resources. The system 101 may adapt and present node-specific and route-specific content customized to the individual resource automatically, on-demand, or otherwise through an interface. Based at least in part on the analytics disclosed herein, targeted and individualized training programs/content for a particular resource may be developed in view of the resource's current node 945 and a selected target node 945 and node route. For example, a resource on a unit may or may not be performing well in certain areas in comparison with relevant node-specific standards. More specifically, the modeling engine 1006 may identify matches, correlations, variances, deviations, consistencies, inconsistencies, deficiencies, conformities, nonconformities, and/or the like between particular resource specifications and/or metrics and the node transition metrics of the selected route. As disclosed above, deficiencies, solutions, proficiencies, and next adaptations can be identified for each resource for each node 945 (e.g., the resource's current node 945 and other nodes 945 along a prospective path of progression), and, based at least in part on such identification, individualized training content targeted to each particular resource may be identified and created. As part of the determining of resource specifications and competency and/or performance metrics, the resource orchestration system 101-2 may not only identify levels of competency of each individual resource in performing processes and/or operations, but may also identify and create the individualized training content targeted to each particular resource as a function of the particular levels of competency mapped to the particular resources.

Variances, inconsistencies, nonconformities, and deviations from the normalities may be determined based at least in part on comparing determined competency and/or performance metrics of sets of one or more resources with the pattern recognition of competency and/or performance metrics attributed to resources having common specifications and attributes and/or resources allocated to loads having common specifications and attributes. For example, a resource on a unit may not be performing as well as the resource's peer group in certain areas. As another example, it may be determined that the resource needs help with a particular procedure or working with particular control equipment. This may be determined based on an action of the user (e.g., waving a hand in front of a piece of control equipment) or based on a resource profile that indicates a lack of training regarding performing the particular procedure or operating the control equipment. The orchestration subsystem 101-2 may identify when such variances, inconsistencies, nonconformities, and deviations with respect to a particular resource satisfy one or more thresholds, and, consequently, may map one or more deficiencies of the particular resource to a set of training specifications in order to develop training content and a training program targeted to the particular resource. By way of example, the orchestration subsystem 101-2 may classify training specifications for a particular resource by one or combination of event, role, procedure, process, operation, device/component, load specifications/condition, location, time, and/or the like. Values, descriptors, flags, identifiers, and/or the like for such training specification classifications may be mapped to the particular resource based at least in part on the identified deficiencies and/or requests associated with the resource.

The resource orchestration subsystem 101-2 (e.g., the modeling engine 1006 and/or the guidance engine 1008) may include an audiovisual control engine that, as with disclosed embodiments of the other engines, may include instructions retained in processor-readable media and to be executed by one or more processors. The resource orchestration subsystem 101-2 may be configured to retrieve and receive audio and/or visual content 811-5, which may be received and/or retrieved via the network interfaces 810A from one or a combination of different sources such as client devices 108 and/or any other suitable component of the interaction system 100. In various embodiments, sets of one or more adaptable content items 811-6 and/or sets of one or more content item objects 811-7 may be transmitted to the subsystem 101-2 in batches. For example, sets of one or more adaptable content items 811-6 and/or sets of one or more content item objects 811-7 may be transmitted to the subsystem 101-2 on a periodic or otherwise predetermined basis.

The audio and/or visual content 811-5 may include various components, including without limitation, one or more video tracks, audio tracks, audio video tracks, metadata tracks, close captioning information, and/or the like. The resource orchestration subsystem 101-2 may store the audio and/or visual content 811-5 in the training content storage 801B-4. The content may include adaptable content items 811-6 and particularized content objects 811-7. The adaptable content items 811-6 may correspond to audio/visual training content that is directed to certain resource roles, resource, components 106, processes and/or operations, load conditions, competency categories, and/or the like. The adaptable content items 811-6 may be adaptable with the particularized content objects 811-7 to a greater level of particularity and specificity in the training content so that the content may be customized for a particular resource as a function of the identified one or more deficiencies of the resource with regard to certain resource roles, components 106, processes and/or operations, load conditions, competency categories, and/or the like. In various embodiments, the adaptable content items 811-6 and/or the content item objects 811-7 may correspond to any one or combination of raw data, unstructured data, structured data, information, and/or content which may include media content, text, documents, files, instructions, code, executable files, images, video, audio, audio video, and/or any other suitable content suitable for embodiments of the present disclosure.

One or a combination of the engines 1004, 1006, and/or 1008 may be configured to analyze, classify, categorize, characterize, tag, and/or annotate the content 811-5, the adaptable content items 811-6, and/or the particularized content objects 811-7. The generated metadata (e.g., one or more tags) may correspond to identifiers, attributes, characteristics, and/or categories of the content 811-5, the adaptable content items 811-6, and/or the particularized content objects 811-7. The content 811-5, the adaptable content items 811-6, and/or the particularized content objects 811-7 may be augmented with the metadata and then stored in augmented forms in the training content storage 801B-4. In some embodiments, the content 811-5, the adaptable content items 811-6, and/or the particularized content objects 811-7 may be packetized and assigned packet identifiers. A particular packet identifier may be associated with data packets related to tags for particular segments of metadata-augmented content 811-5, adaptable content items 811-6, and/or particularized content objects 811-7. Tag data may include an indication of a period of time (or other measure of time, e.g., a number of frames), a start frame, an end frame, and/or the like. Tag data may include or otherwise be associated with one or more tag identifiers and may include attribute and category identifiers such as one or a combination of event, role, procedure, process, operation, device/component, load specification/condition, location, time, and/or the like identifiers.

The metadata for adaptable content items 811-6 may, for example, identify the adaptable content items 811-6 as being adaptable with any suitable identifier, such as a flag, field value, etc. Additionally or alternatively, the metadata for the adaptable content items 811-6 may identify that the adaptable content items 811-6 are designated for a certain event, role, procedure, process, operation, device/component, load specification/condition, location, time, and/or the like with any suitable identifier. Additionally or alternatively, the metadata for the adaptable content items 811-6 may identify transition points, hooks, frames, windows, other portions designated for overlays, and/or the like for merging with content objects 811-7 such that content from the content objects 811-7 is merged at the transition points, hooks, frames, windows, other portions designated for overlays, and/or the like.

In some embodiments, the guidance engine 1006 may include a multiplexer and may be configured to create a digital stream of data packets containing the video and/or audio corresponding to content composites 1045-2. The content composites 1045-2 may be created with the adaptable content items 811-6 and/or the particularized content objects 811-7. Sets of one or more adaptable content items 811-6 and/or particularized content objects 811-7 may be selected (e.g., by the modeling engine 1004 and/or the guidance engine 1008) for designated time periods by way of tag data or other metadata matched to the identified one or more deficiencies and/or requests associated with the resource based at least in part on rules 801B-5 which may specify training specifications such as event, role, procedure, process, operation, device/component, load specifications/condition, location, time, and/or the like in order to automatically customize training content presentation for particular resources, resource needs, and trigger events. Various sets of rules 801B-5 may provide for various types of restrictions and/or specifications on creating and/or provisioning content composites 1045-2 that may be at least partially a function of the training specifications and trigger event criteria.

The trigger event criteria may specify various types of trigger events. The manner in which content composites 1045-2 may be presented may be dependent on the different types of events. A trigger event may correspond to one or a combination of different types of endpoint input 811-1, sensor data 811-4, and/or other components input 811. For example, the trigger event may include user selection and/or request via an interface of a client device 108 and/or a component 106 (e.g., selection of a user-selectable interface options, voice activation/request, other user action which may include gestures such as waving hand in front of a piece of control equipment, scanning the tag or badge, etc.), user entry of information (e.g., login information, code, identifier, etc.), one or more sensors 130 and/or components 106 detecting a change in a condition of a load, based on the user's resource profile being determined by the subsystem to indicate a lack of training regarding performing the particular procedure or operating the control equipment, and/or the like. Such trigger events may include resource selection of a particular node route and/or an program; resource progression, falling behind or off target, in view of that node route and/or program; when such variances, inconsistencies, nonconformities, and deviations with respect to a particular resource satisfy one or more thresholds; and/or the like.

Additionally or alternatively, a trigger event may correspond to one or a combination of one or more sensors 130 detecting phenomena with respect to the resource such as a location of the resource. For example, the sensor data may be used by the subsystem 101-2 to determine a location of the resource. The location detection may be based at least in part on one or a combination of GPS, Wi-Fi access points, cellular, triangulation, equipment sensor(s), RFID device signals, and/or other techniques for determining a current location of a resource.

Additionally or alternatively, the detecting phenomena with respect to the resource may include user-provided and/or automatically collected biometric data (e.g., voice recognition, facial recognition, fingerprint scanning, retina scanning, etc.) and/or the like. By way of example, in some embodiments, the orchestration subsystem 101-2 may perform audio analysis of audio data captured with the audio sensors/microphones 130 to facilitate targeted training content presentation responsive to audio input of the identified resource. One or more of the engines of the orchestration subsystem 101-2 may include an audio analyzer and handling module to facilitate that detection. The orchestration subsystem 101-2 may further analyze locations of the resources with respect to particular loads to facilitate mapping of one or more of the above-described types of input regarding the resources to particular locations. For example, when sensor input is received via one or more sensors 130, the guidance engine 1008, for example, may map the input to a location based at least in part on location assignment information for the one or more sensors 130 and/or location detection and room/section assignment information from the load profile data for a particular load.

Thus, provisioning of content composites 1045-2 may be differentiated according to event type, with time, place, and/or manner restrictions/specifications contingent on event type. Restrictions on and/or specifications of the manner in which content composites 1045-2 may be presented may include differentiating types of client devices 108 and/or components 106 (e.g., smart phone versus laptop computer, laptop computer versus smart TV, smart speaker with virtual assistant versus particular control equipment, etc.) which will present the content composites 1045-2. The content composites 1045-2 may, for example, be presented within a particular room (e.g., on a smart TV), as an on-demand request for information. Accordingly, the content composites 1045-2 may be tailored to remediate the identified deficiencies and/or requests with regard to certain resource roles, node routes, node transition metrics, components 106, processes and/or operations, load conditions, competency categories, and/or the like. This may not only allow the orchestration subsystem 101-2 to present customized training for particular resources, but also present just-in-time, customized, micro-training when it is needed by the resource (e.g., when a resource is about to perform a particular process and/or operation, operate particular control equipment 106, operations for a particular load having a certain condition, when a deficiency is identified as a resource interacts with the orchestration interface, etc.) and where it is needed by the resource (e.g., in a particular room, in conjunction with a particular device/component 106, on demand on a client device 108, etc.).

It will also be appreciated that presentations disclosed and/or illustrated herein can be configured to provide various types of interaction capabilities and/or presentation types. For example, presentations can identify whether and/or an extent to which a variable exceeds or misses a target threshold and/or how the variable may be changing over time. Presentations can be presented in a manner such that entities associated with particular data are identified, anonymized and/or conditionally identified (e.g., depending on a reviewer). Presentations can be dynamic such that new data may be routinely reflected in the presentation and/or interactive such that a variable selection, constraint identification, degree of summarization and entity representation can be modified in response to particular user input.

Specific details are given in the above description to provide a thorough understanding of the embodiments. However, it may be understood that the embodiments can be practiced without these specific details. For example, circuits can be shown in block diagrams in order not to obscure the embodiments in unnecessary detail. In other instances, well-known circuits, processes, algorithms, structures, and techniques can be shown without unnecessary detail in order to avoid obscuring the embodiments.

Implementation of the techniques, blocks, steps and means described above can be done in various ways. For example, these techniques, blocks, steps and means can be implemented in hardware, software, or a combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it may be noted that the embodiments can be described as a process which may be depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process may be terminated when its operations are completed, but could have additional steps not included in the figure. A process can correspond to a method, a function, a procedure, a subroutine, a subprogram, etc. When a process corresponds to a function, its termination corresponds to a return of the function to the calling function or the main function.

Furthermore, embodiments can be implemented by hardware, software, scripting languages, firmware, middleware, microcode, hardware description languages, and/or any combination thereof. When implemented in software, firmware, middleware, scripting language, and/or microcode, the program code or code segments to perform the necessary processes can be stored in a machine readable medium such as a storage medium.

For a firmware and/or software implementation, the methodologies can be implemented with modules (e.g., procedures, functions, and so on) that perform the functions described herein. Any machine-readable medium tangibly embodying instructions can be used in implementing the methodologies described herein. For example, software codes can be stored in a memory. Memory can be implemented within the processor or external to the processor. As used herein the term "memory" refers to any type of long term, short term, volatile, nonvolatile, or other storage medium and may be not to be limited to any particular type of memory or number of memories, or type of media upon which memory may be stored.

Moreover, as disclosed herein, the term "storage medium" can represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but may be not limited to portable or fixed storage devices, optical storage devices, wireless channels, and/or various other storage mediums capable of storing that contain or carry instruction(s) and/or data.

While the principles of the disclosure have been described above in connection with specific apparatuses and methods, it may be to be clearly understood that this description may be made only by way of example and not as limitation on the scope of the disclosure.

What is claimed:

1. A system to control process-performing resources, the system comprising:
    one or more processing devices; and
    one or more non-transitory, machine-readable storage media containing instructions which, when executed by the one or more processing devices, cause the one or more processing devices to perform operations comprising:
        collecting data in a data storage, the data corresponding to indicia of one or more of:
            assignments of process-performing resources;
            device operations or data changes that correspond to process and/or operation performances by the process-performing resources;
            conditions of loads; and/or
            processes and/or operations associated with the process-performing resources and the loads;
        processing at least some of the data to identify and map data portions to one or more of the process-performing resources;
        learning patterns of the data portions mapped to the process-performing resources and using the patterns to generate sets of node specifications;
        based at least in part on the sets of node specifications, generating a set of nodes in a network of nodes configured according to a computational model that comprises one or more hierarchical orderings of the nodes using a network data structure;
        generating a graphical representation formatted to at least partially represent the network data structure of the nodes in the network of nodes with a graphical user interface of an endpoint device;
        determining metrics of resource performance corresponding to two or more nodes of the network of nodes;
        automatically training the computational model using the metrics of resource performance to adapt the computational model;
        generating an adapted set of nodes according to the adapted computational model; and
        generating a graphical representation formatted to at least partially represent the adapted set of nodes.

2. The system to control process-performing resources as recited in claim 1, where the operations further comprise:
    listening for the data in one or more data streams, each data stream of the one or more data streams corresponding to electronic communications via a network from one or more electronic devices of a plurality of electronic devices, where the electronic devices correspond to one or more client devices, one or more control devices, and/or one or more sensors.

3. The system to control process-performing resources as recited in claim 2, where the operations further comprise:
    detecting and identifying the data in the one or more data streams as corresponding to the indicia.

4. The system to control process-performing resources as recited in claim 3, where the operations further comprise:
    for at least some of the electronic communications, processing each electronic communication to identify one or more values mapped to one or more of the process-performing resources.

5. The system to control process-performing resources as recited in claim 4, where the operations further comprise:
    generating the sets of node specifications at least in part by correlating the data portions according to sharing one or both of identical values and similar values.

6. The system to control process-performing resources as recited in claim 5, where the set of nodes is generated so that each node of the network of nodes comprises a respective composite specific to the node, the respective composite specific to the node comprising at least one set of the sets of node specifications.

7. The system to control process-performing resources as recited in claim 6, where the operations further comprise:
    generating the graphical representation to at least partially represent the network data structure of the nodes in the network of nodes, where each represented node of the graphical representation comprises one or more selectable options to access underlying data corresponding to one of the nodes, the underlying data of at least one of the nodes comprising a respective subset of the sets of node specifications.

8. The system to control process-performing resources as recited in claim 7, where the underlying data further comprises the composite specific to the node.

9. The system to control process-performing resources as recited in claim 8, where the operations further comprise:
    communicating interface specifications to the endpoint device for a plurality of interface options provisioned with the graphical user interface that correspond to a plurality of parameters to specify a configuration of a subsystem with a selected set of one or more of the process-performing resources to perform a defined process in accordance with one or more selected protocols.

10. The system to control process-performing resources as recited in claim 9, where the operations further comprise:
    based at least in part on receiving one or more selections of one or more interface option of the plurality of interface options, controlling the selected set of the one or more of the process-performing resources to perform the defined process in accordance with the one or more selected protocols.

11. A method to control process-performing resources, the method comprising:
   collecting, by a control system, data in a data storage, the data to indicia of one or more of:
      assignments of process-performing resources;
      device operations or data changes that correspond to process and/or operation performances by the process-performing resources;
      conditions of loads; and/or
      processes and/or operations associated with the process-performing resources and the loads;
   processing, by the control system, at least some of the data to identify and map data portions to one or more of the process-performing resources;
   learning, by the control system, patterns of the data portions mapped to the process-performing resources and using the patterns to generate sets of node specifications;
   based at least in part on the sets of node specifications, generating, by the control system, a set of nodes in a network of nodes configured according to a computational model that comprises one or more hierarchical orderings of the nodes using a network data structure;
   generating, by the control system, a graphical representation formatted to at least partially represent the network data structure of the nodes in the network of nodes with a graphical user interface of an endpoint device;
   determining, by the control system, metrics of resource performance corresponding to two or more nodes of the network of nodes;
   automatically training, by the control system, the computational model using the metrics of resource performance to adapt the computational model;
   generating, by the control system, an adapted set of nodes according to the adapted computational model; and
   generating, by the control system, a graphical representation formatted to at least partially represent the adapted set of nodes.

12. The method to control process-performing resources as recited in claim 11, further comprising:
   listening for the data in one or more data streams, each data stream of the one or more data streams corresponding to electronic communications via a network from one or more electronic devices of a plurality of electronic devices, where the electronic devices correspond to one or more client devices, one or more control devices, and/or one or more sensors; and
   detecting and identifying the data in the one or more data streams as corresponding to the indicia.

13. The method to control process-performing resources as recited in claim 12, further comprising:
   for at least some of the electronic communications, processing each electronic communication to identify one or more values mapped to one or more of the process-performing resources.

14. The method to control process-performing resources as recited in claim 13, further comprising:
   generating the sets of node specifications at least in part by correlating the data portions according to sharing one or both of identical values and similar values.

15. The method to control process-performing resources as recited in claim 14, where the set of nodes is generated so that each node of the network of nodes comprises a respective composite specific to the node, the respective composite specific to the node comprising at least one set of the sets of node specifications.

16. The method to control process-performing resources as recited in claim 15, further comprising:
   generating the graphical representation formatted to at least partially represent the network data structure of the nodes in the network of nodes, where each represented node of the graphical representation comprises one or more interface options to access underlying data corresponding to one of the nodes, the underlying data of at least one of the nodes comprising a respective subset of the sets of node specifications.

17. The method to control process-performing resources as recited in claim 16, where the underlying data further comprises the composite specific to the node.

18. The method to control process-performing resources as recited in claim 17, further comprising:
   communicating interface specifications to the endpoint device for a plurality of interface options provisioned with the graphical user interface that correspond to a plurality of parameters to specify a configuration of a subsystem with a selected set of one or more of the process-performing resources to perform a defined process in accordance with one or more selected protocols.

19. The method to control process-performing resources as recited in claim 18, further comprising:
   based at least in part on to receiving one or more selections of one or more interface option of the plurality of interface options, controlling the selected set of the one or more of the process-performing resources to perform the defined process in accordance with the one or more selected protocols.

20. One or more non-transitory, storage media comprising instructions that configure one or more processing devices to perform:
   collecting data in a data storage, the data corresponding to indicia of one or more of:
      assignments of process-performing resources;
      device operations or data changes that correspond to process and/or operation performances by the process-performing resources;
      conditions of loads; and/or
      processes and/or operations associated with the process-performing resources and the loads;
   processing at least some of the data to identify and map data portions to one or more of the process-performing resources;
   learning patterns of the data portions mapped to the process-performing resources and using the patterns to generate sets of node specifications;
   based at least in part on the sets of node specifications, generating a set of nodes in a network of nodes configured according to a computational model that comprises one or more hierarchical orderings of the nodes using a network data structure;
   generating a graphical representation formatted to at least partially represent the network data structure of the nodes in the network of nodes with a graphical user interface of an endpoint device;
   determining metrics of resource performance corresponding to two or more nodes of the network of nodes;
   automatically training the computational model using the metrics of resource performance to adapt the computational model;

generating an adapted set of nodes according to the adapted computational model; and generating a graphical representation formatted to at least partially represent the adapted set of nodes.

* * * * *